(12) United States Patent
Parker et al.

(10) Patent No.: US 9,881,260 B2
(45) Date of Patent: Jan. 30, 2018

(54) MOBILE TICKETING

(71) Applicant: GlobeSherpa Inc., Portland, OR (US)

(72) Inventors: Nathaniel Parker, Portland, OR (US); Michael Lewis Gray, Portland, OR (US); Matthew Skip Rotter, Portland, OR (US); Issac Elliott, Portland, OR (US); Zachery Babb, Portland, OR (US); Kurt Griffith, Portland, OR (US); Alex Peter, Portland, OR (US); Scott Schauss, Portland, OR (US)

(73) Assignee: moovel North America, LLC, Portland, OR (US)

( * ) Notice: Subject to any disclaimer, the term of this patent is extended or adjusted under 35 U.S.C. 154(b) by 1113 days.

(21) Appl. No.: 14/045,557

(22) Filed: Oct. 3, 2013

(65) Prior Publication Data

US 2014/0095227 A1 Apr. 3, 2014

Related U.S. Application Data

(60) Provisional application No. 61/744,886, filed on Oct. 3, 2012.

(51) Int. Cl.
*G06Q 10/02* (2012.01)
*G06Q 30/04* (2012.01)
(Continued)

(52) U.S. Cl.
CPC ............ *G06Q 10/02* (2013.01); *G06Q 30/04* (2013.01); *G07B 15/00* (2013.01); *G09B 29/007* (2013.01)

(58) Field of Classification Search
CPC ...................................... G06Q 10/02
(Continued)

(56) References Cited

U.S. PATENT DOCUMENTS 5,253,166 A   10/1993   Dettelbach et al.
5,499,816 A   3/1996    Levy
(Continued)

FOREIGN PATENT DOCUMENTS

EP    1439495 A1    7/2004
EP    2362354 A2    8/2011
(Continued)

OTHER PUBLICATIONS

Chen, Chun-Te et al., "A Mobile Ticket Validation by VSS Tech with Time-Stamp." IEEE International Conference on e-Technology, e-Commerce and e-Service, EEE'04, Mar. 2004, 4 pages.
(Continued)

*Primary Examiner* — Lindsay M Maguire
(74) *Attorney, Agent, or Firm* — Perkins Coie LLP

(57) ABSTRACT

Embodiments of a transit ticket system are provided. The transit ticket system may include a mobile computing device configured to (i) download a mobile ticketing application from a ticket management server, the mobile ticketing application including a graphical data sheet, a ticket dictionary, and ticket strings, (ii) receive ticket rendering instructions from the ticket management server in response to completion of a ticket purchase process via the mobile computing device, and (iii) render for display an active ticket on the mobile computing device with data stored on the mobile computing device based on the ticket rendering instructions, the graphical data sheet, ticket dictionary, and ticket strings in response to an activation input command.

13 Claims, 60 Drawing Sheets

(51) Int. Cl.
*G07B 15/00* (2011.01)
*G09B 29/00* (2006.01)

(58) Field of Classification Search
USPC .......................................................... 705/5
See application file for complete search history.

(56) References Cited

U.S. PATENT DOCUMENTS

| | | |
|---|---|---|
| 6,023,679 A | 2/2000 | Acebo et al. |
| 6,023,685 A | 2/2000 | Brett et al. |
| 6,175,922 B1 | 1/2001 | Wang |
| 6,484,182 B1 | 11/2002 | Dunphy et al. |
| 6,736,322 B2 | 5/2004 | Gobburu et al. |
| 6,775,539 B2 | 8/2004 | Deshpande |
| 6,961,858 B2 | 11/2005 | Fransdonk |
| 6,997,384 B2 | 2/2006 | Hara |
| 7,017,806 B2 | 3/2006 | Peterson |
| 7,143,087 B2 | 11/2006 | Fairweather |
| 7,150,045 B2 | 12/2006 | Koelle et al. |
| 7,158,939 B2 | 1/2007 | Goldstein |
| 7,191,221 B2 | 3/2007 | Schatz et al. |
| 7,379,921 B1 | 5/2008 | Kiliccote |
| 7,386,517 B1 | 6/2008 | Donner |
| 7,392,226 B1 | 6/2008 | Sasaki et al. |
| 7,493,261 B2 | 2/2009 | Chen et al. |
| 7,510,116 B2 | 3/2009 | Robb et al. |
| 7,522,075 B2 | 4/2009 | Mak |
| 7,540,414 B2 | 6/2009 | Jooste et al. |
| 7,555,284 B2 | 6/2009 | Yan et al. |
| 7,567,910 B2 | 7/2009 | Hasegawa et al. |
| 7,587,502 B2 | 9/2009 | Crawford et al. |
| 7,693,744 B2 | 4/2010 | Forbes |
| 7,711,586 B2 | 5/2010 | Aggarwal et al. |
| 7,725,832 B2 | 5/2010 | Cadiz et al. |
| 7,912,214 B2 | 3/2011 | Andre et al. |
| 8,024,234 B1 | 9/2011 | Thomas et al. |
| 8,494,967 B2 | 7/2013 | Bergdale et al. |
| 8,496,169 B2 | 7/2013 | Christofferson |
| 2001/0008564 A1 | 7/2001 | Hirao et al. |
| 2001/0014870 A1 | 8/2001 | Saito et al. |
| 2001/0051787 A1 | 12/2001 | Haller et al. |
| 2002/0016929 A1 | 2/2002 | Harashima et al. |
| 2002/0040308 A1 | 4/2002 | Hasegawa et al. |
| 2002/0065783 A1 | 5/2002 | Na et al. |
| 2002/0111909 A1 | 8/2002 | Lee |
| 2003/0036929 A1 | 2/2003 | Vaughan et al. |
| 2003/0105954 A1 | 6/2003 | Immonen et al. |
| 2003/0105969 A1 | 6/2003 | Matsui et al. |
| 2003/0154169 A1 | 8/2003 | Yanai |
| 2003/0172037 A1 | 9/2003 | Jung et al. |
| 2003/0200184 A1 | 10/2003 | Dominguez et al. |
| 2003/0233276 A1 | 12/2003 | Pearlman et al. |
| 2004/0019564 A1 | 1/2004 | Goldthwaite et al. |
| 2004/0030658 A1 | 2/2004 | Cruz |
| 2004/0086257 A1 | 5/2004 | Werberig et al. |
| 2004/0111373 A1 | 6/2004 | Iga |
| 2004/0169589 A1 | 9/2004 | Lea et al. |
| 2004/0186884 A1 | 9/2004 | Dutordoir |
| 2004/0210476 A1 | 10/2004 | Blair et al. |
| 2004/0224703 A1 | 11/2004 | Takaki et al. |
| 2005/0059339 A1 | 3/2005 | Honda et al. |
| 2005/0070257 A1* | 3/2005 | Saarinen ................ G07B 15/00 455/414.1 |
| 2005/0109838 A1 | 5/2005 | Linlor |
| 2005/0272473 A1 | 12/2005 | Sheena et al. |
| 2006/0206724 A1 | 9/2006 | Schaufele et al. |
| 2006/0293929 A1 | 12/2006 | Wu et al. |
| 2007/0156443 A1 | 7/2007 | Gurvey |
| 2007/0174064 A1 | 7/2007 | Selgert |
| 2007/0192590 A1 | 8/2007 | Pomerantz et al. |
| 2007/0271455 A1 | 11/2007 | Nakano et al. |
| 2008/0071587 A1 | 3/2008 | Granucci et al. |
| 2008/0071637 A1 | 3/2008 | Saarinen et al. |
| 2008/0120127 A1 | 5/2008 | Stoffelsma et al. |
| 2008/0288302 A1 | 11/2008 | Daouk et al. |
| 2008/0308638 A1 | 12/2008 | Hussey |
| 2009/0083847 A1 | 3/2009 | Fadell |
| 2010/0174607 A1 | 7/2010 | Henkin |
| 2010/0211452 A1 | 8/2010 | D'Angelo et al. |
| 2010/0219234 A1 | 9/2010 | Forbes |
| 2010/0262449 A1 | 10/2010 | Monteforte |
| 2010/0279610 A1 | 11/2010 | Bjorhn et al. |
| 2011/0208418 A1 | 8/2011 | Looney et al. |
| 2011/0313870 A1 | 12/2011 | Eicher et al. |
| 2012/0159599 A1 | 6/2012 | Szoke |
| 2012/0166298 A1 | 6/2012 | Smith et al. |
| 2012/0209630 A1 | 8/2012 | Ihm et al. |
| 2012/0221474 A1* | 8/2012 | Eicher ...................... G09C 5/00 705/51 |
| 2012/0296826 A1 | 11/2012 | Bergdale et al. |
| 2012/0296828 A1 | 11/2012 | Bergdale et al. |
| 2012/0330695 A1 | 12/2012 | Gallo |
| 2013/0159026 A1 | 6/2013 | Rogel et al. |
| 2013/0173316 A1* | 7/2013 | Agrawal ................ G06Q 10/02 705/5 |
| 2013/0191232 A1 | 7/2013 | Calman |
| 2013/0218721 A1 | 8/2013 | Borhan |
| 2013/0262161 A1 | 10/2013 | Matsuda |
| 2013/0262163 A1 | 10/2013 | Bergdale et al. |
| 2013/0297425 A1 | 11/2013 | Wallaja |
| 2014/0087760 A1 | 3/2014 | Bennett |
| 2014/0135042 A1 | 5/2014 | Buchheim |
| 2015/0012426 A1 | 1/2015 | Hua |
| 2015/0073907 A1 | 3/2015 | Hua |
| 2015/0356466 A1 | 12/2015 | Parikka |

FOREIGN PATENT DOCUMENTS

| | | | |
|---|---|---|---|
| JP | H11145952 | A | 5/1999 |
| JP | 2002049939 | A | 2/2002 |
| KR | 20010038076 | A | 5/2001 |
| KR | 20030072852 | A | 9/2003 |
| WO | 0193120 | A1 | 12/2001 |
| WO | 03071489 | A2 | 8/2003 |
| WO | 03098503 | A1 | 11/2003 |
| WO | 2004015917 | A1 | 2/2004 |
| WO | 2004066218 | A1 | 8/2004 |
| WO | 2004109605 | A1 | 12/2004 |
| WO | 2005034042 | A2 | 4/2005 |
| WO | 2005091228 | A1 | 9/2005 |
| WO | 2007139348 | A1 | 12/2007 |
| WO | 2009141614 | A1 | 11/2009 |
| WO | 2011044899 | A1 | 4/2011 |

OTHER PUBLICATIONS

Finzgar, L. et al., "Use of NFC and QR Code Identification in an Electronic Ticket System for Public Transport" 19th International Conference on Software, Telecommunications and Computer Networks (SoftCOM), Sep. 2011, 6 pages.
Ben Whitaker, "Mobile Commerce Meets the Real World: Mobile Ticketing", Masabi Ltd., Sep. 17, 2009, 30 pages.
"Interview with Nat Parker of GlobeSherpa, finalist in Seed Oregon 2011", Oregon Enterpeneurs Network, http://www.youtube.com/watch?v=CUJDILSvDx8, Feb. 7, 2011, 3 pages.
ISA Korean Intellectual Property Office, International Search Report of PCT/US2013/063284, dated Jan. 13, 2014, WIPO, 5 pages.
Korean Intellectual Property Office, International Search Report of PCT/US2013/063284, WIPO, dated Jan. 13, 2014, 5 pages.

* cited by examiner

| Transit ticket system — Overview | | |
|---|---|---|
| Rider Application | Ticket Operations Management System (TOMS) | Fair Inspector |
| View & Purchase Tickets | E-commerce site (purchase tickets) | Validate Tickets |
| Plan Trips | Manage ticket features & prices | Provide data for Rider & Inspector Analytics |
| Arrival Times (Bus, Street Car, Trains) | Provision Fare Inspector devices | |
| Receive real-time alerts | Provide Restful Web Services for mobile interaction | |
| Transfer Tickets | Provide accounting & transaction integration interfaces | |
| Provide data for Rider analytics | Aggregate Rider analytics | |

FIG. 2

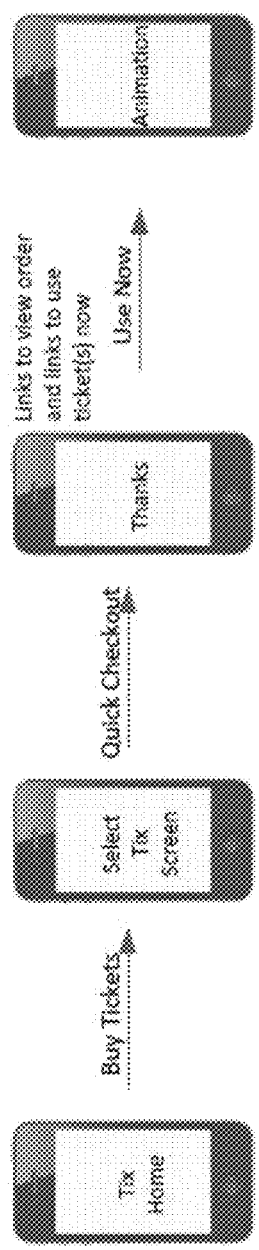

REGISTRATION SCREEN

Enter your account and billing info. below and we'll store it (securely!) so your ticket purchases are fast and easy!

Personal Information

| FULL NAME |
| EMAIL ADDRESS |
| MOBILE NUMBER |
| PASSWORD |

Billing info

| SCAN YOUR CARD |
| CREDIT CARD NUMBER |
| EXPIRATION MONTH |
| EXPIRATION YEAR |
| SECURITY CODE |
| NAME THIS CARD |

Billing Address

| STREET ADDRESS |
| CITY |
| STATE |
| ZIP CODE |
| COUNTRY |

[ CANCEL ]  [ CREATE ACCOUNT ]

FIG. 9

CHECKOUT
You are purchasing:

| | |
|---|---|
| 2 adult day passes | $10 |
| 2 youth day passes | $10 |
| Total | $20 |

[BUY USING STORED CARD] → Uses stored info thank you screen

[USE A DIFFERENT CARD] → Opens card screen

THANK YOU!
Your purchase is complete

[USE ALL TICKETS NOW] → To Animation

[USE SOME TICKETS NOW] → Multi-select in IOS

If you plan to use your tickets later they can be found in my tickets

CHECKOUT SCENARIOS

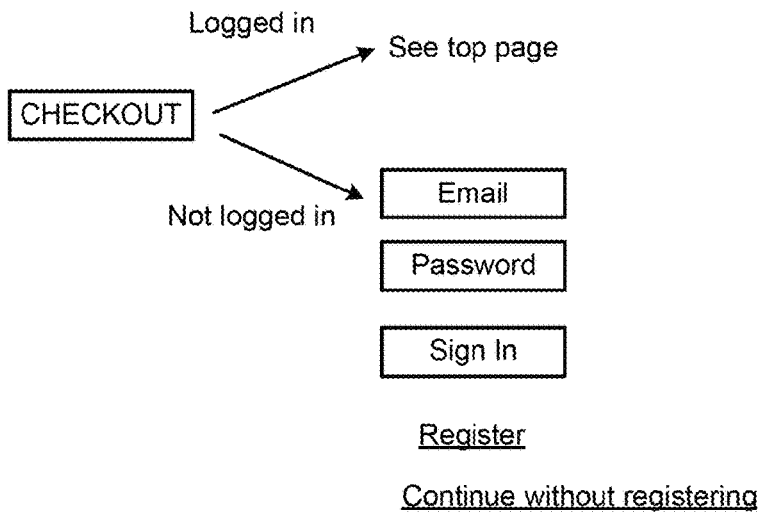

FIG. 10

| Analytics | Tickets | Enforcement | Promotions | Loyalty |

Dashboard

OVERVIEW | LINE STATS | RIDER STATS | TICKET STATS

Email me daily or weekly digests of this data

Today  Week  Month  YTD  Custom Date Range

This tab serves to surface the most important, relevant data from all of the tabs/data into a high-level, at-a-glance kind of view.

Data sets include:

- Live Stats – Running totals of Ticket Sales, # Riders, # System Users, # Tickets Used, # Check-ins
- Ridership/system users up/down from previous day (or week, month, custom date range)
- Ridership Spend – Ticket sales numbers by fare+rider type
- New vs. Returning – System users
- Line Activity – Top 10-20 lines showing most/fewest riders
- Most Lucrative Lines – Algorithm factoring ridership, ticket types used on it, frequency of runs?
- Satisfaction – Positive vs. negative

Date range: Today
- Yesterday
- This Week
- This Month
- YTD
- Full History
- Custom Range

Time range: All day
- 12am – 5am
- 5am – 7am
- 7am – 9am
- 10am – 12pm
- 12pm – 3pm
- 3pm – 5pm
- 5pm – 7pm
- 7pm – 10pm
- 10pm – 12am
- Custom Range

By scan info: All scan statuses
- Pass
- Fail

All scan methods
- SMS
- QR Code

By inspector: Pol
- H. Potter
- J. Potter

By transit type/line: All transit types
- Bus
- MAX
- Streetcar

All lines
- 1
- 2
- 3

All lines
- Blue
- Green
- Red
- Yellow

By ticket info: All rider types
- Adult
- Youth
- Honored Citizen
- ParaLift All fare types
- 2-hr
- Day
- Week
- Month
- Annual All zone types
- All zones
- 1 zone
- 2 zone
- 3 zone

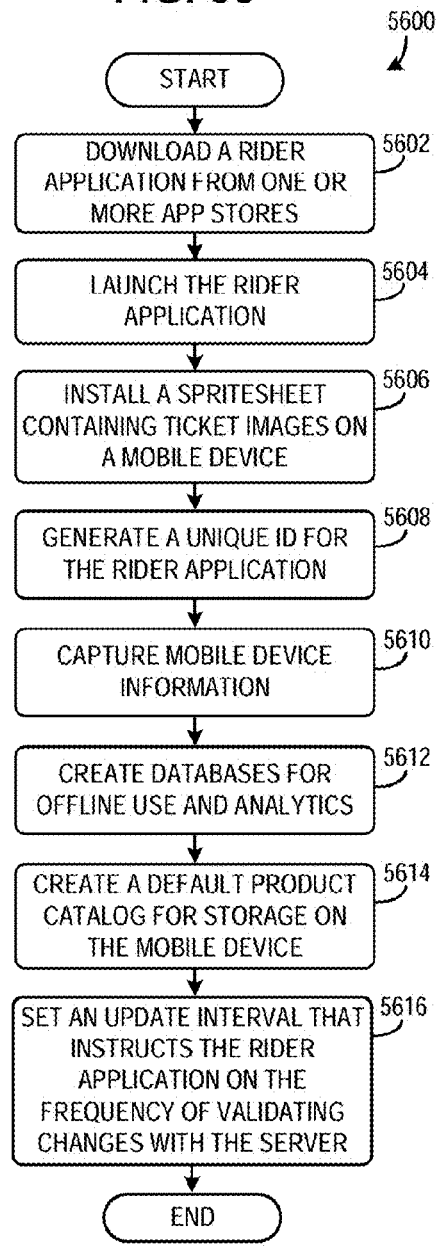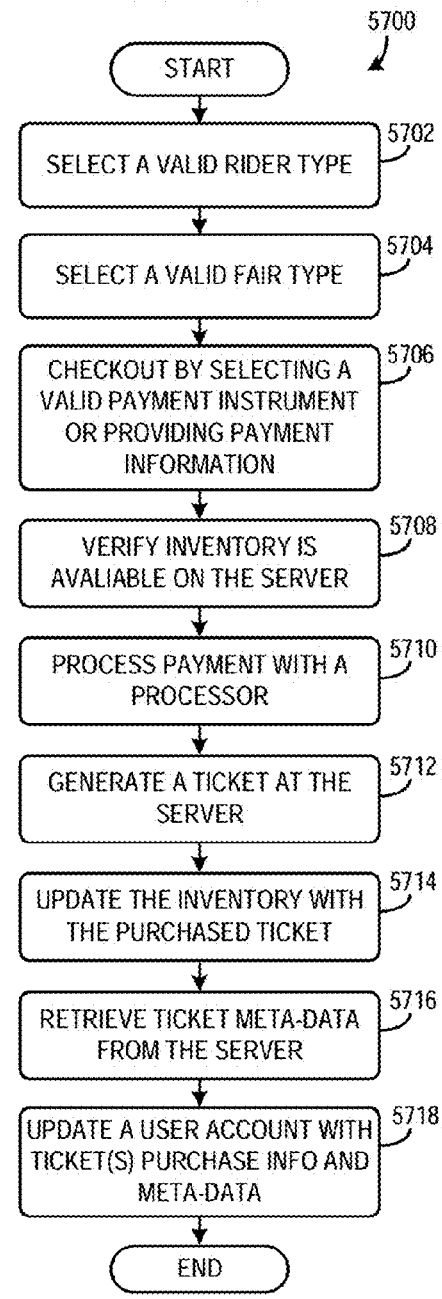

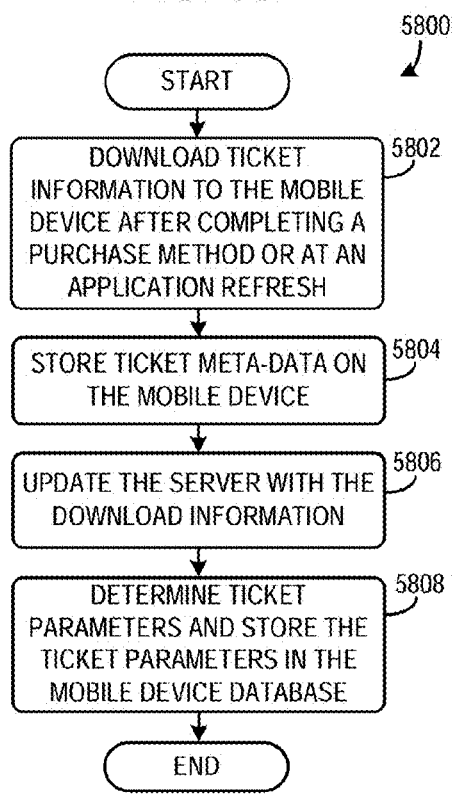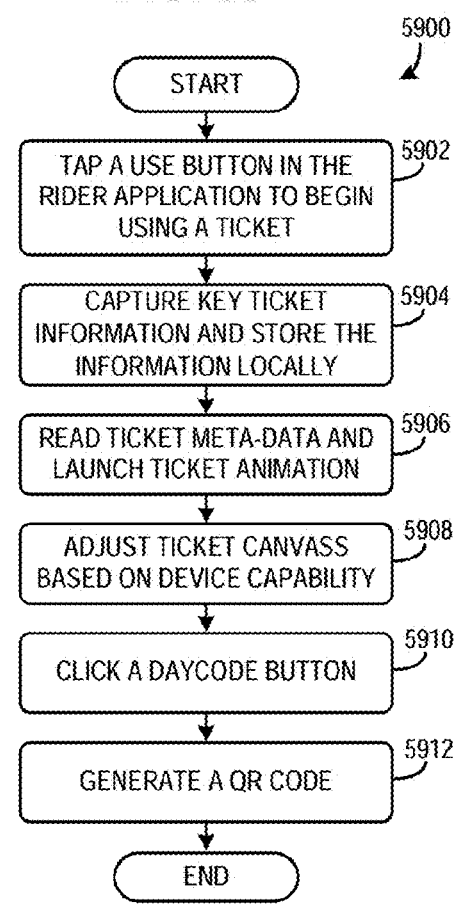

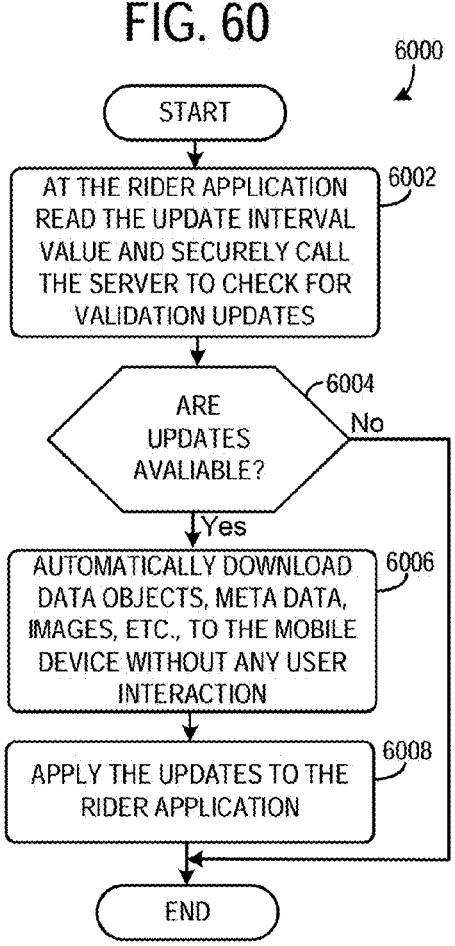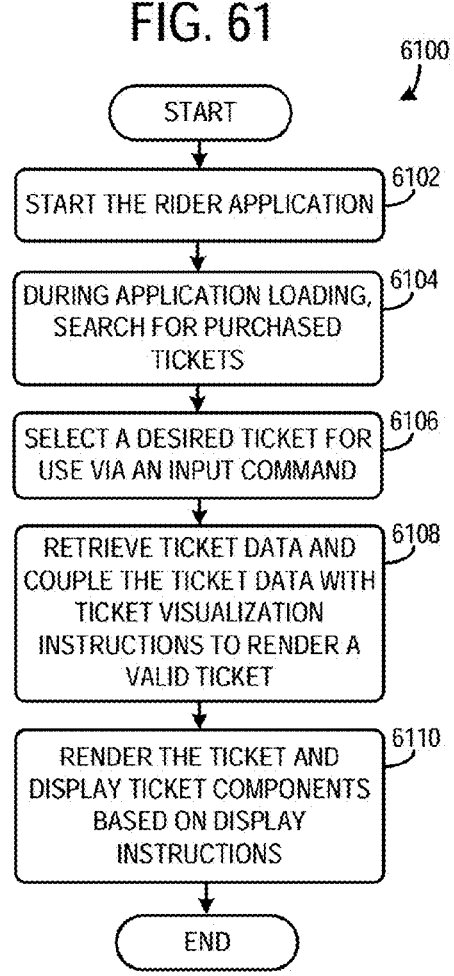

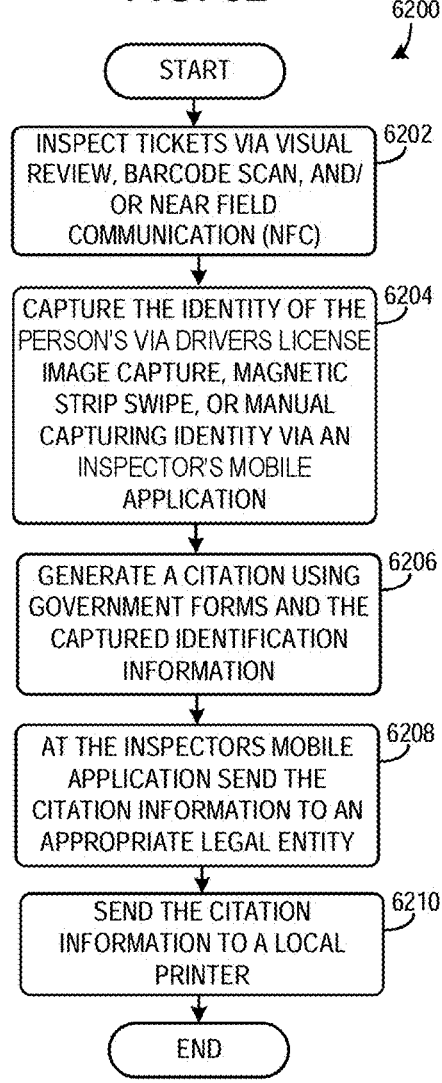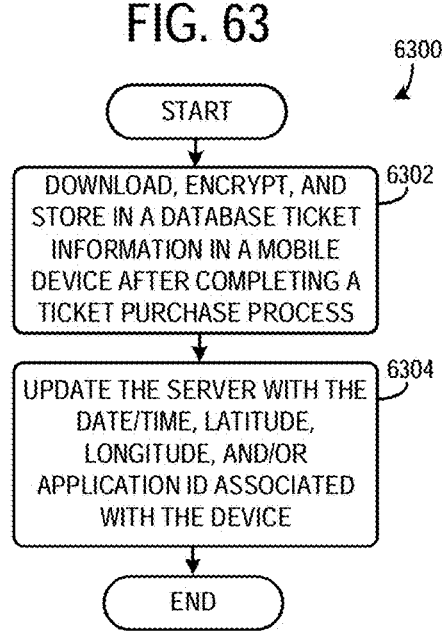

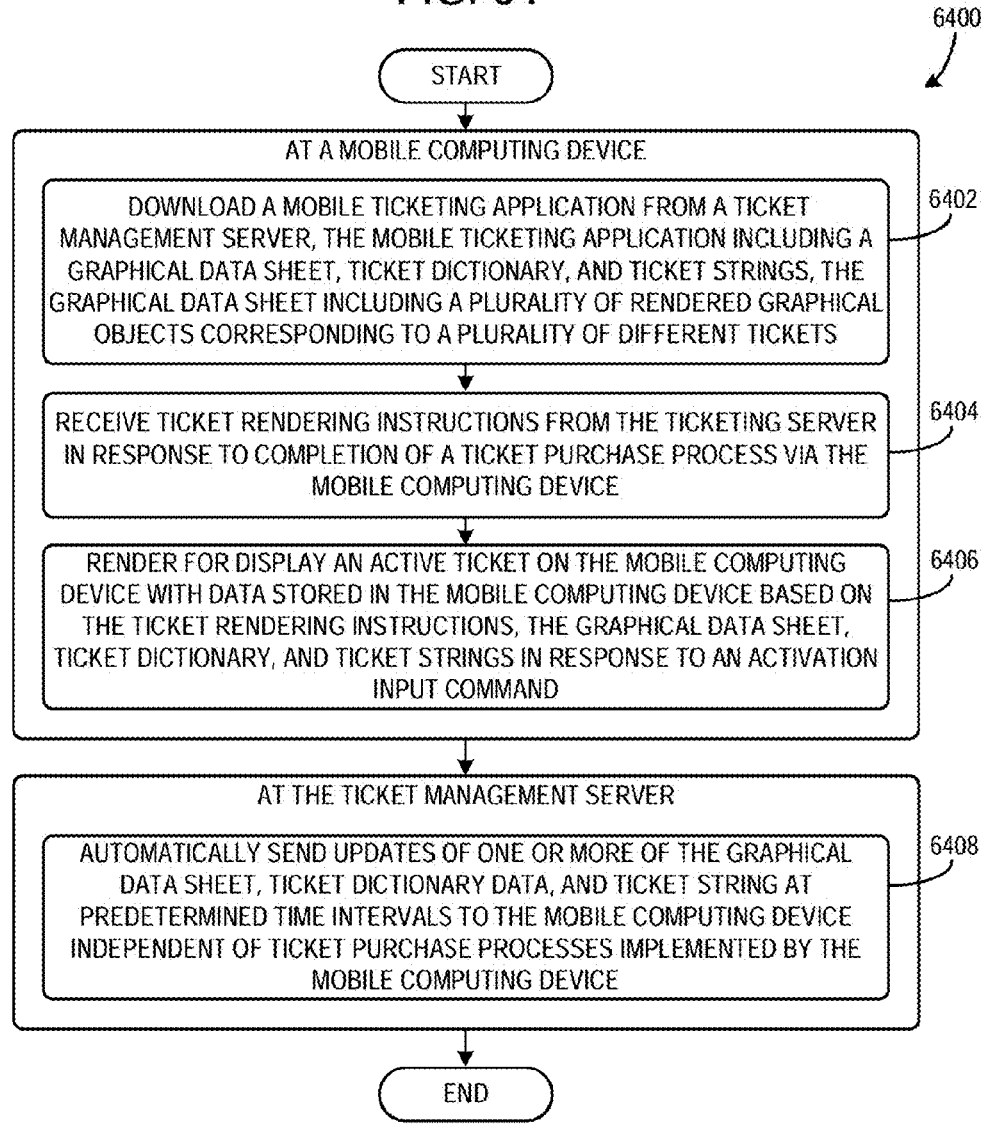

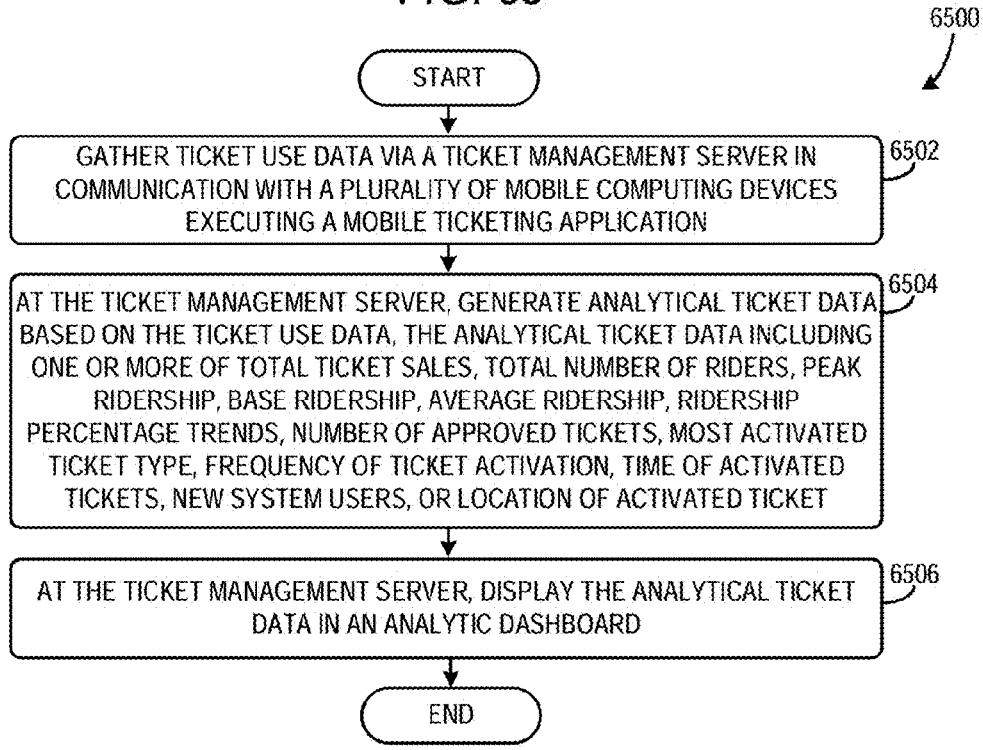

MOBILE TICKETING

CROSS REFERENCE TO RELATED APPLICATION

This application claims priority to U.S. Provisional Patent Application No. 61/744,886, filed Oct. 3, 2012 entitled "MOBILE TICKETING" the entire contents of which are hereby incorporated herein by reference for all purposes.

FIELD

The present disclosure relates generally to apparatus, systems and methods for transit mobile ticketing.

BACKGROUND AND SUMMARY

Transit agencies typically issue traditional paper tickets that may be validated once a rider boards a bus, train, or other transportation mode operated by the transit agency. The widespread use of mobile computing devices, such as smart phones, has provided an additional platform on which transit tickets may be issued. However, the technology for implementing such mobile transit tickets may be costly, unreliable, and inefficient.

The inventors have recognized these problems and developed a transit ticket system including a mobile computing device configured to (i) download a mobile ticketing application from a ticket management server, the mobile ticketing application including a graphical data sheet, a ticket dictionary, and ticket strings, (ii) receive ticket rendering instructions from the ticket management server in response to completion of a ticket purchase process via the mobile computing device, and (iii) render for display an active ticket on the mobile computing device with data stored on the mobile computing device based on the ticket rendering instructions, the graphical data sheet, ticket dictionary, and ticket strings in response to an activation input command. In this way, the local application is able to render and present the ticket for use regardless of the mobile device's connectivity with the ticket management server. As a result, the user can use the ticket in offline locations, including tunnels, out-of-range locations, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIGS. 1 and 2 schematically show an overview of the transit ticket system of the present disclosure, including a rider application, ticket operations management system (TOMS), and fare inspector.

FIGS. 6-8 are flow diagrams illustrating example processes for purchasing tickets using the transit ticket system of FIG. 2.

FIGS. 9-10 schematically show an example registration system of the tickets operation management system of FIG. 2.

FIGS. 11-15 show exemplary graphical user interfaces of an analytics function of the tickets operation management system of FIG. 1.

FIGS. 16-27 show exemplary graphical user interfaces of a ticketing function including the Ticket Designer of the tickets operation management system of FIG. 1.

Figure 28:
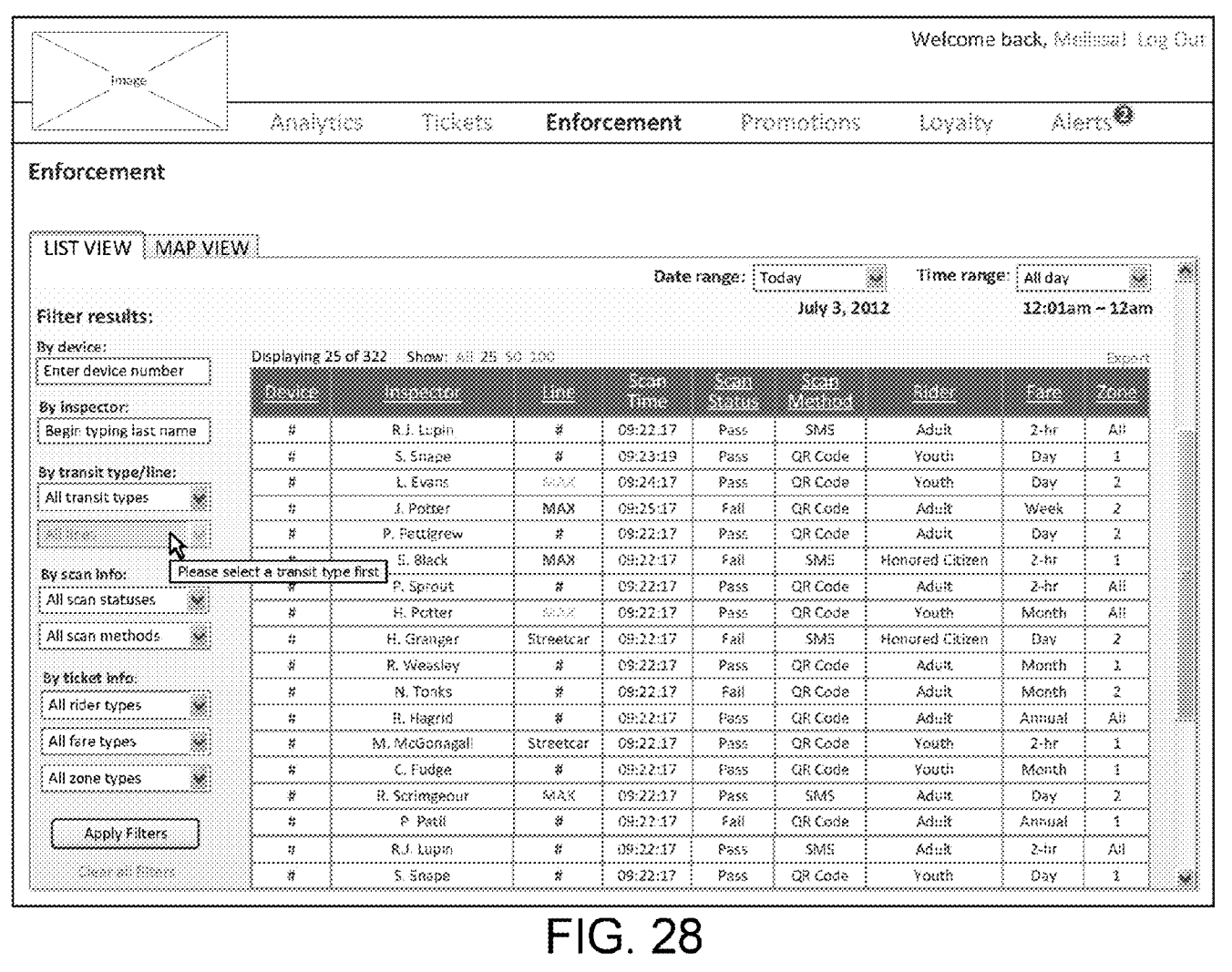

FIGS. 28-32 show exemplary graphical user interfaces of an enforcement function of the tickets operation management system of FIG. 1.

FIG. 56 shows a method for installing and launching a rider application.

FIG. 57 shows a method for purchasing a ticket via a transit ticket system.

FIG. 58 shows a method for downloading a ticket via a transit ticket system.

FIG. 59 shows a method for using a ticket via a transit ticket system.

FIG. 60 shows a method for updating validation changes in the rider application.

FIG. 61 shows a method for using a ticket via a rider application executed on a mobile computing device.

FIG. 62 shows a method for issuing citations via a mobile device of a ticket inspector.

FIG. 63 shows a method for downloading a ticket.

FIG. 64 shows a method managing a transit ticket system.

FIG. 65 shows a method for gathering analytic information from a transit ticket system.

DETAILED DESCRIPTION

Aspects of this disclosure will now be described by example and with reference to the illustrated embodiments. Components and other elements that may be substantially the same in one or more embodiments are identified coordinately and are described with minimal repetition. It will be noted, however, that elements identified coordinately may also differ to some degree. It will be further noted that the drawings included herein are schematic and generally not drawn to scale. Rather, the various drawing scales, aspect ratios, and numbers of components shown in the figures may be purposely distorted to make certain features or relationships easier to see. Therefore, the figures are not intended to be technically precise, but are drawn to ease understanding.

Figure 1:
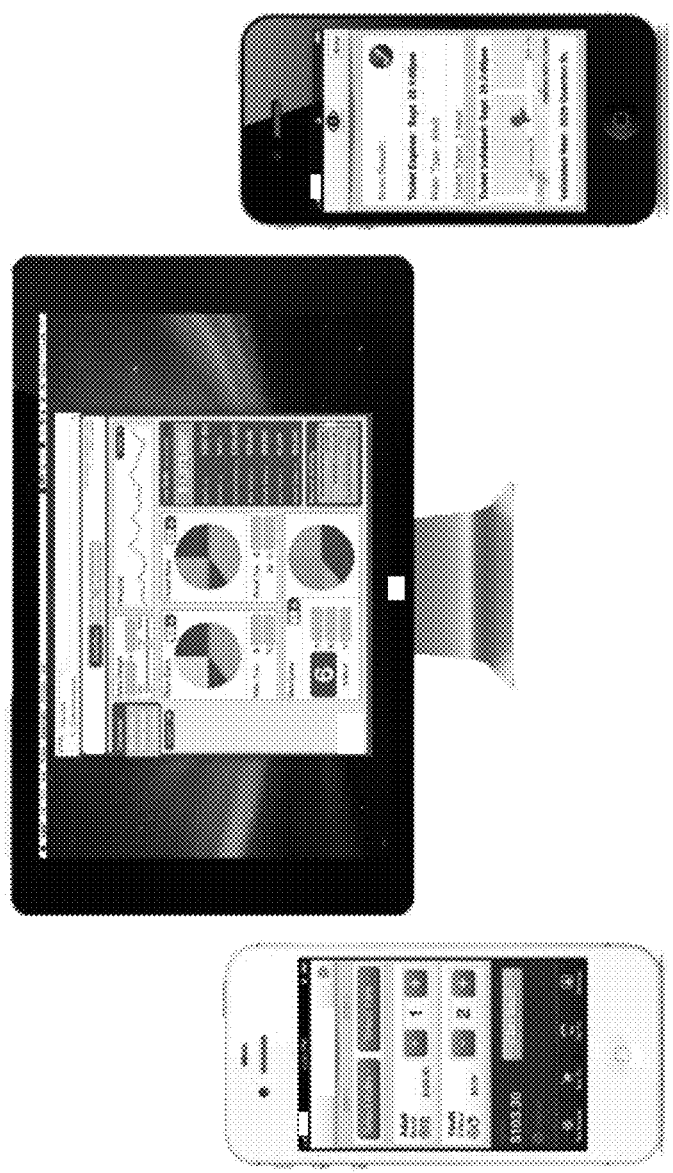
Figure 3:
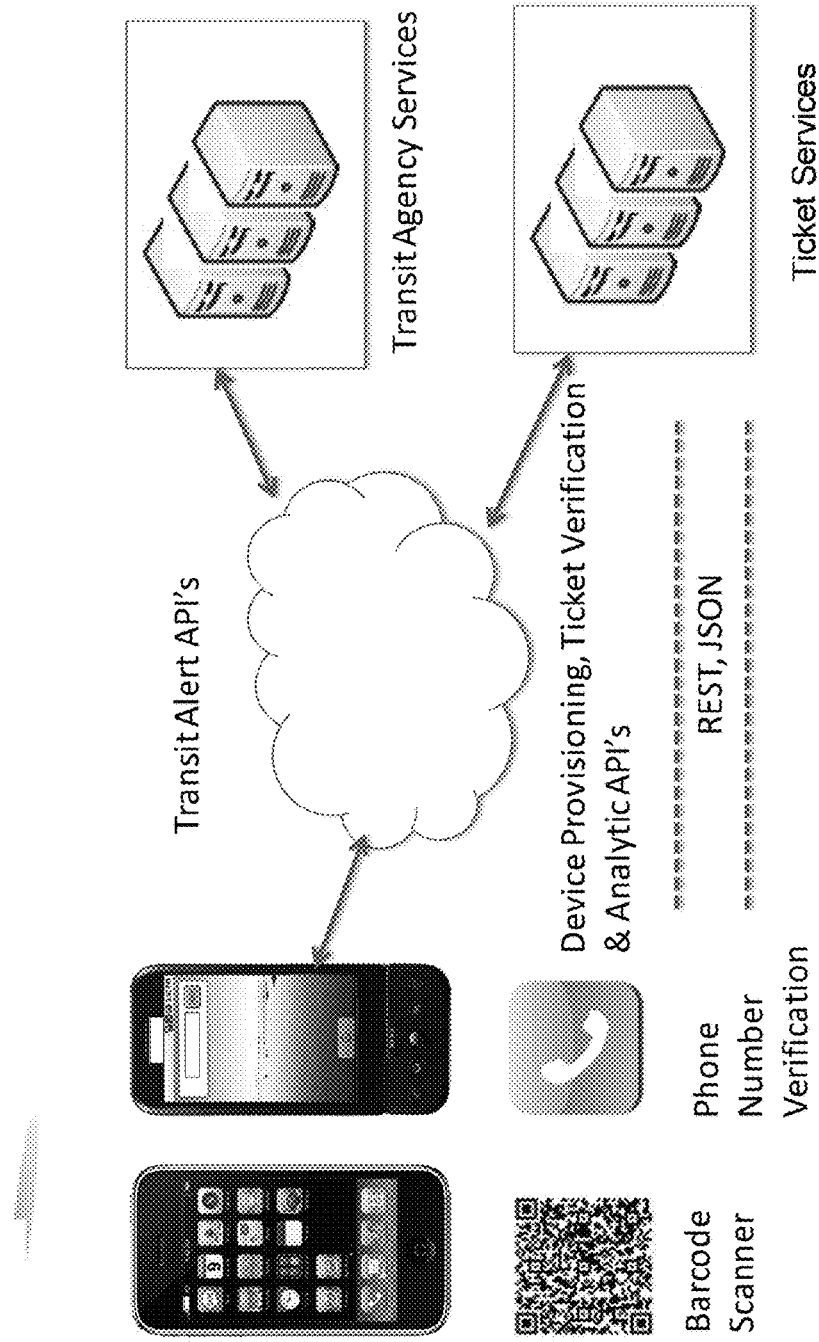
FIG. 3 schematically shows an overview of the fare inspector of FIG. 2.
Figure 4:
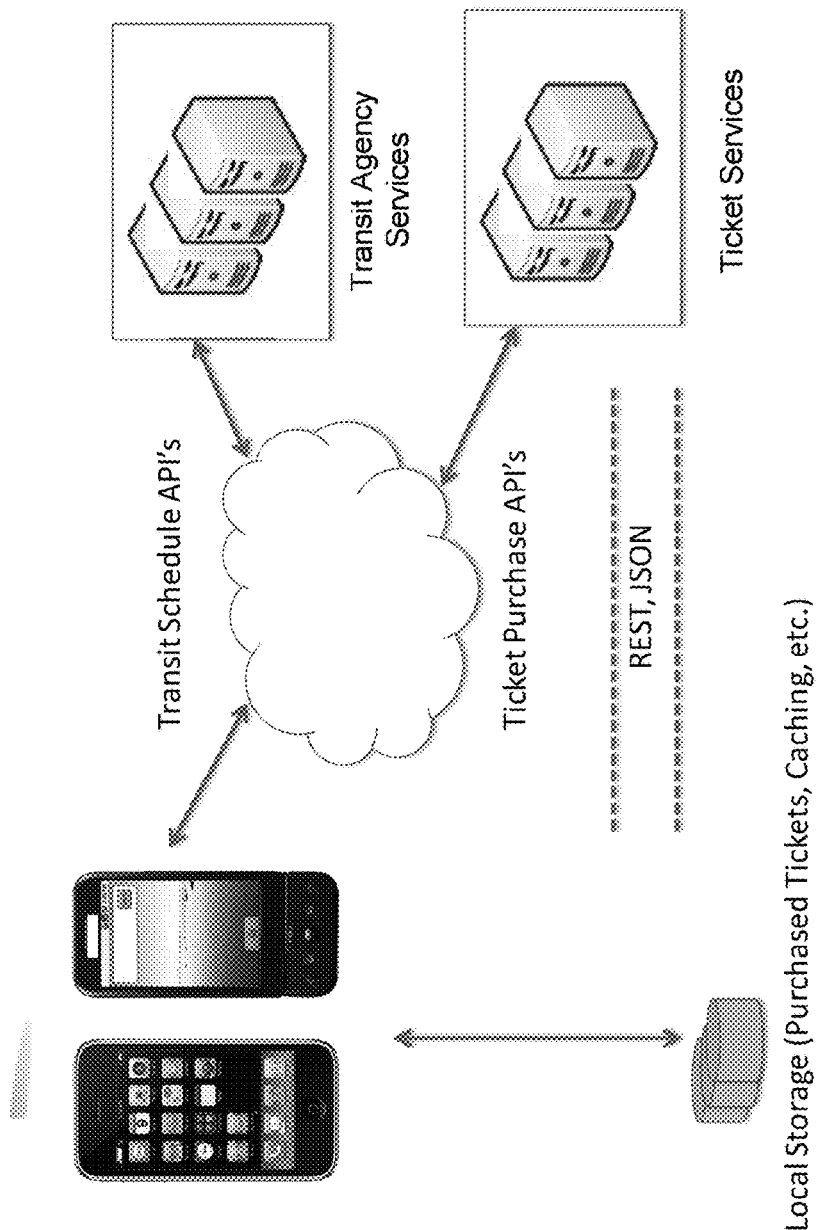
FIG. 4 schematically shows an overview of the rider application of FIG. 2.
Figure 5:
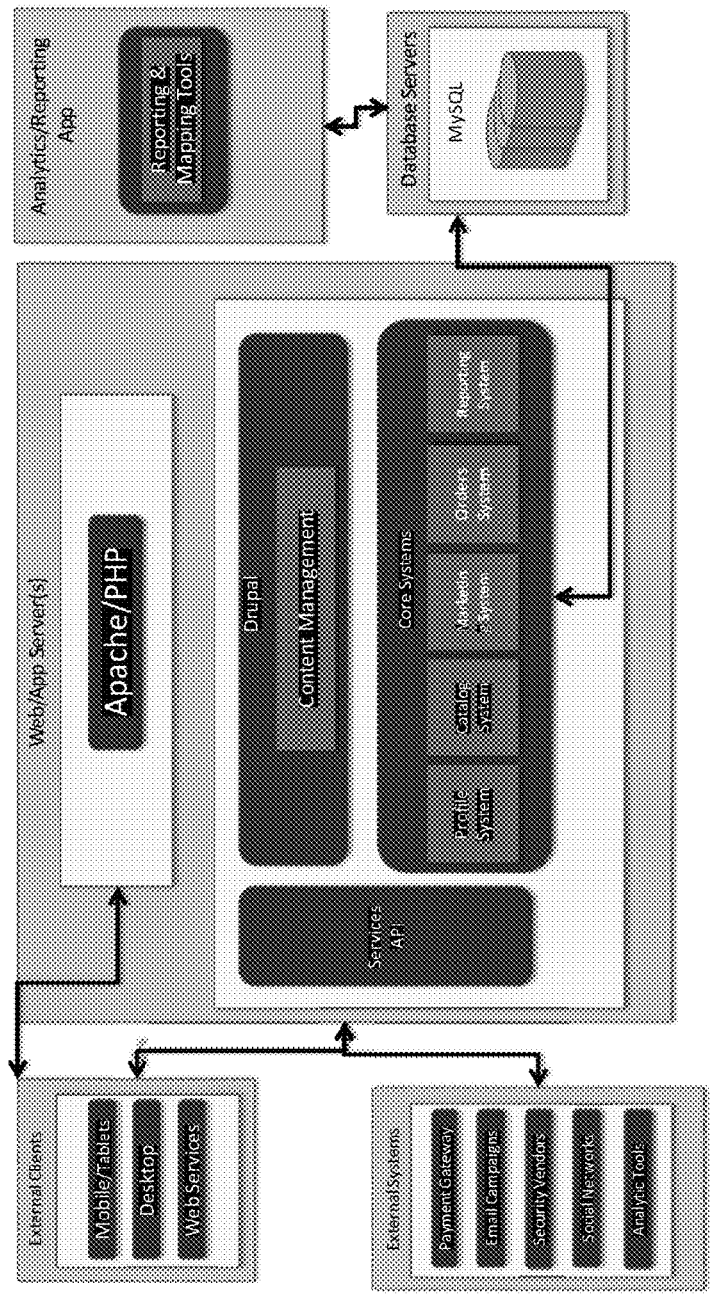
FIG. 5 schematically shows an overview of the tickets operation management system of FIG. 2.

Embodiments are disclosed herein relating to creating, managing, and dispersing mobile transit tickets. The transit ticket system may include a rider application configured to operate on a mobile device of a user, a tickets operation management system to create, allocate, and disperse the transit tickets, and a fare inspector system for validating the tickets. The rider application may be more generally referred to as a mobile ticketing application. FIGS. 1 and 2 schematically show an overview of the transit ticket system of the present disclosure, including a rider application, ticket operations management system (TOMS), and fare inspector. Each component of the transit ticket system is illustrated in greater detail in FIGS. 3-5, in which FIG. 3 schematically shows an overview of the fare inspector, FIG. 4 schematically shows an overview of the rider application, and FIG. 5 schematically shows an overview of the tickets operation management system. It will be appreciated that TOMS may include a ticket management server. Additionally, it will be appreciated that the fare inspector may include an inspector application executed on a mobile computing device. Furthermore, the rider application may be in electronic communication with the ticket management server via a network (e.g., the Internet, a wide area network (WAN), local area network (LAN), etc.).

Figure 6:
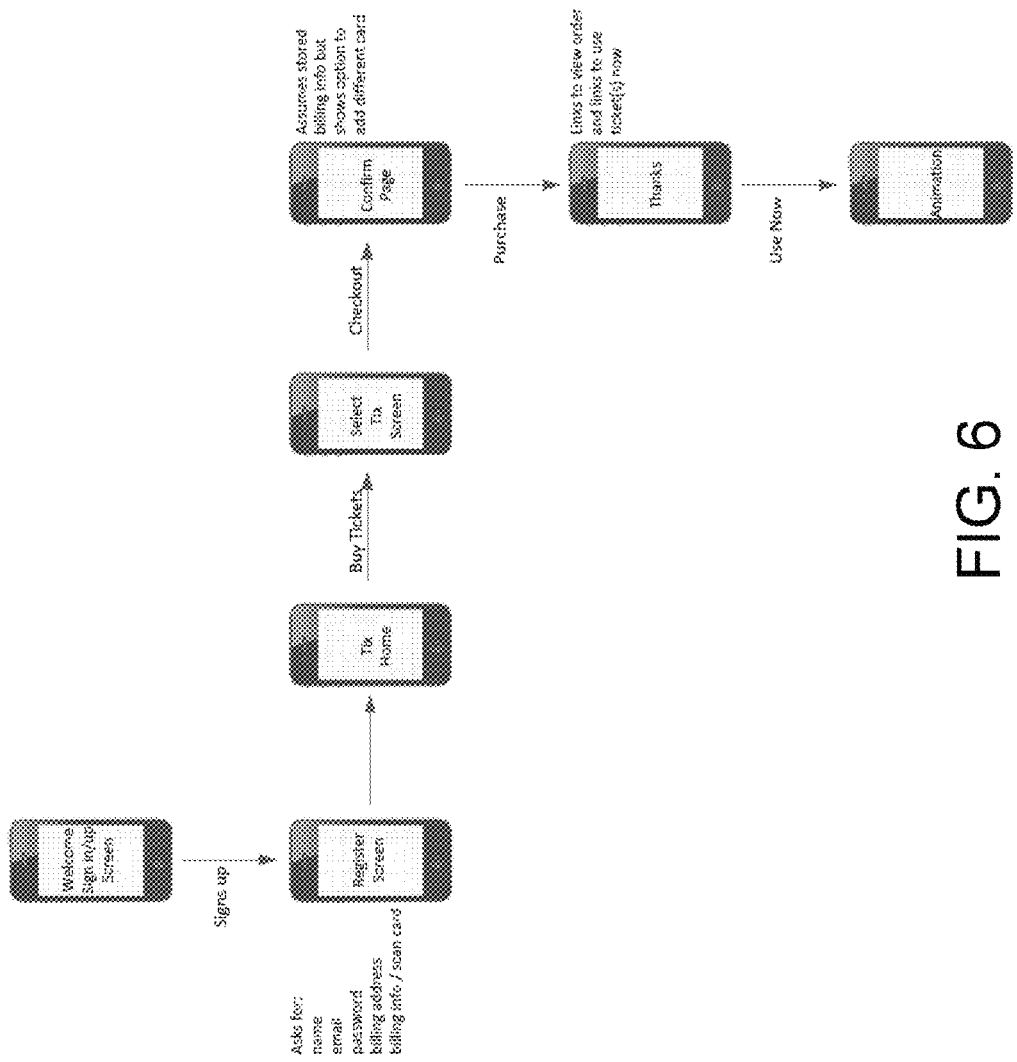
Figure 7:
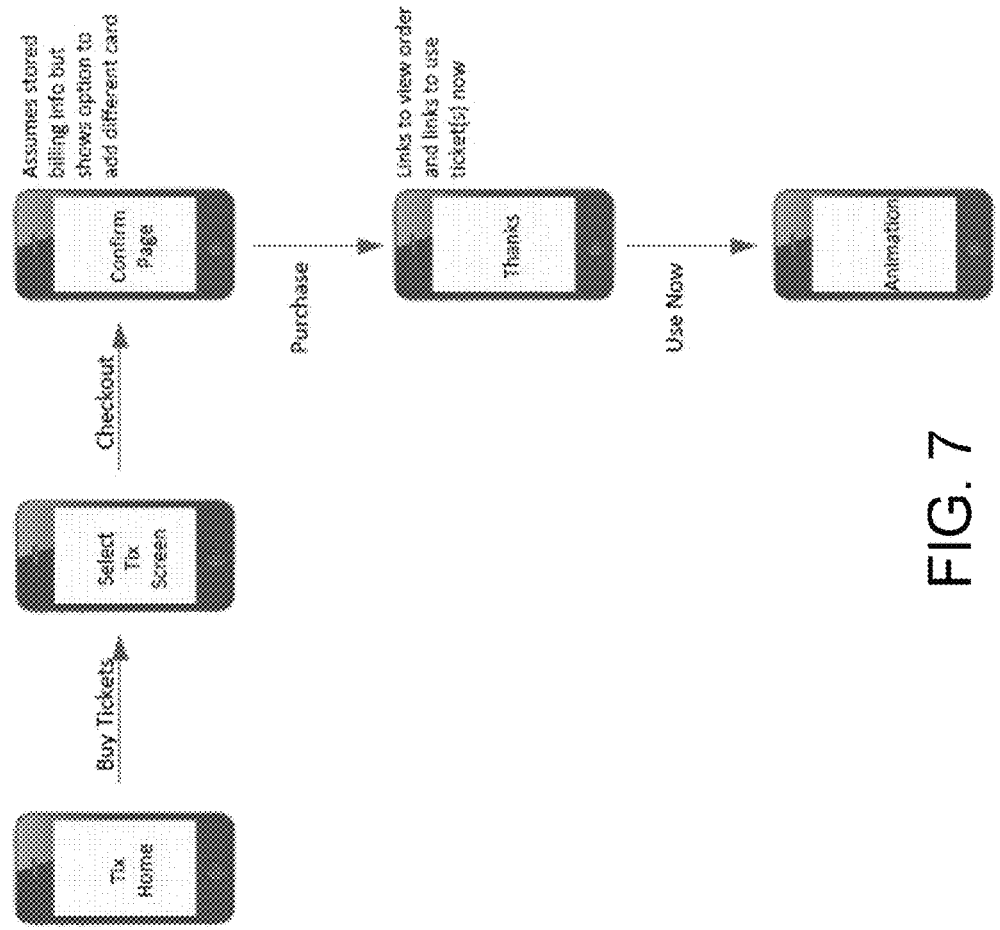

The transit tickets may be created by the tickets operation management system using a Transit Ticket Designer that receives input from a user indicative of one or more images the user desires to include as part of the ticket design. The Ticket Designer provides a platform in which the user may change multiple aspects of the images, including color, position, and animation, in order to create an individualized transit ticket. The ticket may then be stored and, upon a request from the mobile device of the user, be made available for rendering on the user's mobile device. The rendered ticket may then be presented when the user boards a transit vehicle. FIGS. 6-8 illustrate example processes for registering a user and purchasing tickets using the transit ticket system of the present disclosure. FIG. 6 shows a first time user purchase scenario. FIG. 7 shows a registered user purchase scenario. The purchase scenario shown in FIG. 7 assumes that the user is logged in and has a registered account in the system. FIG. 8 shows a quick purchase scenario for a registered user. The purchase scenario shown in FIG. 8 assumes that the user is logged in and has a registered account in the system.

As shown in FIGS. 6-8, the ticket purchase may be implemented via a mobile device in the transit ticket system. However, other suitable computing devices may be used to purchase tickets. For instance, tickets may be purchased via a network browsing application executed on a desktop device. When the user buys tickets via a mobile ticketing application they may add tickets to a shopping cart. It will be appreciated that the mobile ticketing application may require a user to log-in or register if they do not have an existing account. After a user selects checkout, after selecting one or more ticket for purchase, they may be prompted to enter payment information (e.g., a credit card number) or selected stored payment information. If the user is entering new payment information they may be given the choice of registering the payment information for quick future use. After the payment information is confirmed tickets may be downloaded and stored in the mobile device.

FIGS. 9 and 10 illustrate an example user registration screen that a user may be presented with when registering to use the transit ticket system. Rather than utilizing quick response codes (QR codes) or other barcode identification mechanisms which may be scanned by a device on the transit vehicle, the transit tickets of the present disclosure may utilize visual identifiers that can be quickly recognized by employees of the transit agency, such as operators of the transit vehicles, in order to validate the tickets. In doing so, the installation of high-cost scanning devices onto each transit vehicle may be dispensed with. However, in some embodiments, QR codes may be displayed with the transit tickets in order to allow the transit agency to scan the transit tickets to confirm validation. Furthermore, the transit tickets may be configured to change in visual appearance based on a location of the user, day of the week, type of transit ticket purchased by the user, etc., in order to provide additional security and reduce the likelihood that the transit tickets may be copied by non-paying individuals. In one example, the screens shown in FIGS. 9 and 10 may be presented in a sequential manner. Thus, the screen shown in FIG. 10 may be displayed in response to user input entered into the screen shown in FIG. 9.

In addition to providing a system for designing transit tickets, the present disclosure may also provide for embedding clickable advertisements into the transit tickets. Additional information may also be provided along with the transit ticket when the user requests a ticket in order to board a transit vehicle. For example, information regarding the user's location, approximate wait time until a desired transit vehicle arrives, etc., may also be presented with the ticket. Further, a virtual inventory management system may be provided to allocate, track, and reconcile the issuance of the transit tickets.

The ticket operations management system (TOMS) may enable administrators to interact with the system and create custom tickets, connect with customers, track activity, and enhance operations. The TOMS may be configured to track mobile ticket sales and transactions and ties those reports into an existing accounting system. Using the geo-analytics platform and time slider, you can view activity on a map for a particular period, and better understand who is buying and using mobile tickets, where and when. Additionally, the TOMS may include various functions accessible to a user (e.g., an administrator) through a graphical user interface, including but not limited to an analytics function, illustrated in FIGS. 11-15. The analytics function may provide various statistics on user ridership, such as overall number of tickets purchased, most popular transit line, etc.

Specifically, FIG. 11 shows an analytics dashboard which may include an overview tab, a line statistics tab, a rider statistics tab, and a ticket statistics tab. The analytics dashboard may be presented on a display of a computing device included in the TOMS of the transit ticket system. The line statistics tab may include an interactive systems map. The map may be filtered by transit type (e.g., bus, rail, etc.). Additionally, the map may include a heat map which may show concentration of ridership, ticket activation, ticket purchases, etc., graphically depicted where individual values are graphically represented via colors. Other map functions may include a show/hide icon button, a date range, a time range, a default setting, a zoom in/out button, a hover over lines for quick information functionality, and/or a data pane representing a selected map graphic such as a line, zone, and/or area of town. The line statistical data displayed via the analytics dashboard may include transit type, total number of riders by transit type, most/least used lines, and/or peak/minimum/average ridership for all the bus/rail lines. Additionally, analytical data which may be displayed on the dashboard may include total sale by fare/rider type, total number of riders by fare/rider type, peak/minimum/average ridership, ridership percentage trend, rider satisfaction, number of scan approved/rejected, number of new/returning users, and/or lucrativeness rating for a single bus/train line.

A rider statistics tab may also be displayed on the dashboard shown in FIG. 11. The rider statistics dashboard may communicate both quantitative and qualitative data about the behaviors, patterns, perceptions of commuters using the mobile ticketing application. The data sets may include:

a.) The users in the system (e.g., the new vs. returning users including a breakdown of number of rides and frequency of riding for return users).

b.) Total, peak, base, and/or average volume of ridership per day, hour, minute.

c.) Breakdown of riders by type (e.g., adult, youth, etc.).

d.) Overall ridership increase/decrease percentage since previous timeframe.

e.) How long after purchase riders activate tickets (would validate/contradict the assumption that most people are buying right before boarding).

f.) Rider sentiment (e.g., as submitted through the ticketing application), both overall and filterable by specific meta-data (e.g., line, time of day, stop, etc.).

g.) Social media feed pulling keywords, hash tags, etc., from an application program interface (API).

h.) Wordle based on aforementioned social media feed (e.g., a prevalence tag cloud).

i.) Overall brand health—% breakdown of satisfaction and overall sentiment as expressed via the in-app satisfaction rating and comments, as well as social media culling.

The ticket statistical tab may include statistical data relating to all the tickets in the system. The data may include:

a.) Total number of tickets purchased with ability to filter by fare, rider, or a combo of both.

b.) Ridership spending—Total ticket sales with same filter ability as above.

c.) Number of tickets used (with ability to see when/where, as well as how many are currently activated).

d.) Most activated ticket types in descending order.

e.) Frequency of individual ticket vs. multiple tickets activation.

f.) Number of people who purchase a single-use ticket (e.g., day ticket, 2 hour ticket) vs. a bundle (e.g., 7 day ticket, month ticket, year ticket, etc.).

g.) Purchase frequency heat mapping by date or location.

h.) How quickly riders activate a ticket after purchasing.

i.) How quickly riders activate a ticket after purchasing.

j.) Number of fare operator check-ins (e.g., all, approved, rejected) with associated meta-data (e.g., line, inspector, time of day, ticket type, etc.).

k.) Ticket sales in application vs. online.

l.) Order history.

Figure 12:
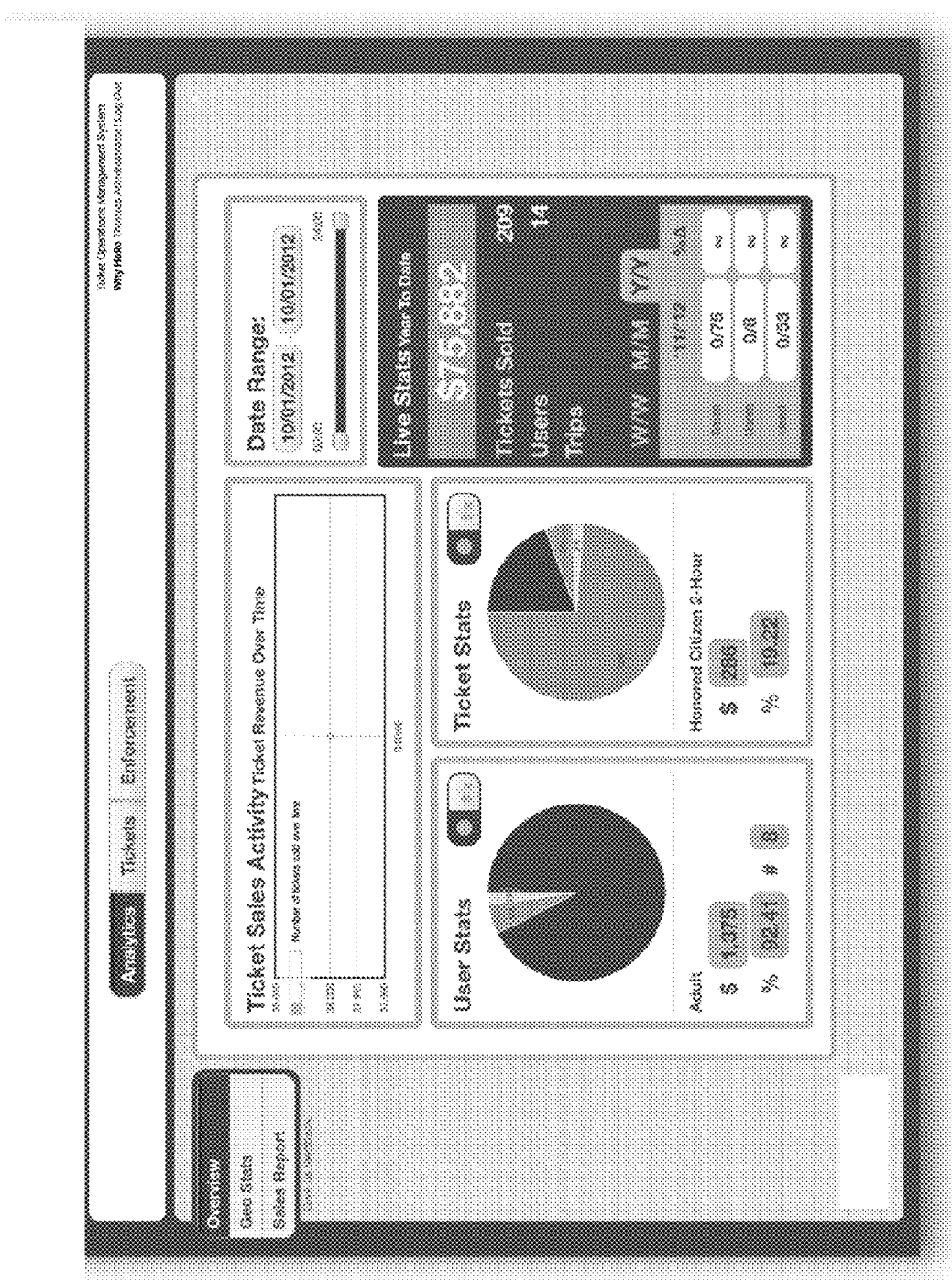
Figure 13:
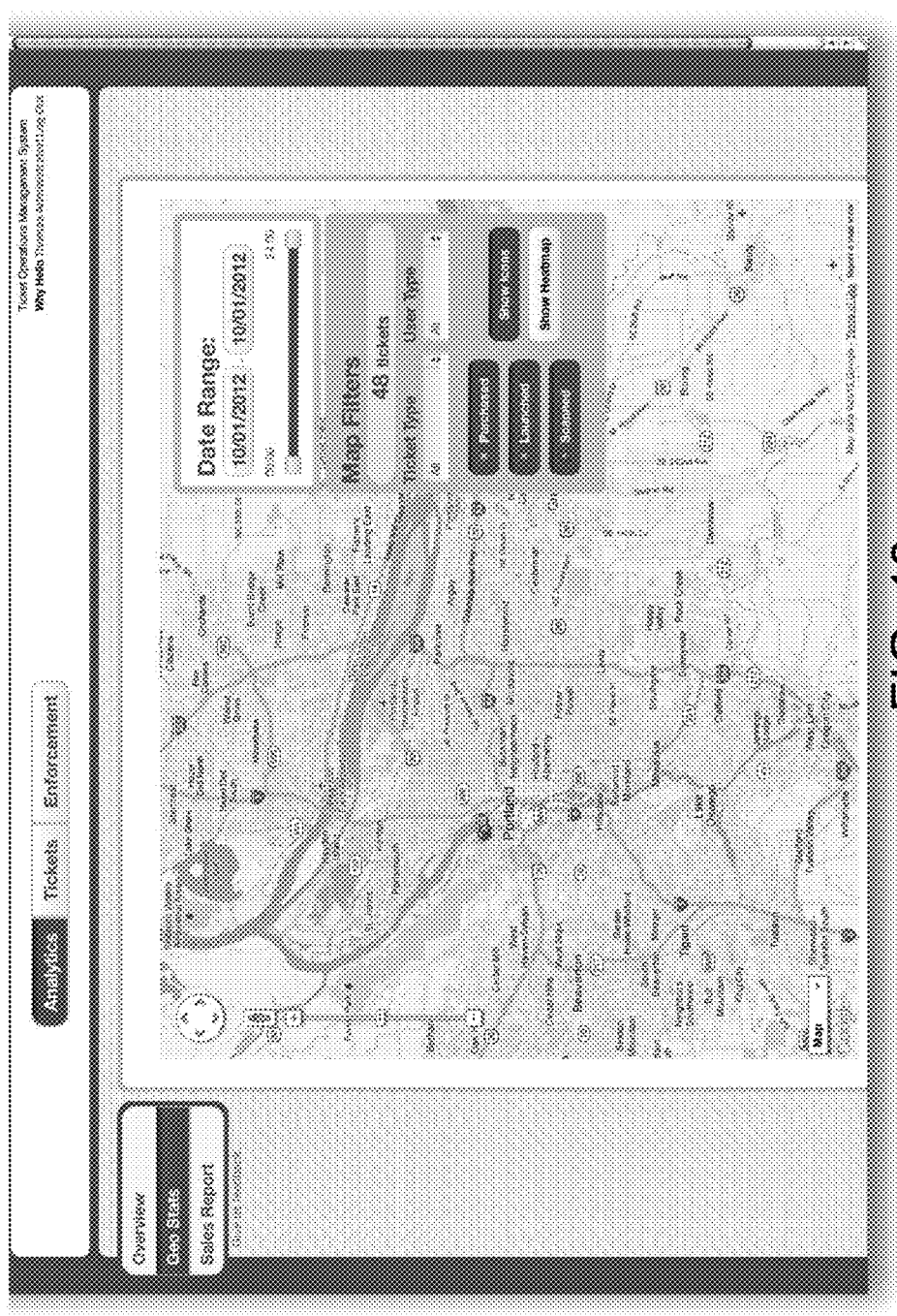

FIG. 12 shows various analytical data presented in a window via numerical, values, graphs (e.g., pie graphs, bar graphs, etc.). FIG. 13 shows an example analytics map including map filters such as ticket type, user type, etc. It will be appreciated that in one example the windows shown in FIGS. 12 and 13 may be accessed via a network browsing application such as a web-browser on a computing device in the transit ticket system.

Figure 14:
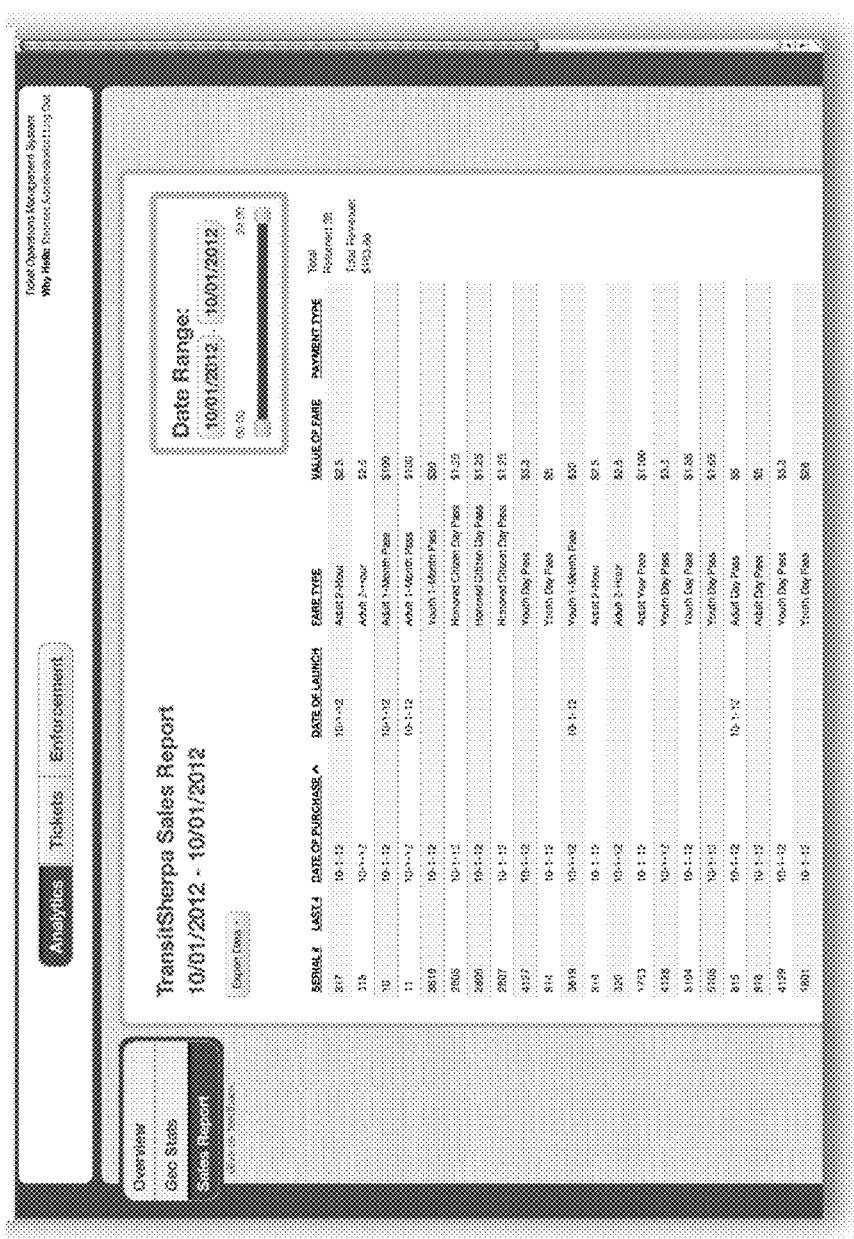
Figure 15:
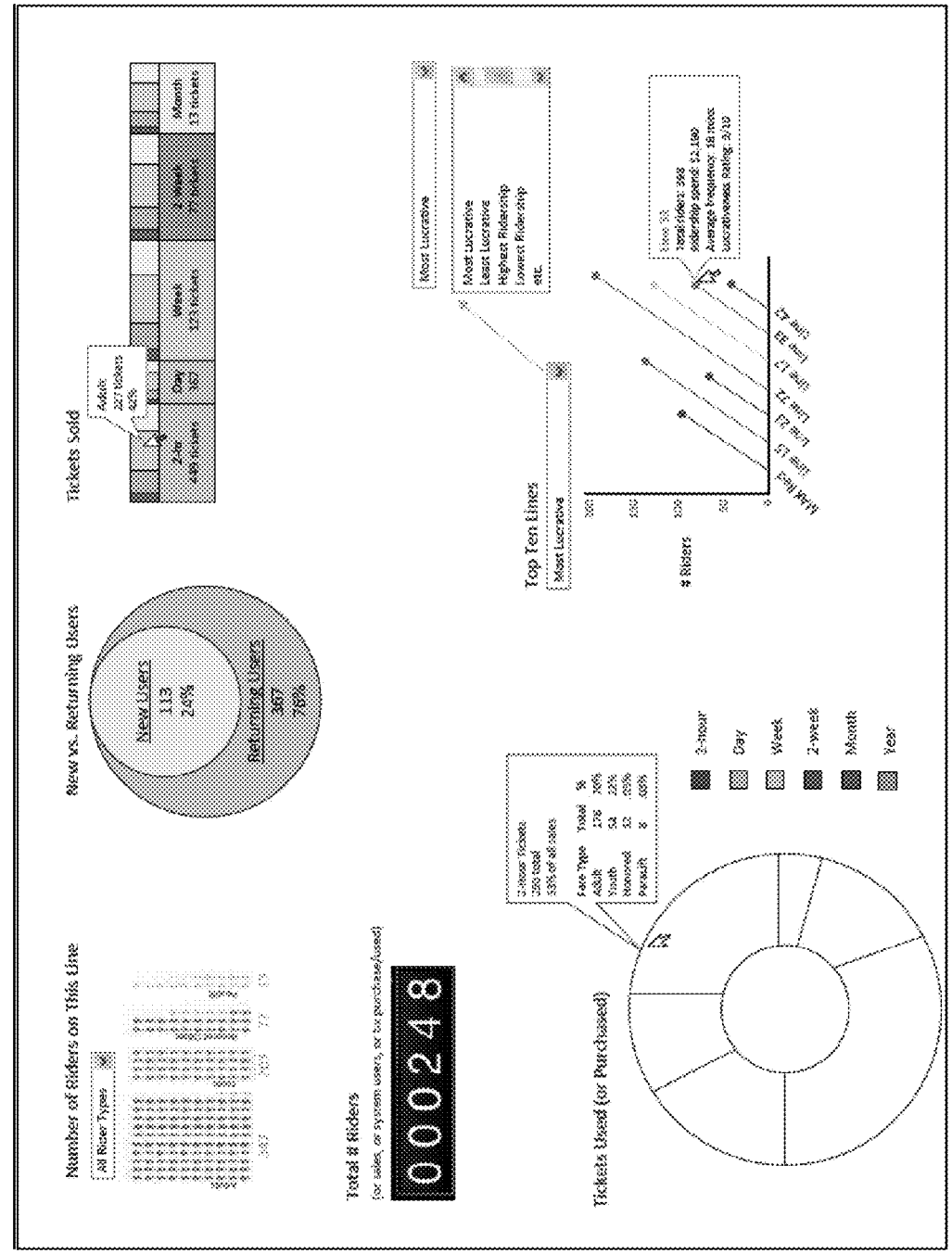

FIG. 14 shows a sales report presented in an example window of an analytics dashboard in the transit ticket system. The sales report may include various data such as serial number, a portion of social security numbers, date of purchase, date of launch, fare type, value of fare, and/or payment type.

The TOMS may also include a ticketing function illustrated in FIGS. 16-27 and an enforcement function, illustrated in FIGS. 28-32. Specifically, FIGS. 28-32 show a dashboard including enforcement data including a list view tab of enforcement data such as device, inspector, line, scan time, scan status, scan method, rider, and fare zone. Enforcement analytics may also be displayed in the enforcement dashboard. The enforcement analytics may include total number of inspections (e.g., all, passed, rejected, scan, SMS), inspector stats (e.g., most/least scans), and/or scan statistics and trends by line, time of day, day of week, and ticket type.

Figure 33:
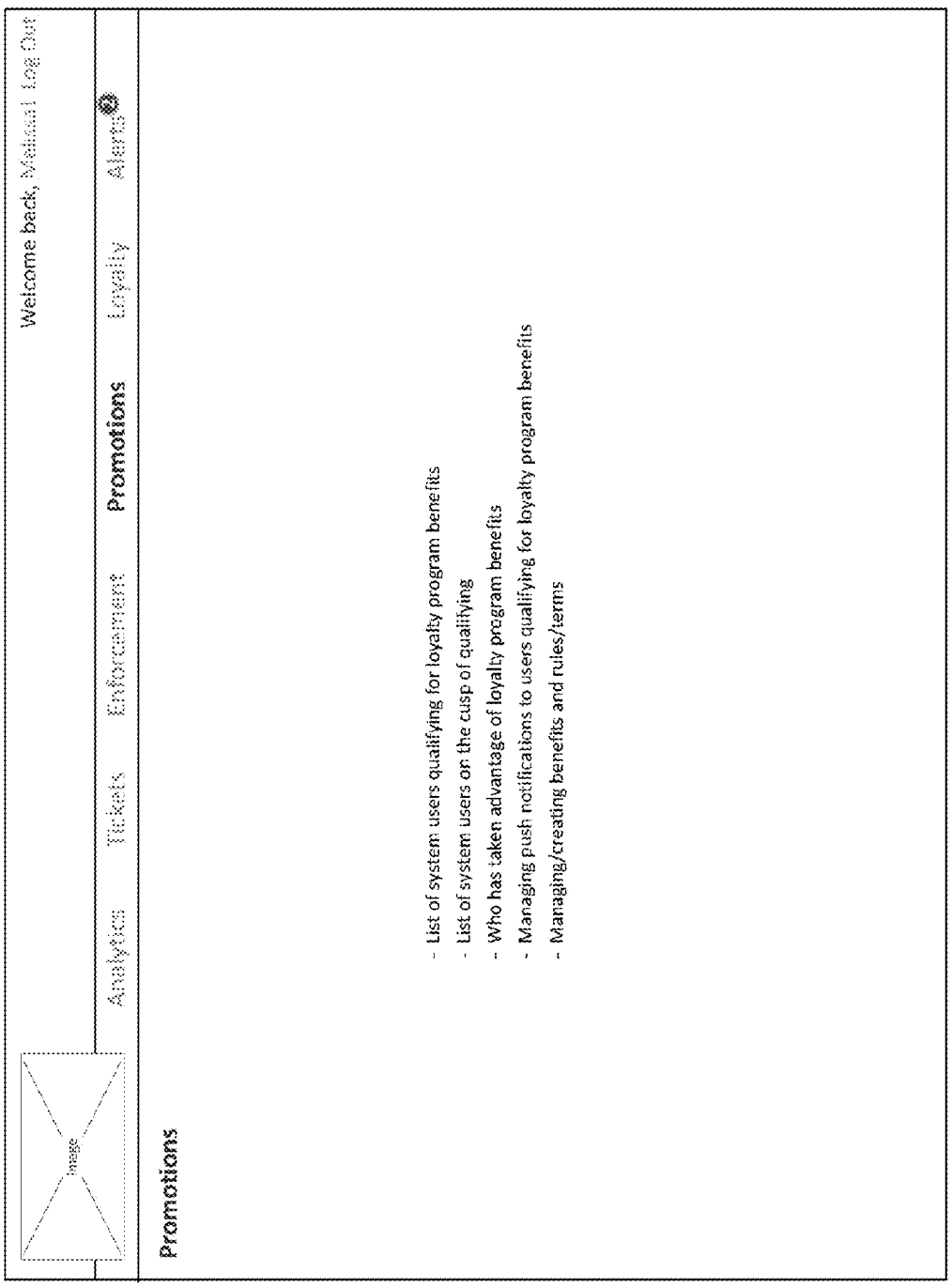
FIG. 33 shows an exemplary graphical user interface of a promotion function of the tickets operation management system of FIG. 1.

The TOMS may also include a promotions function illustrated in FIG. 33. Additionally, the TOMS may include a loyalty function tab which may display a list of system users qualifying for loyalty program benefits, a list of system users on the cusp of qualifying, and who has taken advantage of loyalty customer program benefits. The loyalty tab may also enable management of push notifications to users qualifying for loyalty program benefits, and/or management (e.g., creation) of benefits and/or rules/terms.

The ticketing function, which will be described in more detail below, may provide a platform for the transit agency to design and distribute tickets, and/or may provide a platform for the user to purchase and create tickets. The enforcement function may provide data regarding the number of validated tickets, mechanism of validation, and other information. The promotion and loyalty functions may provide for tracking user ticket purchases in order to grant the user various benefits. While each function of the ticket operations management system may be accessible to all users, in some embodiments certain functions may be restricted to a subgroup of users. For example, the enforcement function may only be accessible to the transit agency.

TOMS may support the use of various languages, including JavaScript, HTML 5, CSS, SQL, Objective C, Java, and PHP, implemented by various tools, such as Titanium Studio (Eclipse), XCode, Dreamweaver, and JIRA.

As explained above, the ticketing function of the TOMS may include a Transit Ticket Designer that provides tools to create transit tickets that contain selected animation, color, and design elements. Additionally, these tickets provide an alternative authentication method to visual authentication via QR Codes. These QR Codes are created using meta-data associated with the ticket and activities relating to the ticket (i.e., purchased, used, scanned).

The Ticket Designer provides the ability to upload a grouped set of images to create a transit ticket. Once a set of images is chosen, each of the images and their associated properties (color, height, width, etc.) may be manipulated to create a unique looking ticket. In addition to changing the look of the images, the images may also be placed at specific locations with a frame (e.g., HTML canvas) when the image is rendered and then moved (via animation) to new specific locations at a given speed. Once a ticket is rendered, an encrypted QR Code may be generated using meta-data about when the ticket was purchased and/or validated, along with information about the rider and the ticket type.

Example graphical user interfaces of the ticketing function including the Ticket Designer are illustrated in FIGS. 16-27. As previously discussed the Ticket Designer is included in the transit ticket system. FIGS. 16-21 illustrate example graphical user interfaces available to the user when viewing existing tickets in the transit ticket system.

Figure 16:
Figure 17:
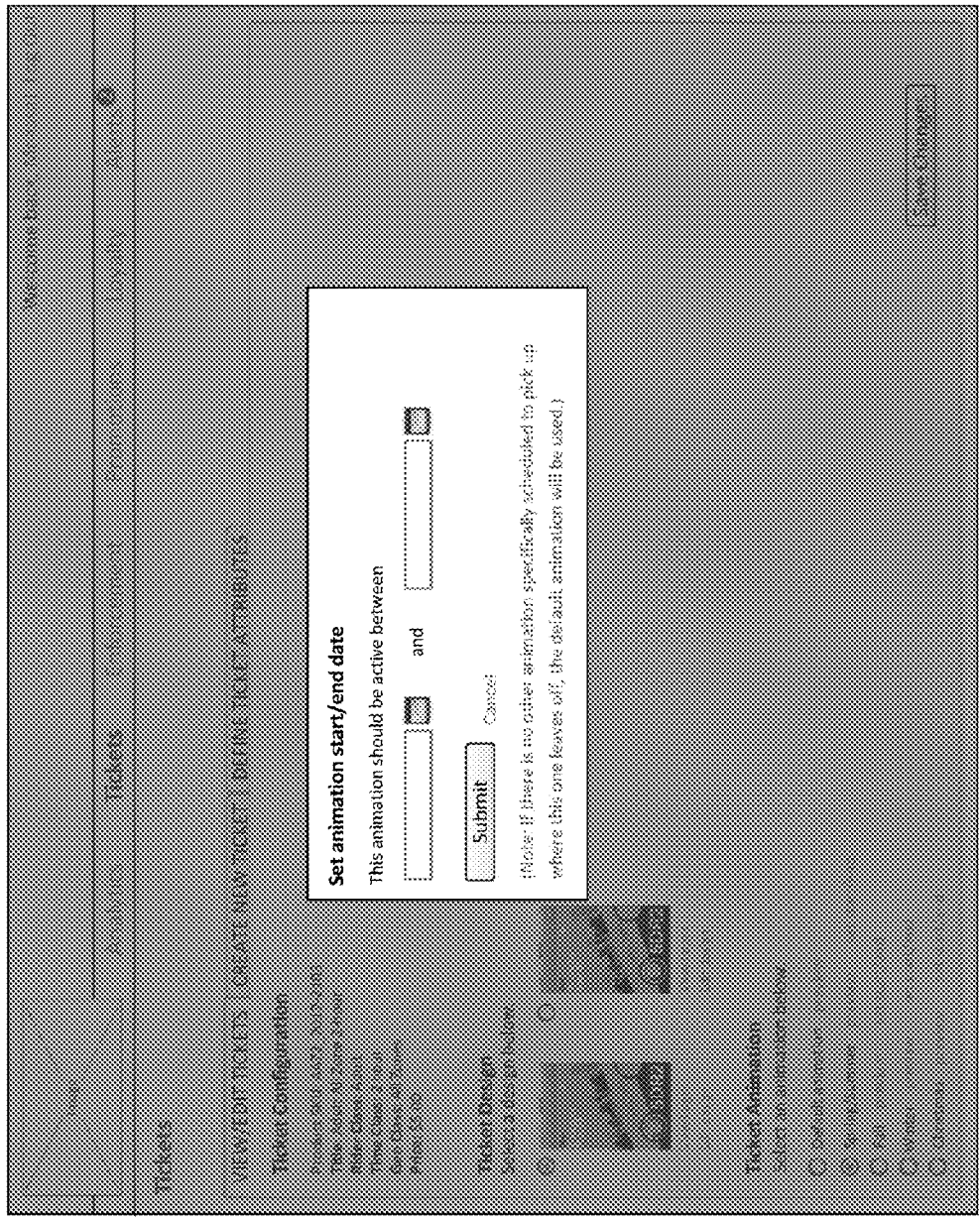
Figure 18:
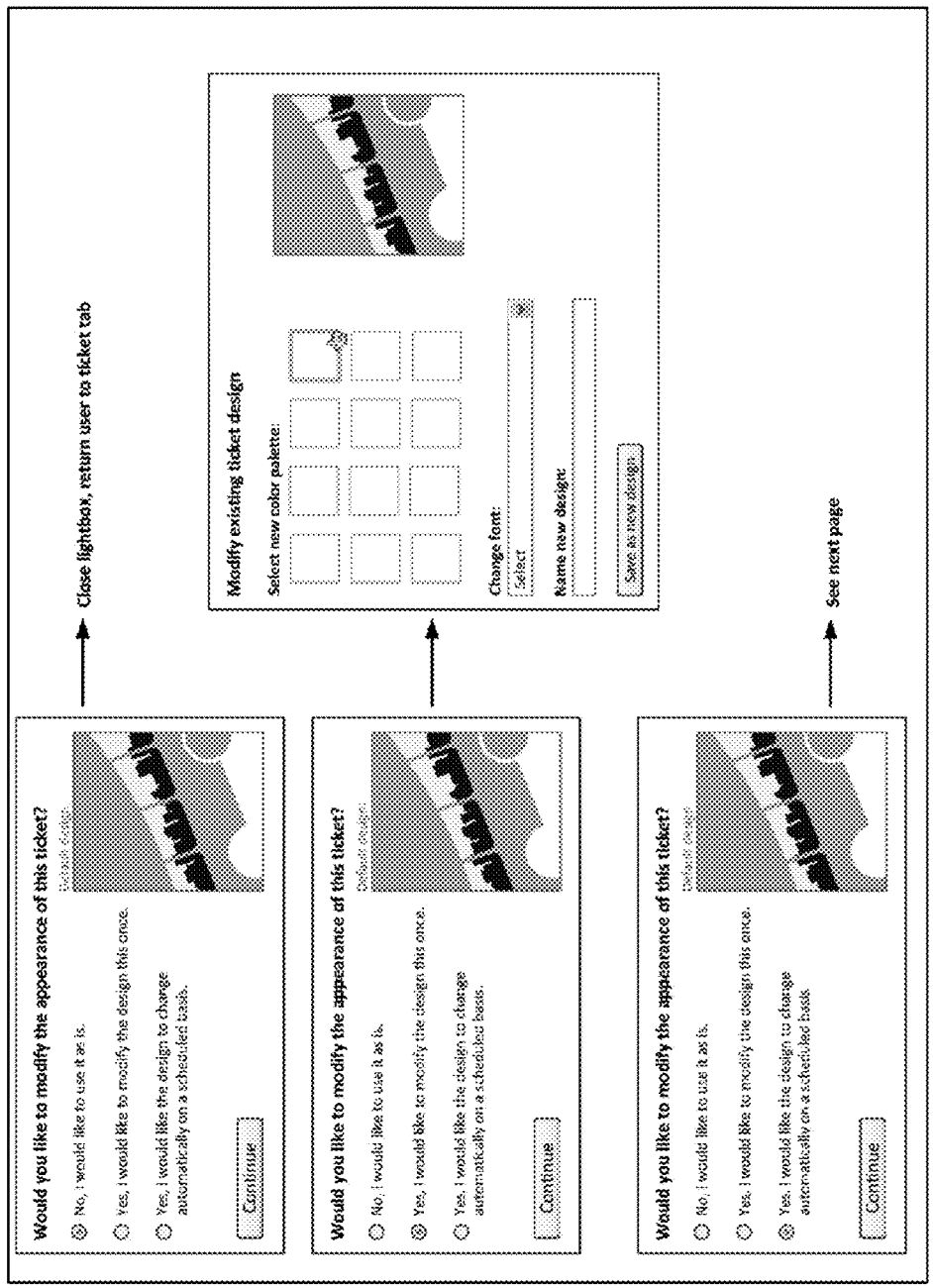

The user may edit the appearance of the tickets by adjusting animation (as illustrated in FIGS. 16-17), color and/or font of images or text on the tickets (as illustrated in FIG. 18), and/or other parameters. In one example, the graphical user interfaces shown in FIGS. 16-28 may be presented in a sequential manner based on user input into the interfaces.

Figure 19:
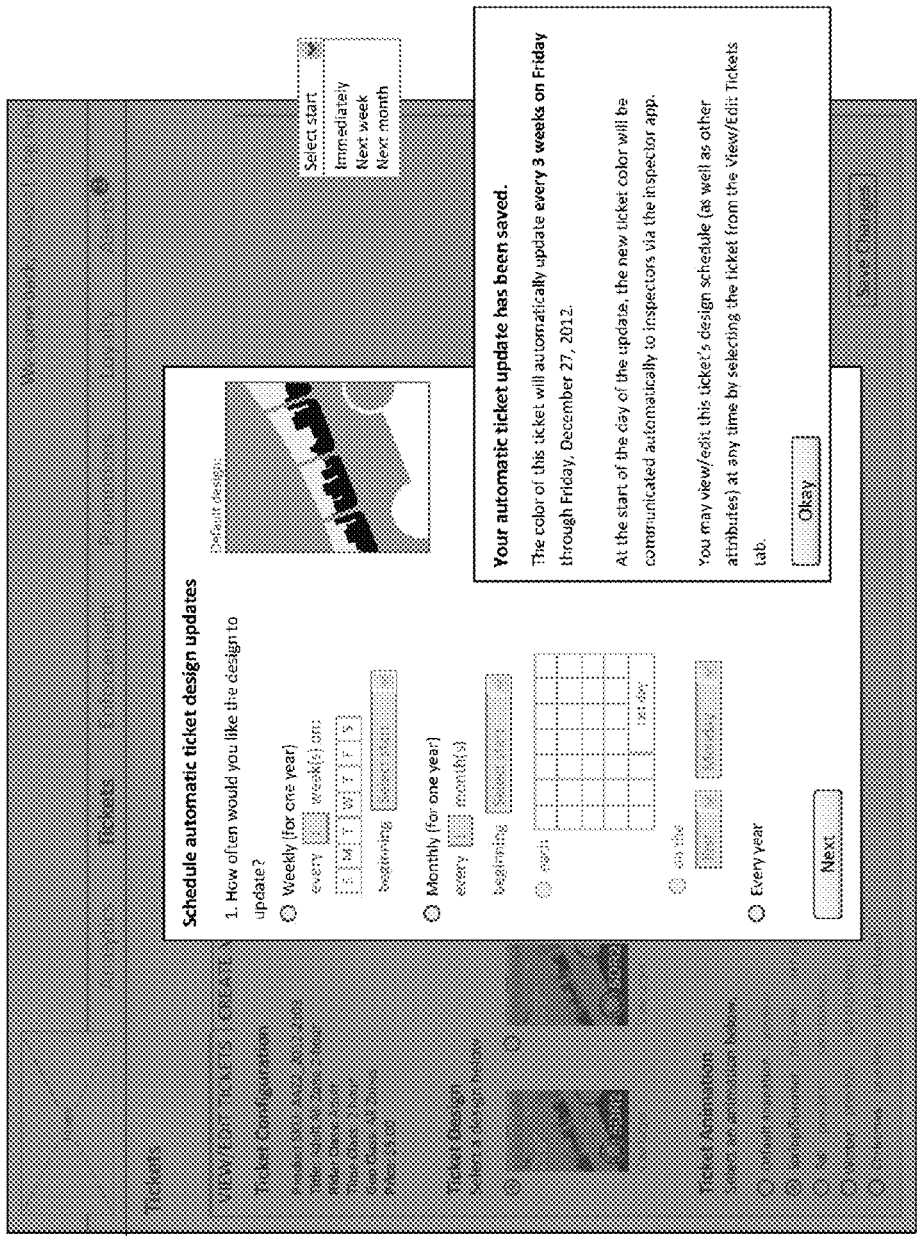
Figure 20:
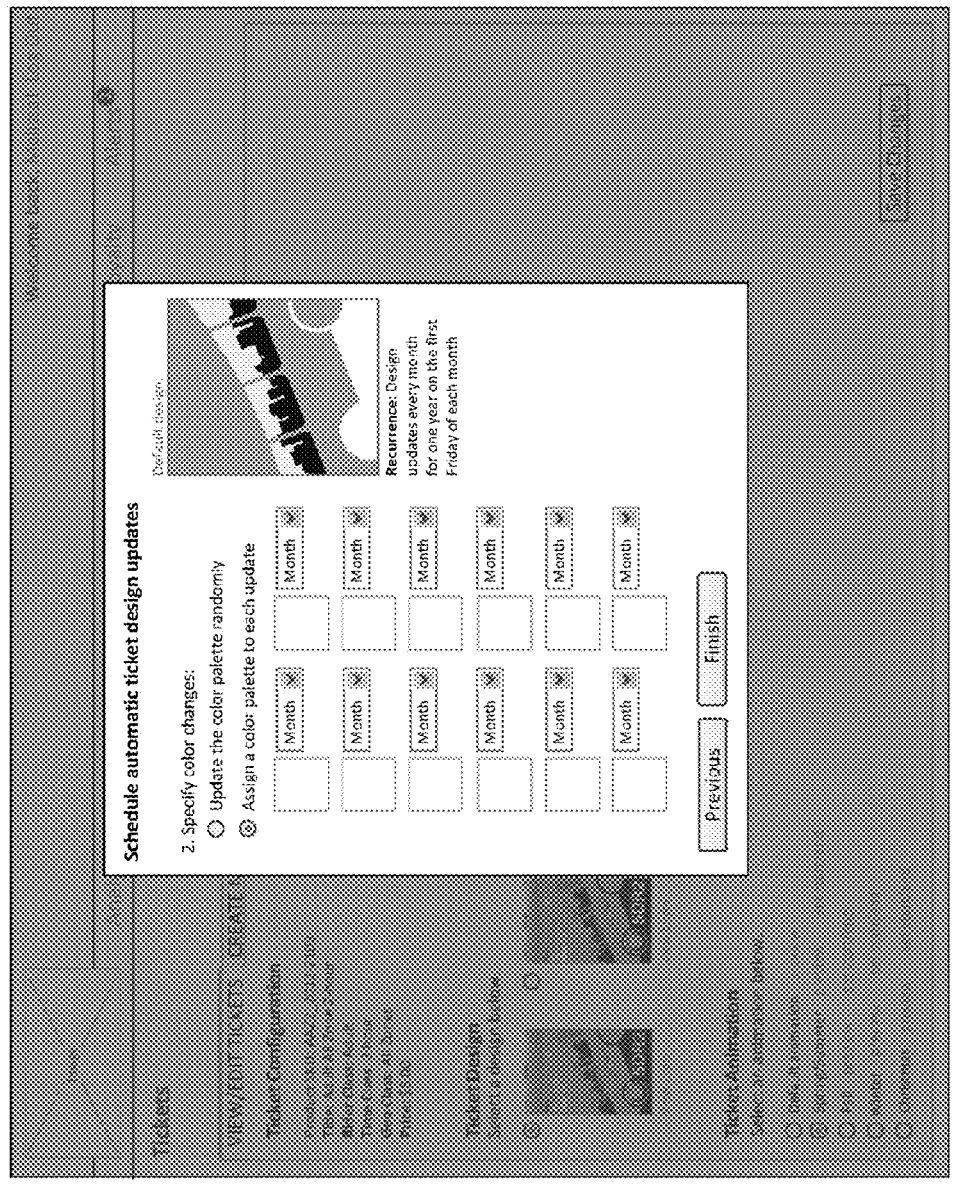
Figure 21:
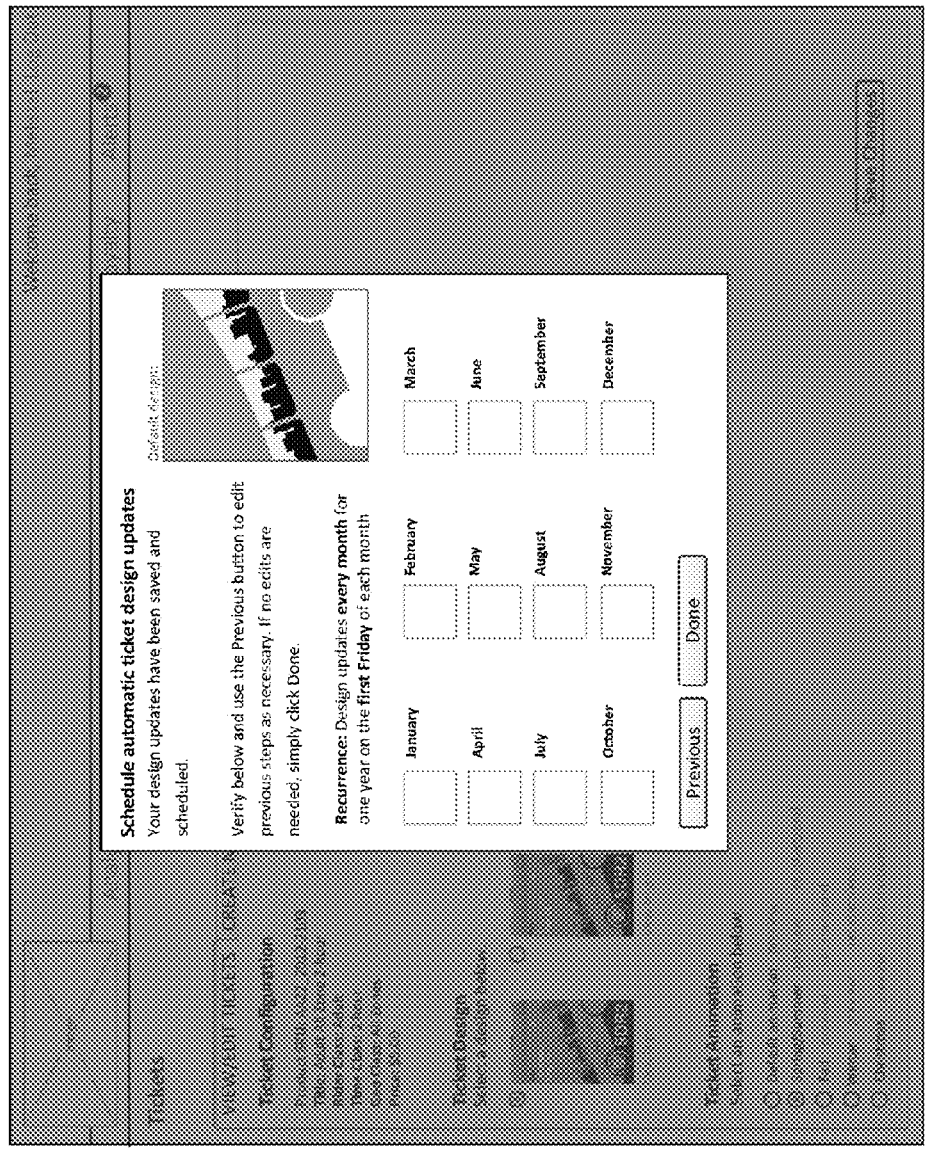

The user may adjust the ticket design on a one-time basis, or may adjust the tickets periodically, as illustrated in FIGS. 19-21. For example, FIG. 20 shows an example graphical user interface that includes grayed out portions with dialog boxes overlaid on the grayed out portion. In one example, anything grayed out on the interface of FIG. 20 only shows if the user selects an associated radio button (so weekly specification information only shows up if the user selects the weekly radio button). If the user selects Weekly, they may not have the option to specify color changes for each week—it may be random by default. So when the user clicks Next, he or she would get the message box illustrated off screen right. If the user selects Monthly, he or she will get the interface shown on FIG. 21. Also, choosing every year may not require any sort of date selection, and thus is illustrated here as a lone radio button. Every year may be a random color change as well. In another example, FIG. 21 shows a schedule option for ticket design updates. Herein, the monthly drop-downs only display months that will be affected according to the frequency and start date specified in the previous step. So if the user selects every other month starting in March, the months would be March, May, July, September, and November. In one example, the graphical user interfaces shown in FIGS. 19-21 may be presented in a sequential manner based on user input into the interfaces.

Figure 22:
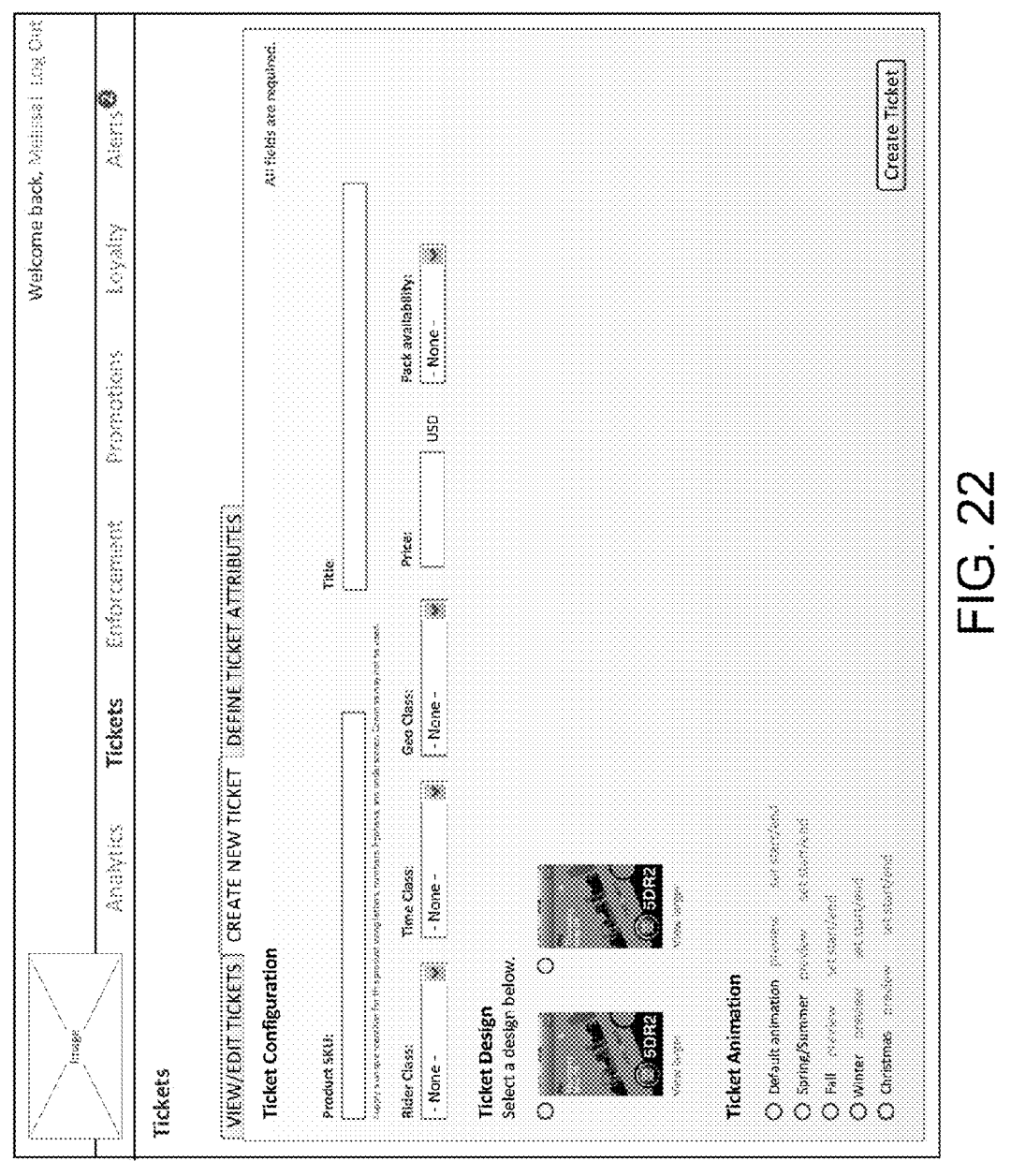
Figure 23:
Figure 24:
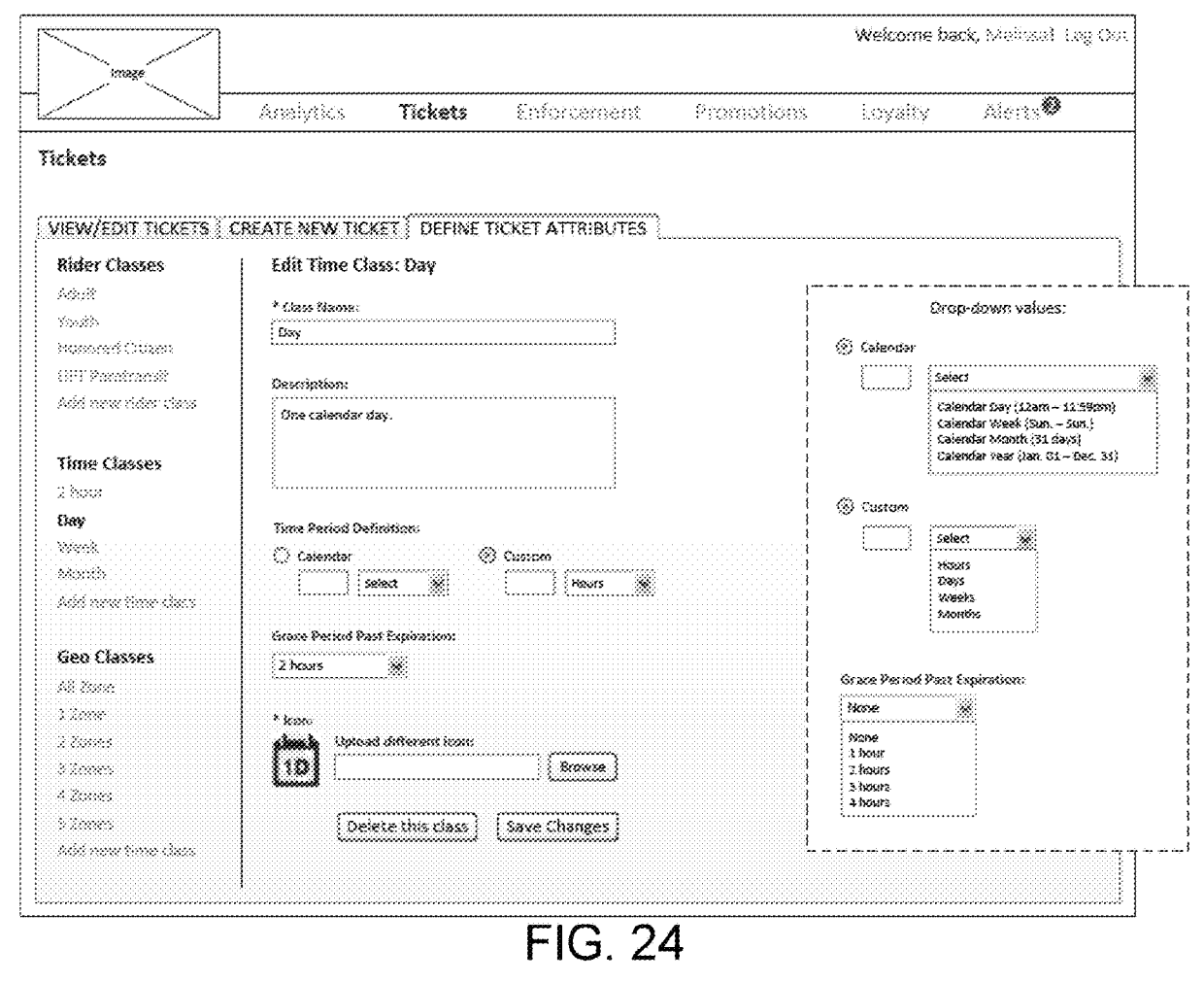

FIGS. 22-24 show various tabs in a ticketing dashboard in the transit ticket system. The view/edit tickets tab may enable a user to view and edit existing ticket data such as title, rider class, time class, geographical class, price, ticket design, ticket animation, etc. The "create new ticket" tab enables a user to create new tickets which may define one or more of the aforementioned ticket data fields. The define ticket attributes tab may enable a user to define new rider classes (e.g., adult, youth, honored citizen, paratransit, etc.), time classes (e.g., 2 hour, day, week, month), and/or geographical classes (e.g., all zone, 1 zone, 2 zone, 3 zones, etc.). In one example, the graphical user interfaces shown in FIGS. 22-24 may be presented in a sequential manner based on user input into the interfaces.

Figure 25:
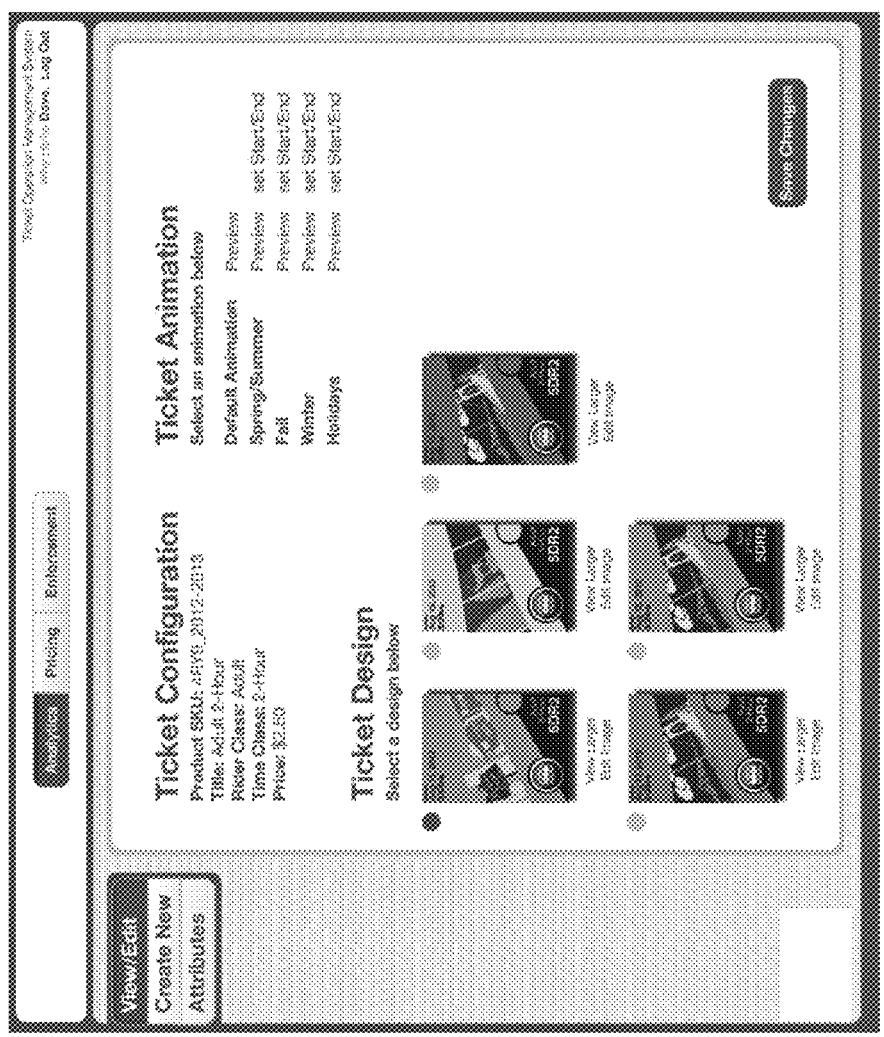
Figure 26:
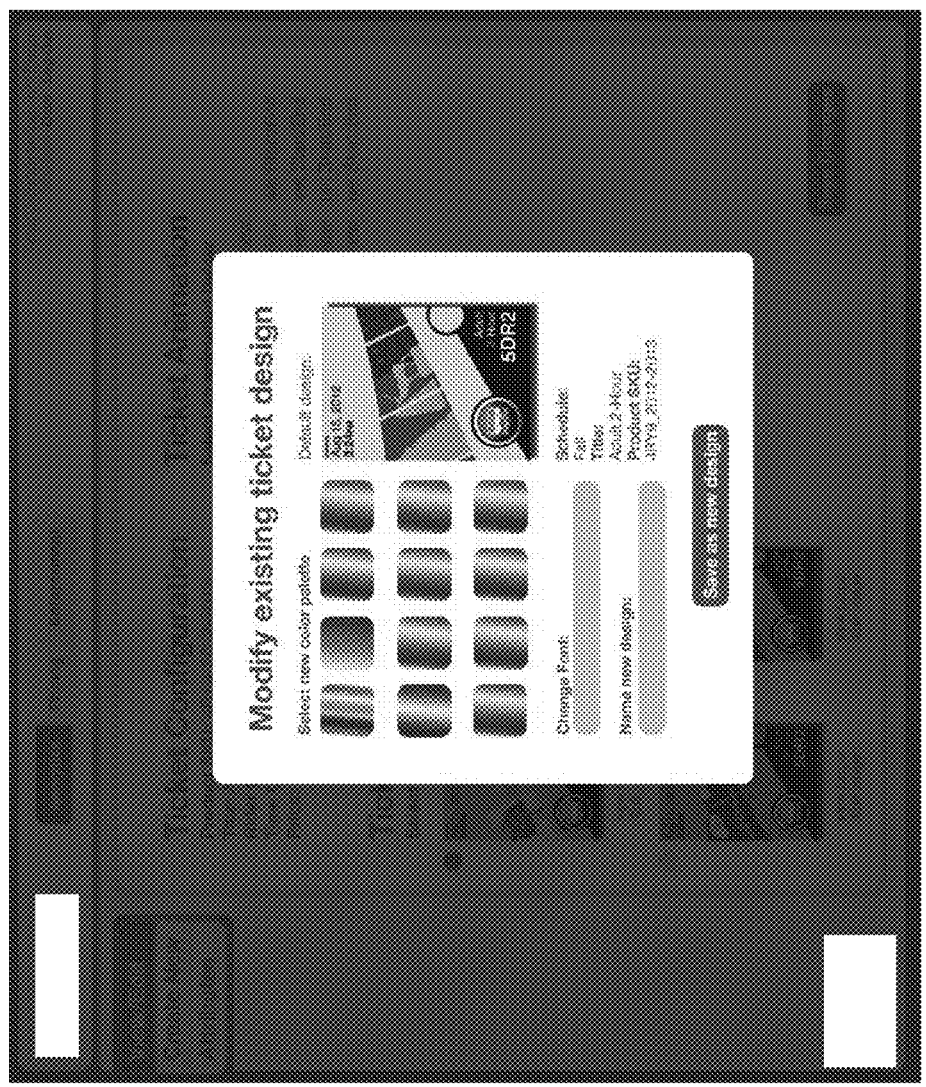
Figure 27:
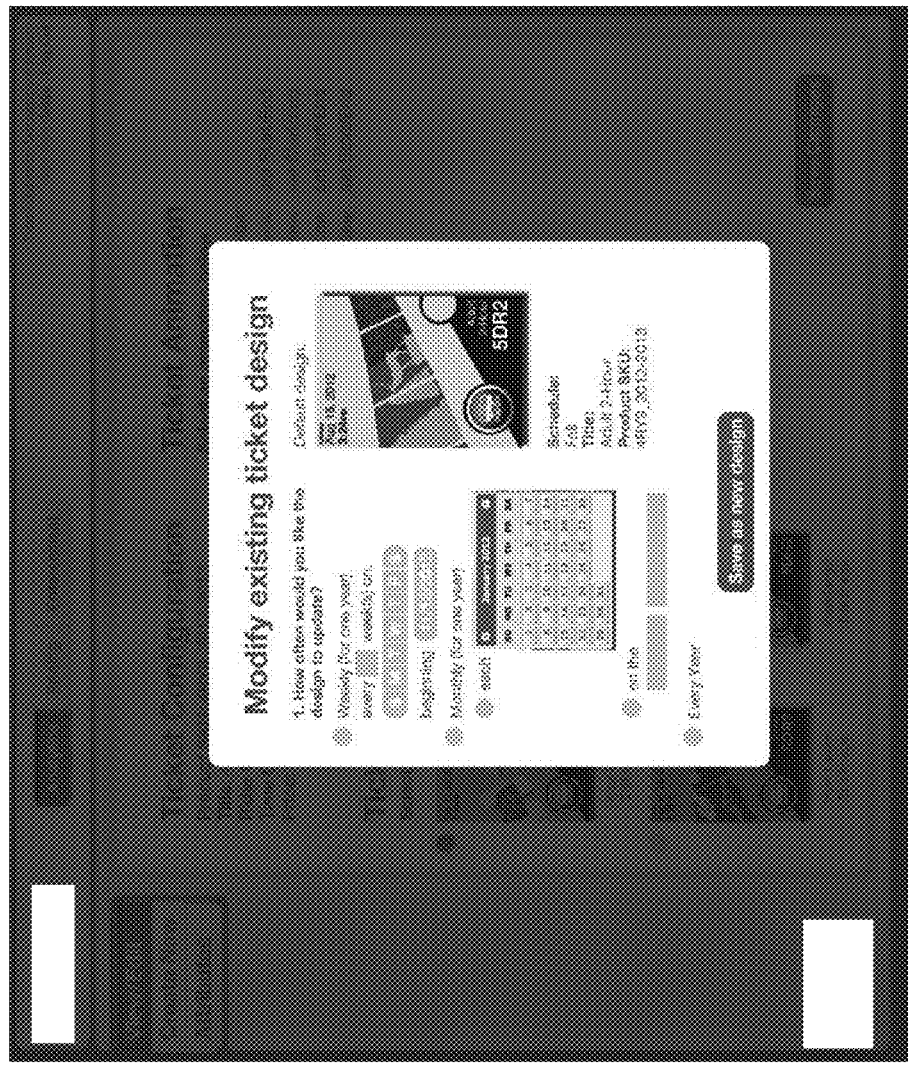
Figure 30:
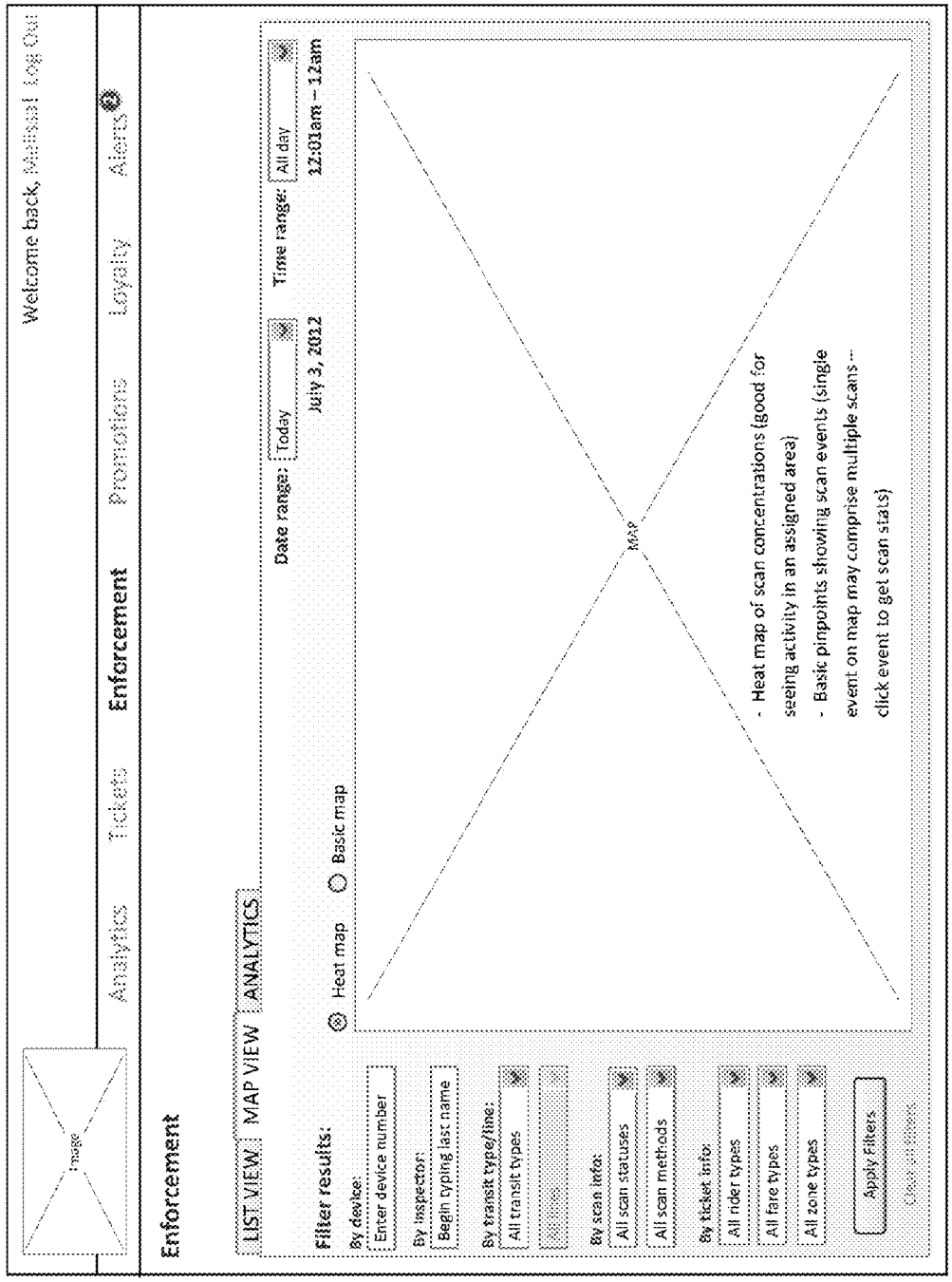
Figure 31:
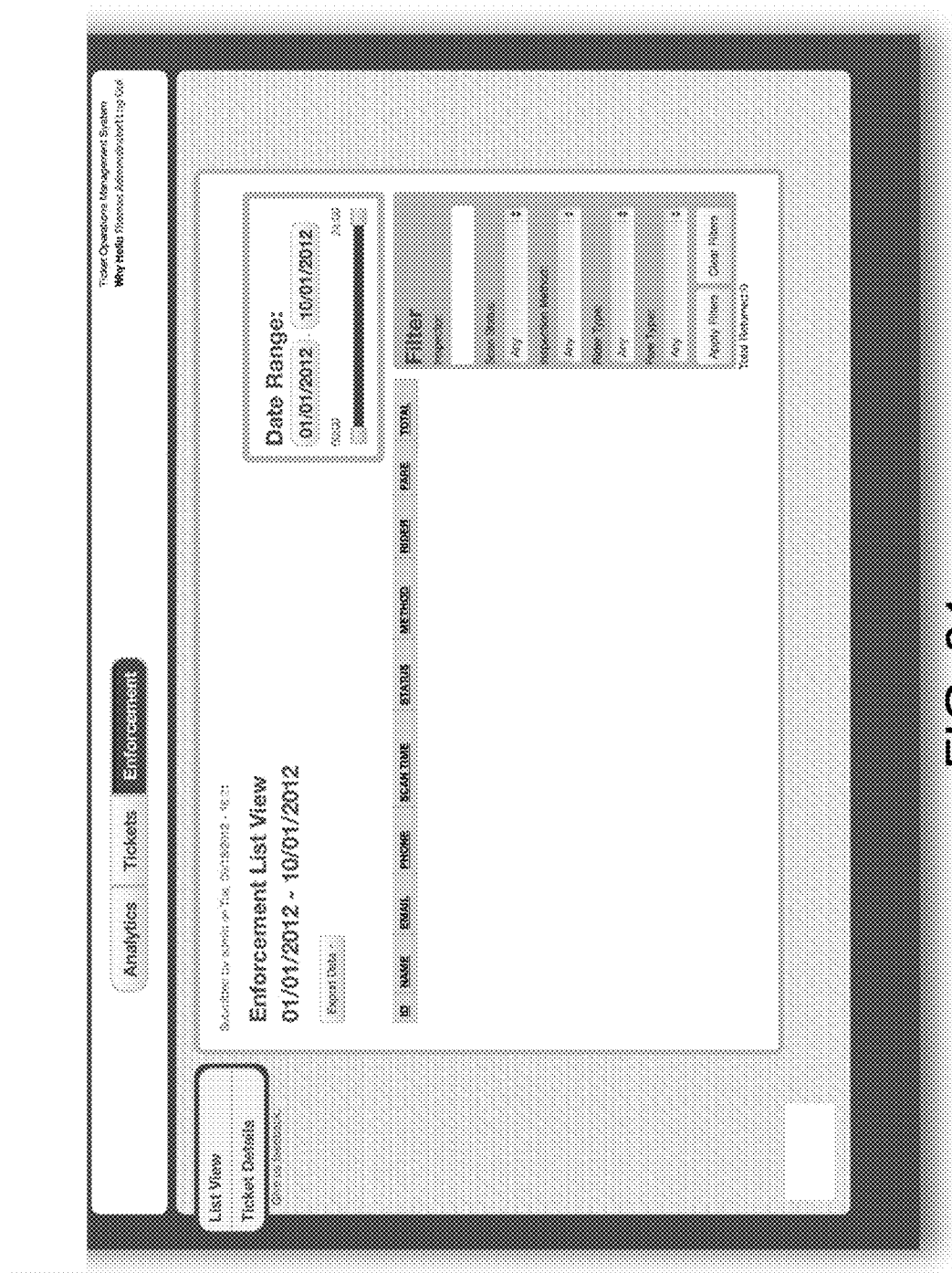
Figure 32:
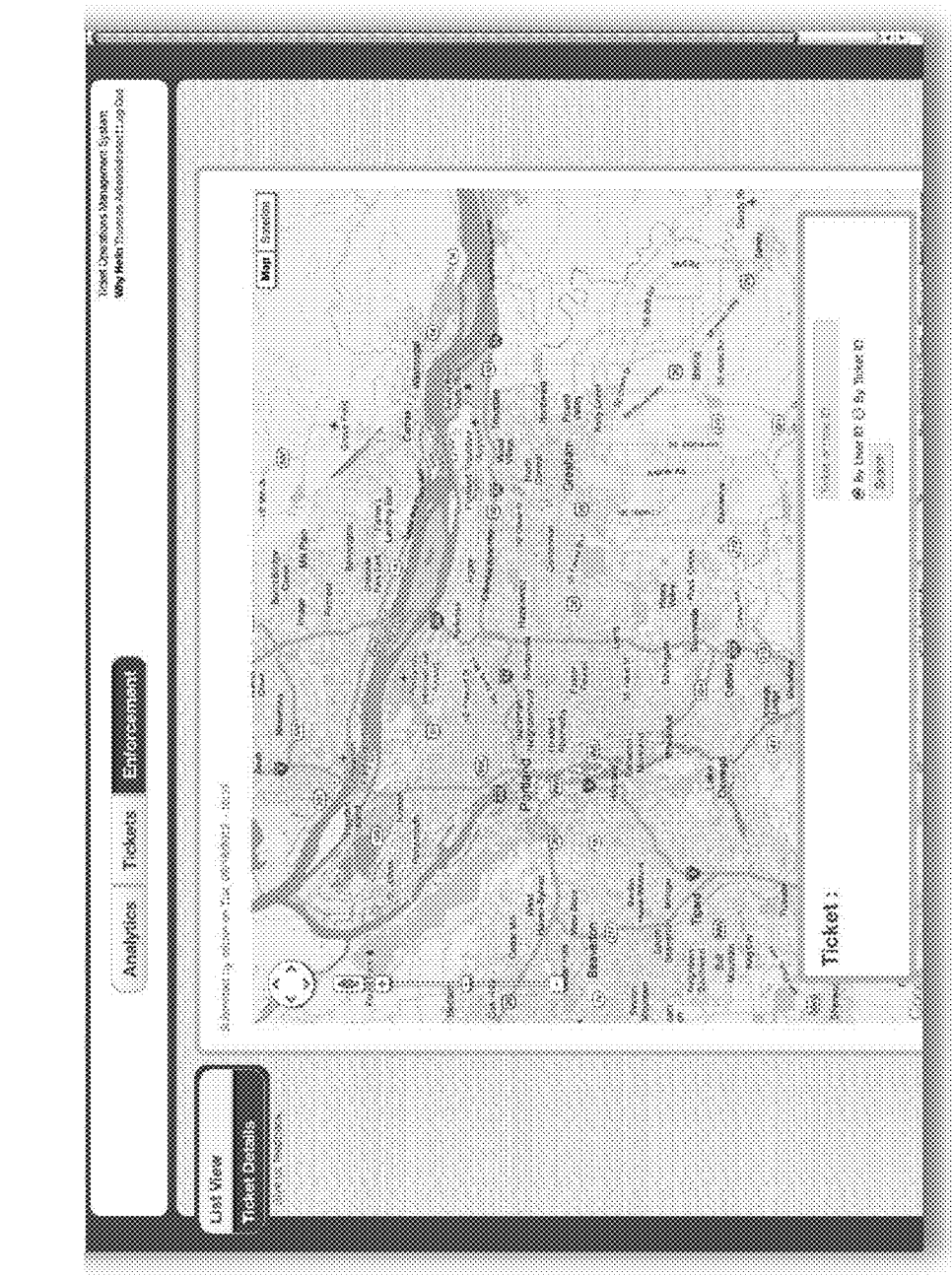

FIGS. 25-27 illustrate graphical user interfaces of the Ticket Designer showing previously-designed ticket options to a user, which he or she may select. In one example, the graphical user interfaces shown in FIGS. 25-27 may be presented in a sequential manner based on user input into the interfaces. FIGS. 25-27 further illustrate options presented to a user for modifying selected tickets. One example process for creating a ticket using the Ticket Designer according to the present disclosure includes:

1.) The art components are created. The art components include but are not limited images, text, and animations.

2.) The components are loaded into the spritesheet maker. This loads all components as images and then draws them to a canvas element, and keeps track of the rect (x, y, width, height) that each component occupies, and each component's name.

3.) The rect and names are then compiled into a dictionary object, which is then sent to a server and stored in a database.

4.) A user then launches the Ticket Designer and specifies which spritesheet to use and the Ticket Designer asks the server for the dictionary.

5.) The components are laid out in the Ticket Designer and the user may use the design tool to layout the components, change the color of one or more of the components, and/or apply animation.
   i.) To layout the components, the Ticket Designer utilizes a canvas element and updates a component's rect by tracking mouse movement (e.g., movement of the user's mouse) within the canvas.
   ii.) To change a color of a component, the canvas grabs the pixel data for the component and then changes the RGBA values based on user input.
   iii.) At least four types of animations may be used, including velocity, scaling, rotation, and opacity. All rotations allow for repeat values, with −1 being constantly repeating, a delay, and a "ping-pong," meaning the animation will be run forward and then backward.
     a.) Velocity animations have a user set a start point, end point, and a duration. The Ticket Designer then calculates the x-component and y-component of the component's velocity based on the duration and the delta between x and y values from the start point to the end point.
     b.) Scaling animations have a user set a start scale, an end scale, and a duration and calculates a step based on the duration to add or subtract from the current scale (with 1.0 as the base scale).
     c.) Rotation animations have a user set a start rotation, an end rotation, and a duration, and a step number of radians is calculated for each iteration of the animation.
     d.) Opacity animations have a user set a start opacity, an end opacity, and a duration. A step is calculated for opacity based on duration.

6.) The Ticket Designer allows for previewing of the ticket as a whole.

7.) Once the ticket has been created, the user submits the ticket to the server as a string representing the ticket object.
   i.) The ticket object is an array of objects called layers with an additional object containing data specific to the ticket.
   ii.) The first index in the array has the name of the spritesheet image used for the tickets.
   iii.) Subsequent indices are the layers of the ticket.
     a.) Each layer has the color of the ticket as RGBA values.
     b.) Each layer has the name of the component used for the layer.
     c.) Each layer has the starting position of the layer.
     d.) Each layer has an array of animation objects.
        I.) Each animation object has the type of animation.
        II.) Each animation object has the beginning parameters, ending parameters, duration, repeat, delay, and ping pong values.

8.) A rider (e.g., the user) purchases a ticket and a new ticket entry is created in the databases with a reference to a previously submitted ticket design.

9.) The rider application on the rider's computing device (e.g., smart phone, tablet, laptop computing, etc.) downloads the ticket object as well as any relevant information it may not have i.e. spritesheet and dictionary.

10.) The application creates three canvas elements, one that is a first buffer for individual components, a second that is a buffer for the whole ticket, and the third which renders the ticket.

11.) The application loads the spritesheet into an image element then draws those to the first buffer and then grabs the pixel data from that canvas for each layer in the ticket.

12.) After the layer components, the application renders the text components that display ticket information like expiration, rider type, and daycode.

13.) The top unanimated layers are all combined into a single layer to assist performance.

14.) Once all components have been loaded, the application draws them onto the first canvas based on their rect and then puts the image data of the first buffer onto the second buffer. Once all components have been drawn to the second buffer, the context for the third canvas is adjusted to fit the proportions of the rendering screen and the completed ticket image is drawn to scale to the screen.

15.) All animations created with the parsing of the ticket object are now started and an interval is called to update the state of the ticket and then render the ticket via the process in step 13.

16.) When the QR button is pressed a QR code is generated using encrypted text with information about the ticket and given an opacity animation in order to fade in and out.

17.) This QR code is added as an additional layer to the end of the ticket object.

Another example process for creating and/or editing a ticket using the Ticket Designer according to the present disclosure includes:

1.) The Ticket Designer allows for users to create and edit designs for visually authenticated tickets. The creation of tickets may use a variety of predefined elements from a supplied library, or new assets that the user uploads. These designs can be used for transit, events, and advertisements.

2.) Upon loading, the Ticket Designer may consult a Rules Engine to populate a library of predefined assets.

3.) User selects assets to use in the project.

4.) A graphical data sheet (e.g., spritesheet), ticket dictionary, and ticket object are created referencing this collection of assets. These are stored in the Rules Engine.

5.) The user will then have the ability to upload new components, such as text or images, which will then update the graphical data sheet (e.g., spritesheet), ticket dictionary, and ticket object.

6.) Each component is drawn to a canvas, rendering the ticket.

7.) A menu of layers is populated from each component. Each layer contains references to initial properties that can be edited.

8.) Users add ticket states (e.g. tapped/untapped screen). This updates the ticket object.

9.) Users select a layer to edit from the menu. If applicable user can select which state to edit.

10.) Users can edit multiple properties of the selected layer.

11.) Through mouse or keyboard manipulation, which will update the ticket object.

12.) The user adds or edits animations. This can be done by modifying values within each layer's menu, or by modifying the animation timeline. The timeline features a visual reference to the speed and duration of each animation.

13.) Saving the ticket encrypts the graphical data sheet (e.g., spritesheet), ticket dictionary, and ticket object.

14.) Encrypted information is sent to the rules engine for storage.

15.) The new ticket can be edited at a later time by loading the ticket from the Rules Engine, or can be scheduled to use at a specific time or date using the Ticket Scheduler.

Example graphical user interfaces that may be presented to a user when interacting with the rider application are illustrated in FIGS. 34-43. In one example, the graphical user interfaces shown in FIGS. 34-43 may be presented in a sequential manner based on user input into the interfaces.

Figure 34:
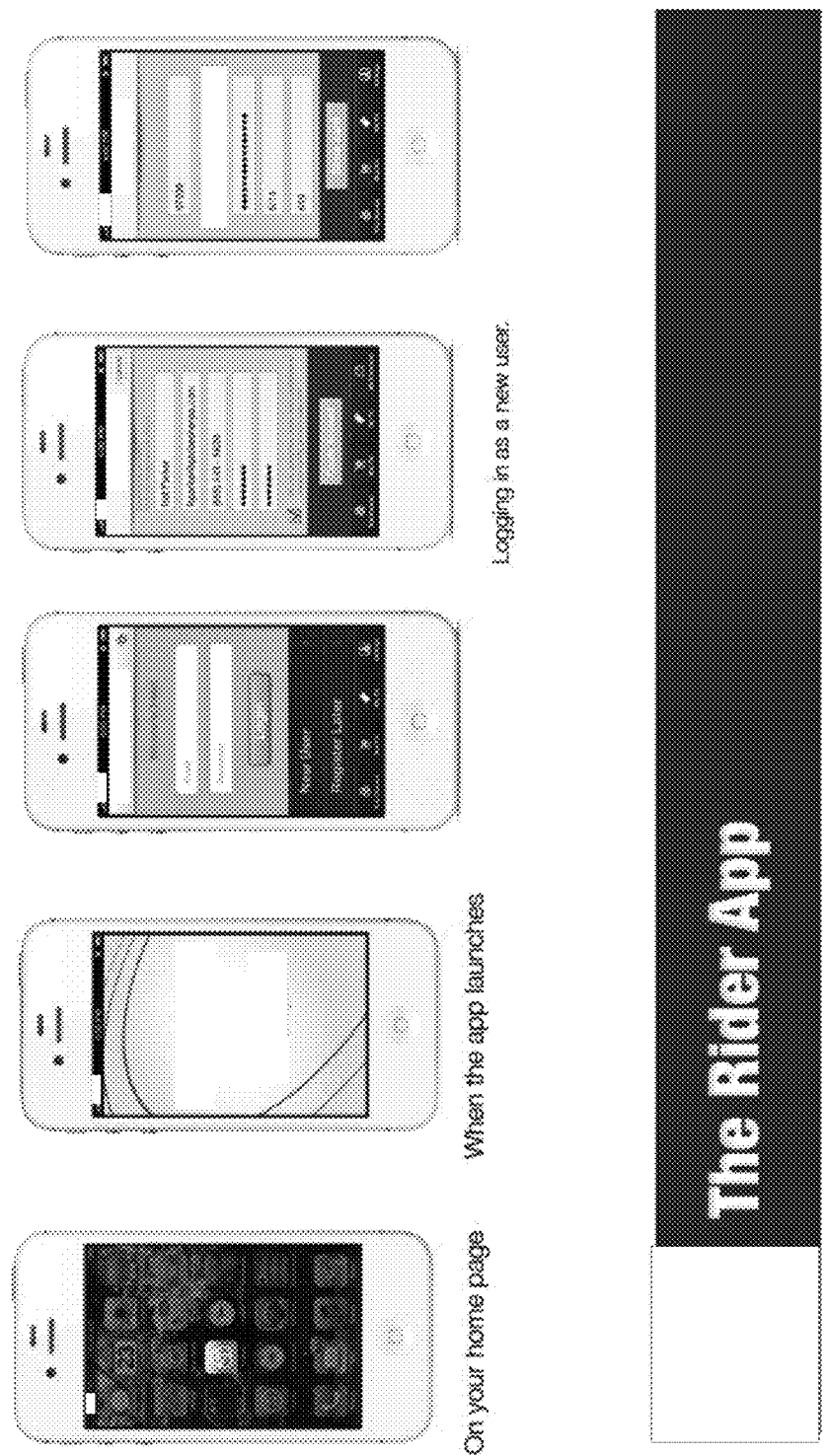
FIGS. 34-44 show exemplary graphical user interfaces of the rider application of FIG. 1.
Figure 36:
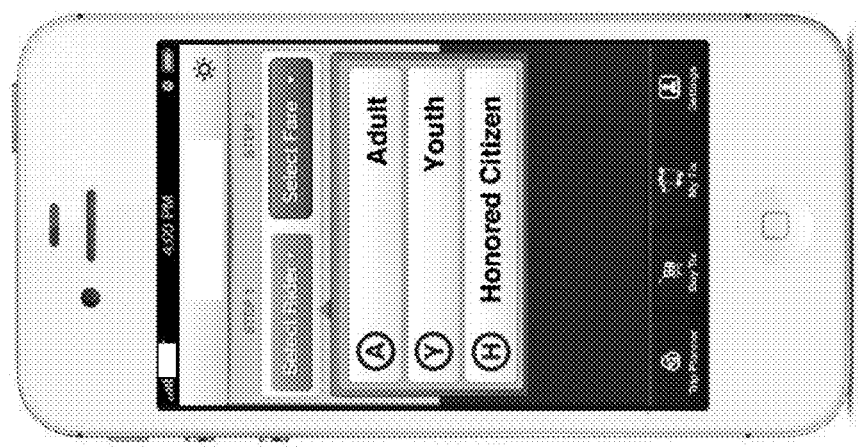
Figure 35:
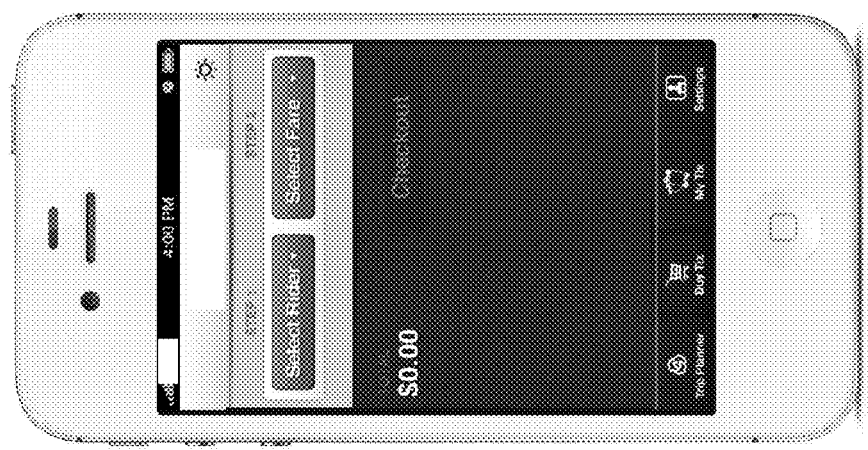
Figure 37:
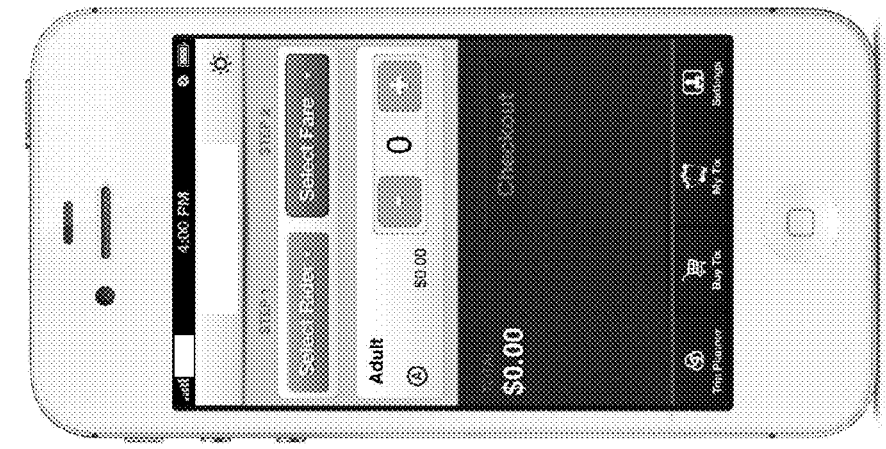

The rider application may provide a user with the ability to purchase a specific transit ticket for a particular rider as well as allow the user to display the purchased ticket on his or her mobile device for validation. For example, FIG. 34 illustrates the rider application as viewed on a user's mobile device home page as well as the user interface presented when the application is launched. FIG. 34 illustrates user interfaces presented to the user during login. FIG. 35 illustrates a user interface of the rider application displaying a buy tickets page. This interface may be how the buy ticket page looks the first time a user uses the rider application. The first step is to select the rider type. FIGS. 36 and 37 show the rider application buy tickets screen when the user has selected the rider type as "Adult." The application starts to populate the ticket into the buy tickets page.

Figure 39:
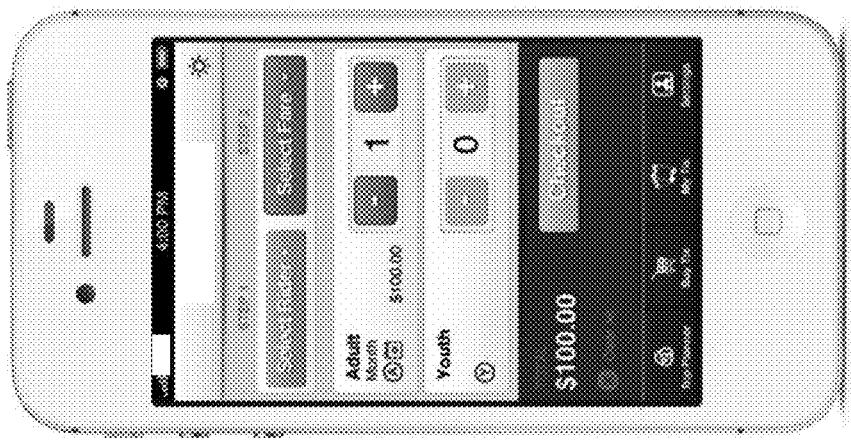
Figure 38:
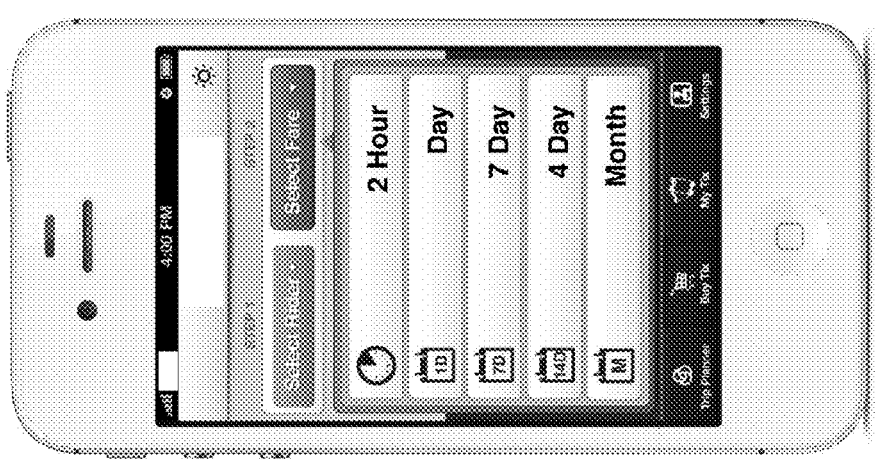

FIG. 38 illustrates the next step in the ticket purchase process, where a prompt is displayed for the user to select a fare type. In the illustrated example, a Month pass has been selected. The application populates a complete Adult Month pass in the buy tickets cart. FIG. 39 shows an example of how a user can purchase multiple tickets at once. In this example, the user is adding a Youth ticket type. FIG. 39 also shows the buy tickets page as ready to check out. After selecting the fare type, a Youth 2 Hour ticket populates into the buy tickets cart. The user in this example has added another Youth 2 Hour ticket by selecting the quantity button to the right of the ticket. The total adds up and the transaction is completed by pressing the green checkout button. In this way, the rider may check their purchases prior to checking out. After selecting the checkout button presented on the interface the user may be prompted to enter payment information. New payment information may be entered by the user or existing payment information stored (e.g., a previously used credit card) on the device may be selected. The user may be given the option to register their new payment information for future use. Further in one example, the user may be alerted if the payment information has failed and a suggested correction may be displayed to the user.

Figure 40:
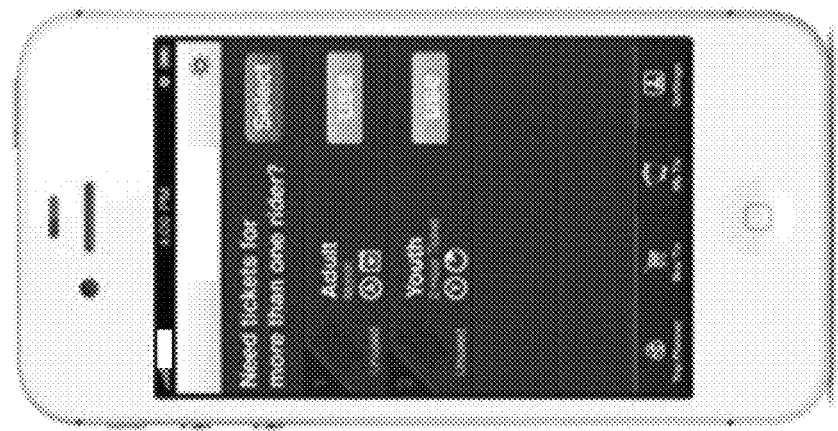

FIG. 40 illustrates a ticket library function of the rider application. After purchasing an Adult Month pass and a Youth 2 Hour ticket, the tickets have been populated as unused tickets in the my tickets page. It will be appreciated that the tickets may be downloaded into the "my tickets" tab in response to purchasing the ticket via the interface shown in FIG. 39. It will be appreciated that the tickets shown in FIG. 40 are ready for use.

Figure 41:
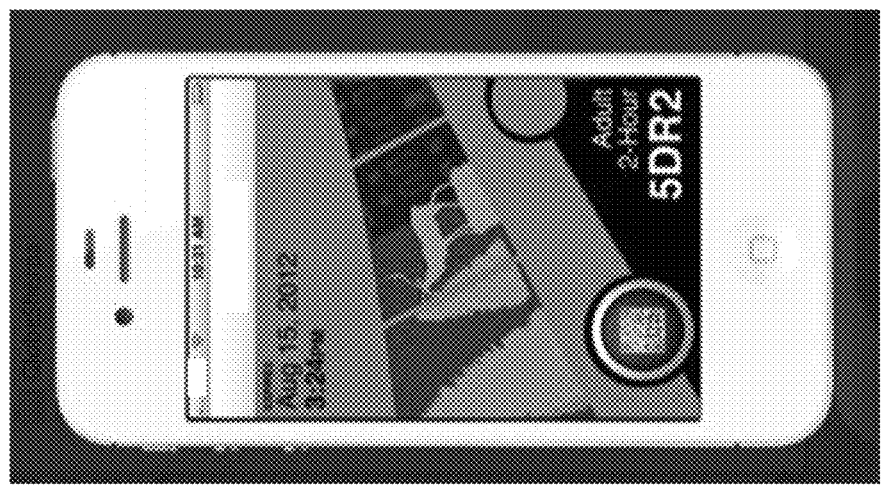

After selecting the "use" button, the desired ticket will be validated and the animated ticket will appear. FIG. 41 illustrates an example ticket. After selecting the view button for the Adult Month pass, the ticket is displayed. The rider may press "Hop On" to launch the animated ticket. It will be appreciated that selecting the use button or the hop on button may trigger activation of the ticket. The activated ticket may uses various components such as date, time, ticket type, user type, agency, location, animation, sound, video, vibration or images to indicate validity. These components may be stored on the mobile device prior to activating the ticket. Additionally, an expired ticket may change the various components (date, time, ticket type, user type, agency, location, animation, sound, video, vibration or images) and underlying data to indicate that a ticket has expired. In one example, the brightness of the ticket may be altered to indicate active and expired states.

Figure 43:
Figure 42:
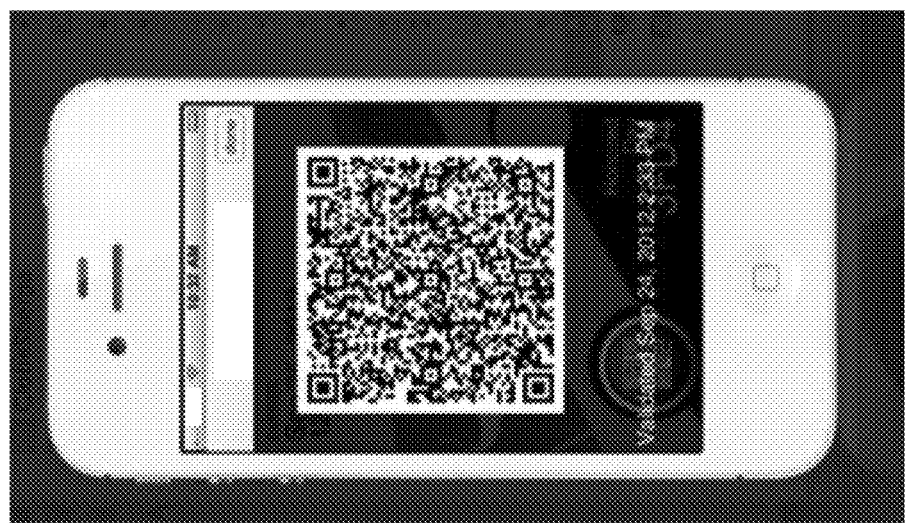

FIG. 42 shows an example QR code that may be displayed in response to a selection by the rider. By selecting the QR button, a large, scanable QR screen displays so that a fare inspector can scan the ticket with the Inspector Application. FIG. 43 shows ticket screen displaying active and inactive tickets. After validating the Adult Month pass, it is now marked as an active ticket and the expiration date is displayed. It will be appreciated that the user may have options to select multiple tickets. By selecting multiple, the rider can use quantity selectors alongside the tickets in the my tickets page. If there is more than one type of ticket, more than one can be selected. It will be appreciated that more than one ticket may be simultaneously displayed on the mobile device. The top right of the screen displays multiple riders using this ticket.

Thus, FIGS. 34-43 illustrate various graphical user interfaces that may be presented to the user when the user is purchasing one or more transit tickets via a mobile device in the transit ticket system. The user may have the option of selecting a type of rider (such as youth, adult, or honored citizen) and type of fare (2 hour, day, 7 day, 4 day, month), as well as being able to purchase multiple tickets for multiple riders. Additional information may also be displayed via the rider application, including total amount charged to the user's account when purchasing tickets, the number of tickets purchased by the user, whether purchased tickets are active or inactive, etc. It will be appreciated that the rider application may change in appearance on different types of mobile devices, and that varying operating systems of the mobile devices may be supported.

Figure 44:

FIG. 44 shows an example interface of an inspector application showing a page after a ticket has been validated. It will be appreciated that the inspector application may be included in the transit ticket system. The inspector application may verify ticket authenticity through phone number, scanning the QR code on the ticket displayed on the rider application, and/or SMS.

Figure 45:
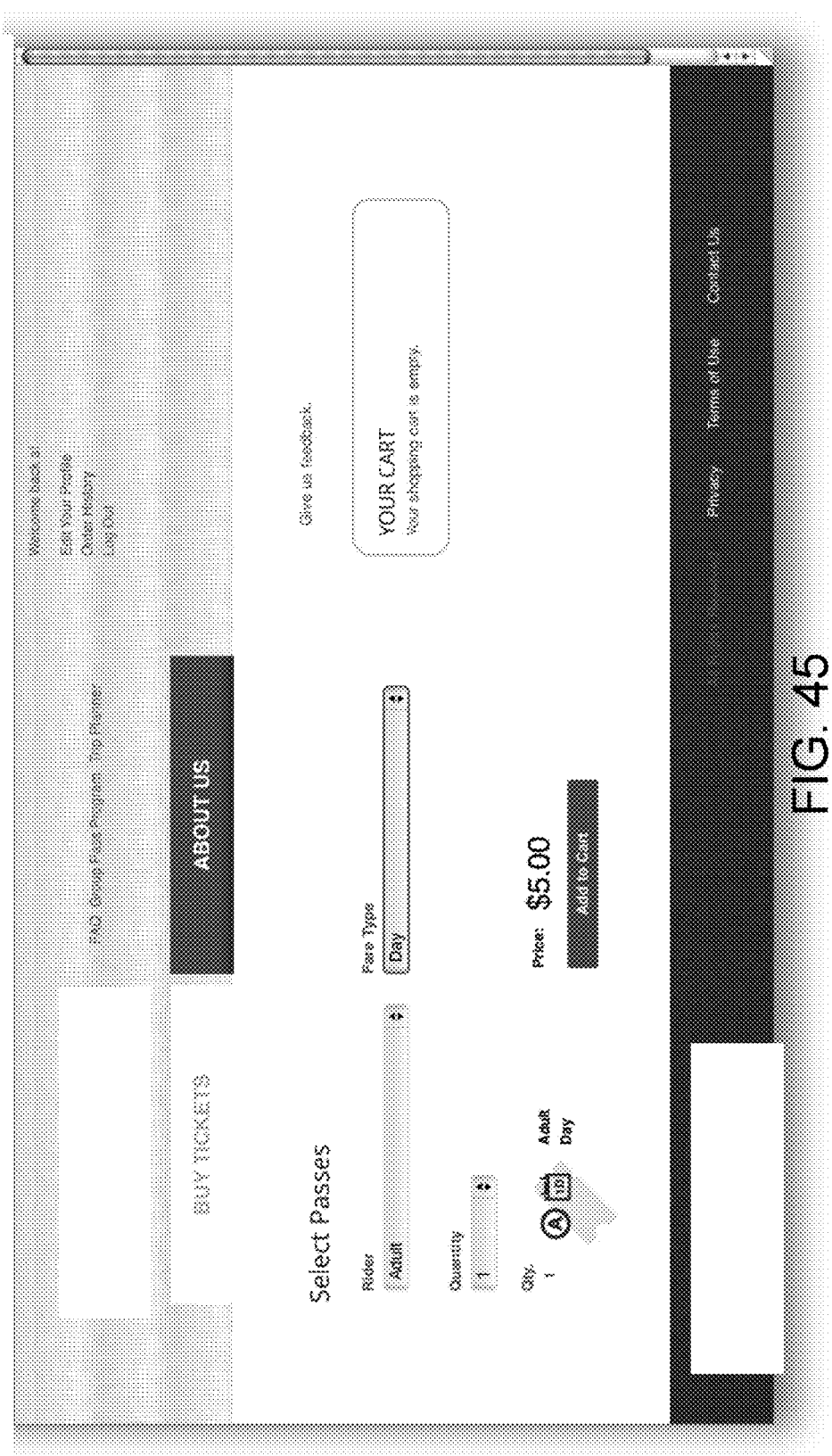
FIGS. 45-47 show exemplary graphical user interfaces for purchasing tickets using the tickets operation management system of FIG. 2.
Figure 46:
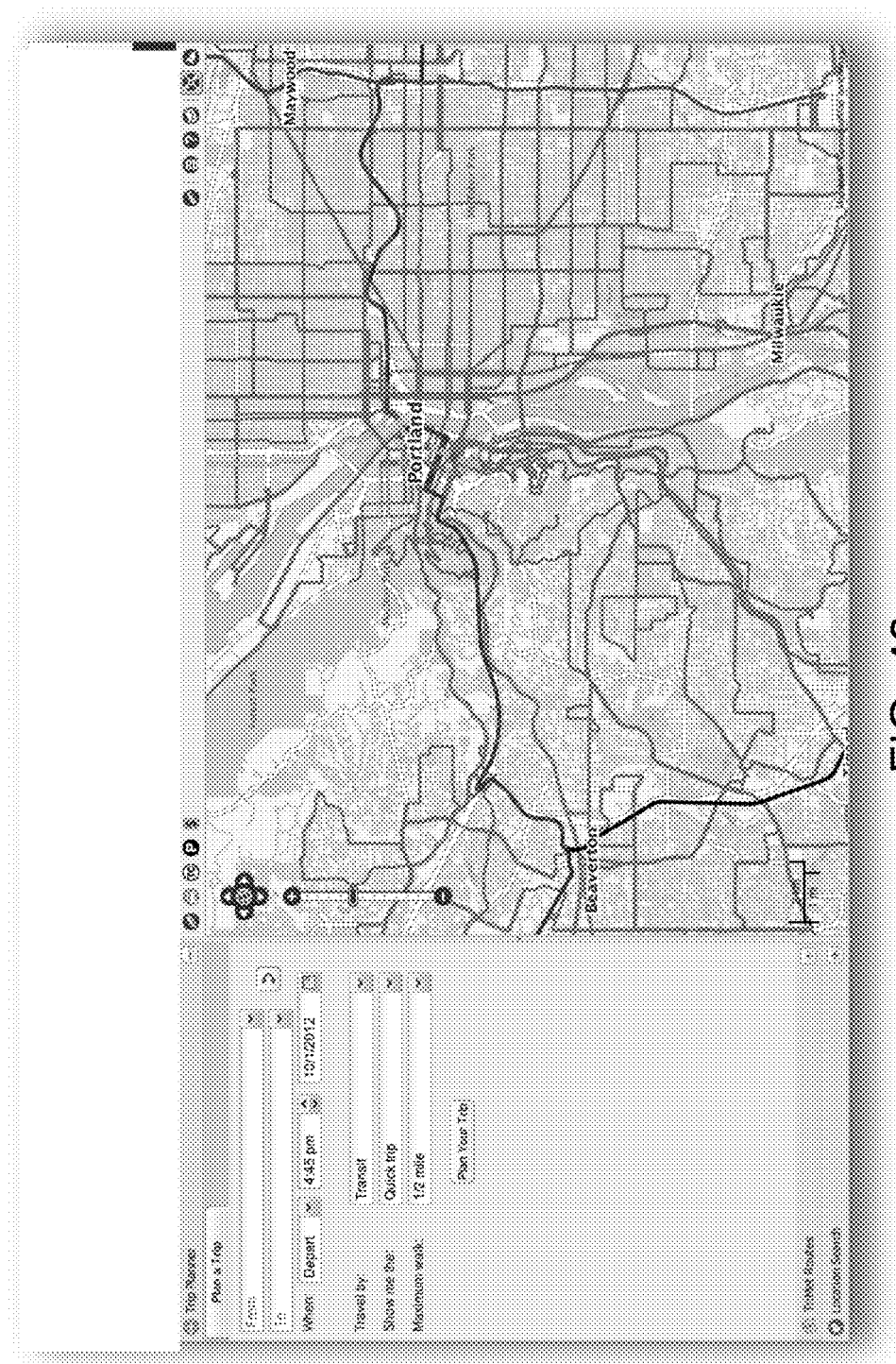
Figure 47:
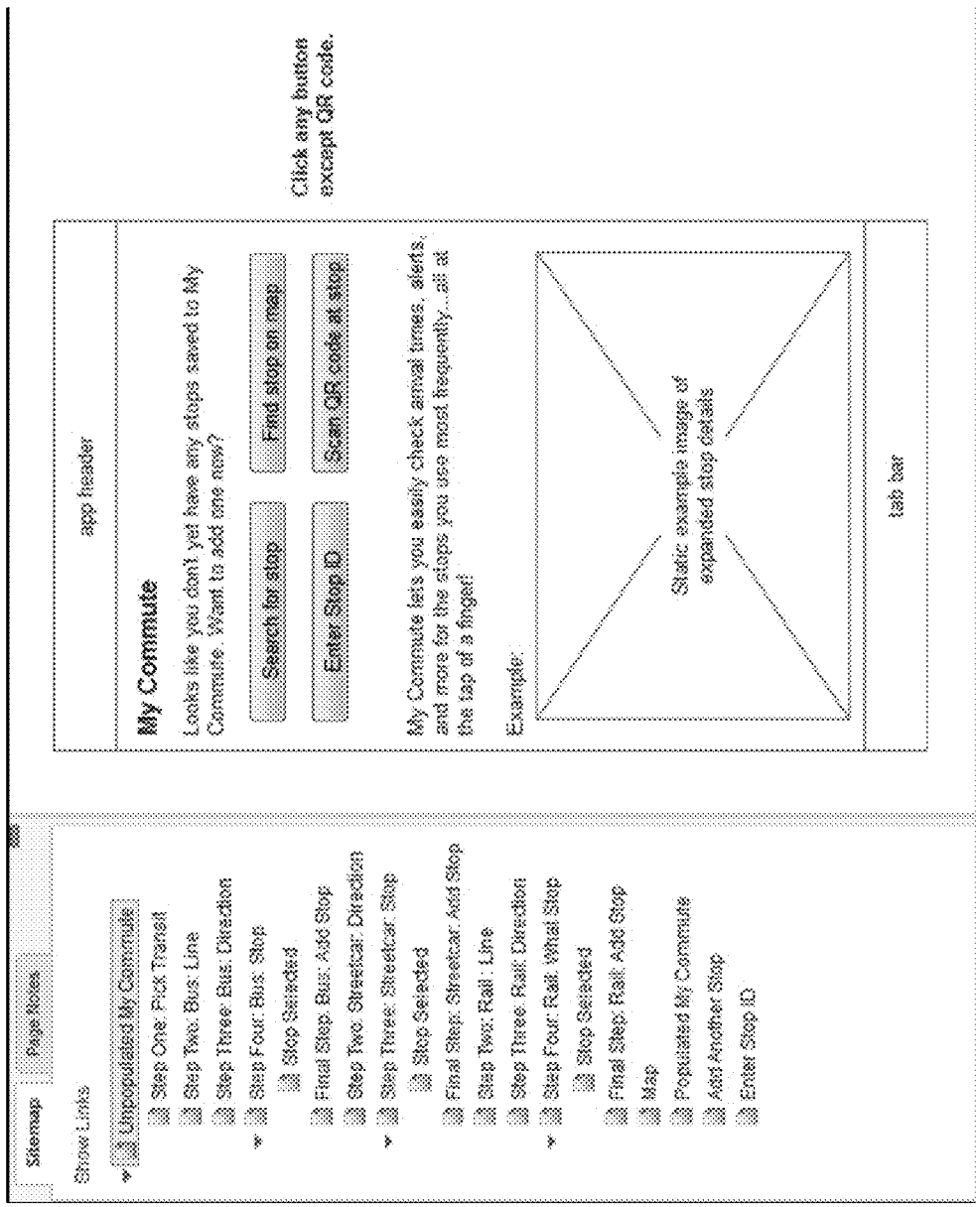

While FIGS. 34-43 show examples of how a user may interact with the transit ticket system to purchase and use tickets with a mobile device, FIGS. 45-47 illustrate user interfaces a user may be presented with when purchasing tickets on a non-mobile device, without using the rider application. For example, the user may purchase tickets in advance on his or her home computer, and these tickets may be saved for later validation (for example, the user may call up one or more tickets on his or her mobile device using the rider application at a later time). A user may enter a password via a home computer to login to an existing account or create a new account. Additionally, the user may select a rider type, a fair type, and/or a ticket quantity to purchase a ticket via a window provided via the ticketing. The aforementioned ticketing options may be stored in a cart. A user may also enter billing information (e.g., payment information (credit card number, expiration date, etc.), shipping address, etc.) into fields presented via a network browsing application. The number of ticket orders may also be presented via the network browsing application to the user. Furthermore, it will be appreciated that the ticketing purchasing functionality discussed above with regard to mobile computing devices may also be provided via other types of computing devices such as desktop computing devices, laptop computing devices, etc. In one example, the graphical user interfaces shown in FIGS. 45-47 may be presented in a sequential manner based on user input into the interfaces.

Additionally, a ticket purchasing interface may display various buttons, tabs, or other interface objects for purchasing tickets. FIG. 45 shows one embodiment of a ticket purchasing interface. In one example, a ticket purchasing interface may be accessed via a desktop device and purchased tickets may be downloaded to a mobile device. Technical tips, how to videos, help buttons, ticket purchase buttons, my account buttons, and/or sign-in fields may be provided in the ticket purchasing interface. The my account button may trigger display of an account screen which may enable a user to enter new account information, if they are a new user, or change account information if they are not a new user. The ticket purchase button may trigger display of a purchase interface which enables a user to select tickets for purchase. If a user is not signed in when the purchase interface is displayed they may be prompted to sign in.

FIG. 47 further shows additional information that may be available to the user, whether using the rider application or simply logging in to the TOMS, such as information on bus arrival time, alerts, etc.

Figure 50:
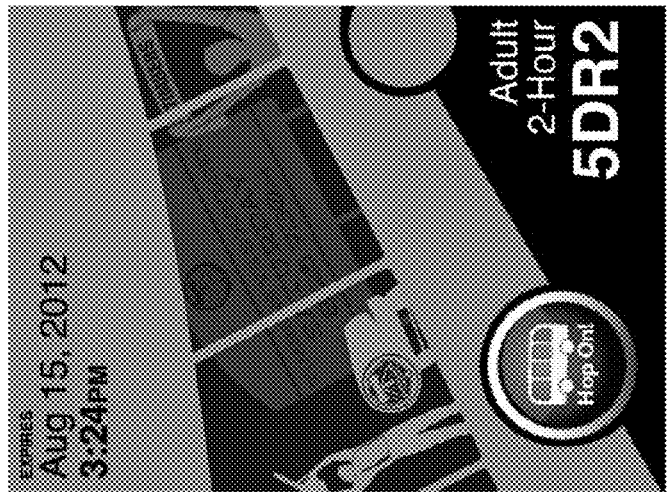
FIGS. 48-50 show exemplary mobile transit tickets including embedded advertisements according to the disclosure.
Figure 49:
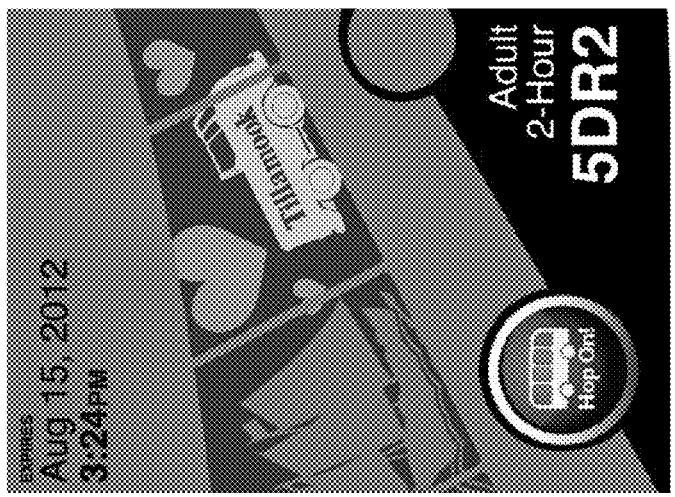
Figure 48:
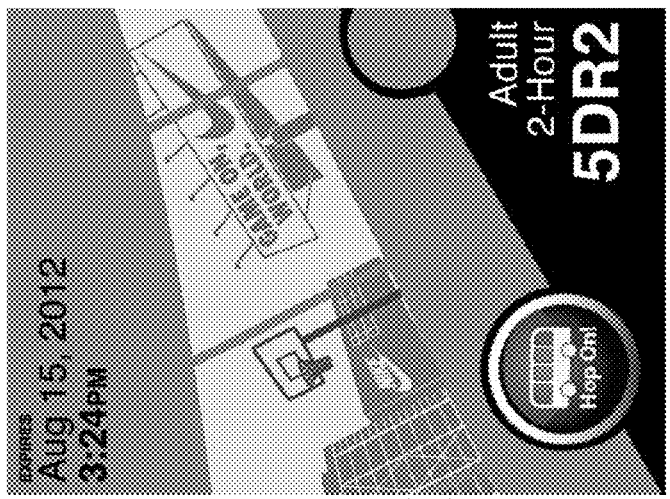
Figure 51:
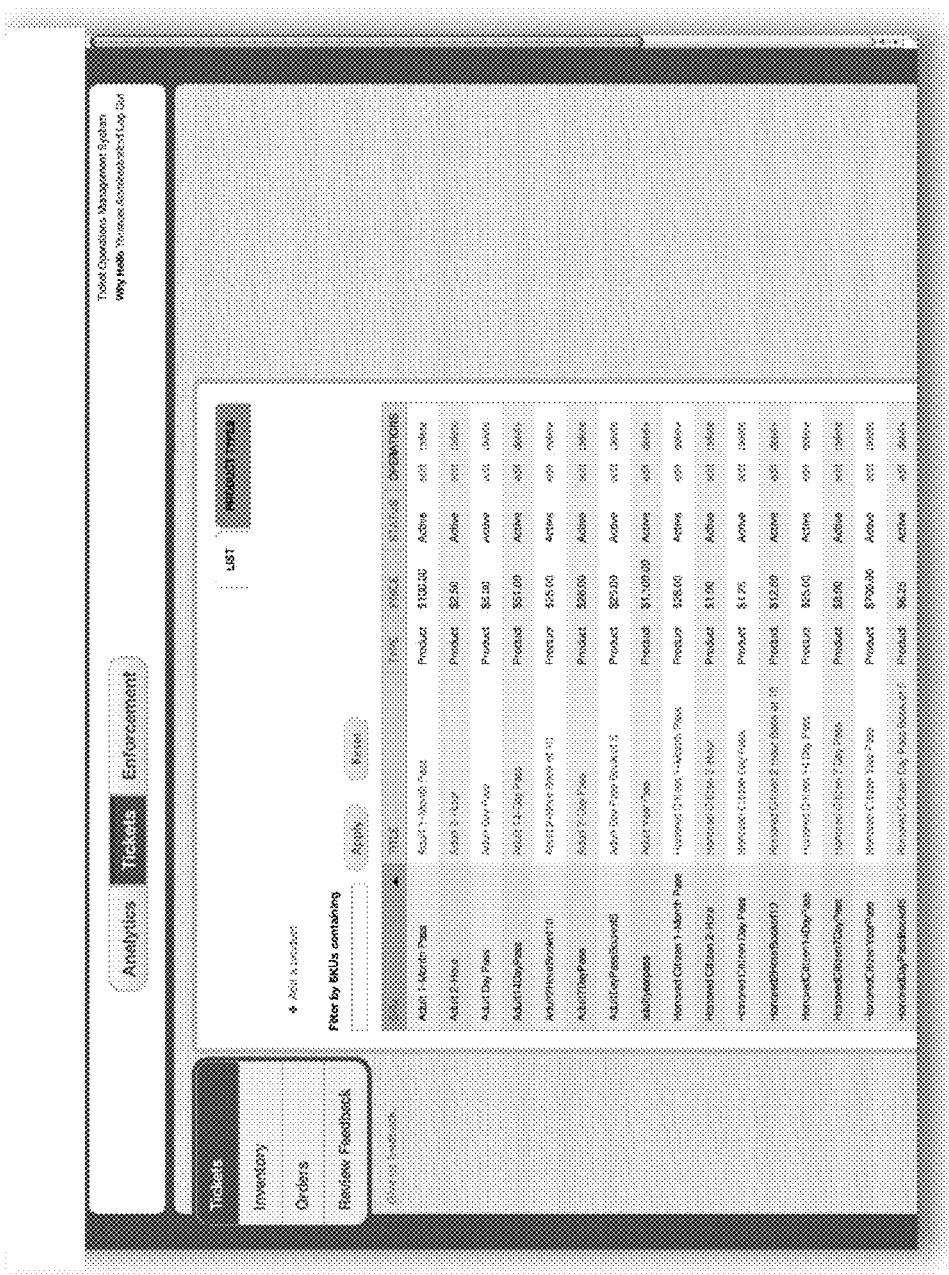
FIGS. 51-55 show exemplary graphical user interfaces of an inventory management system according the disclosure.
Figure 52:
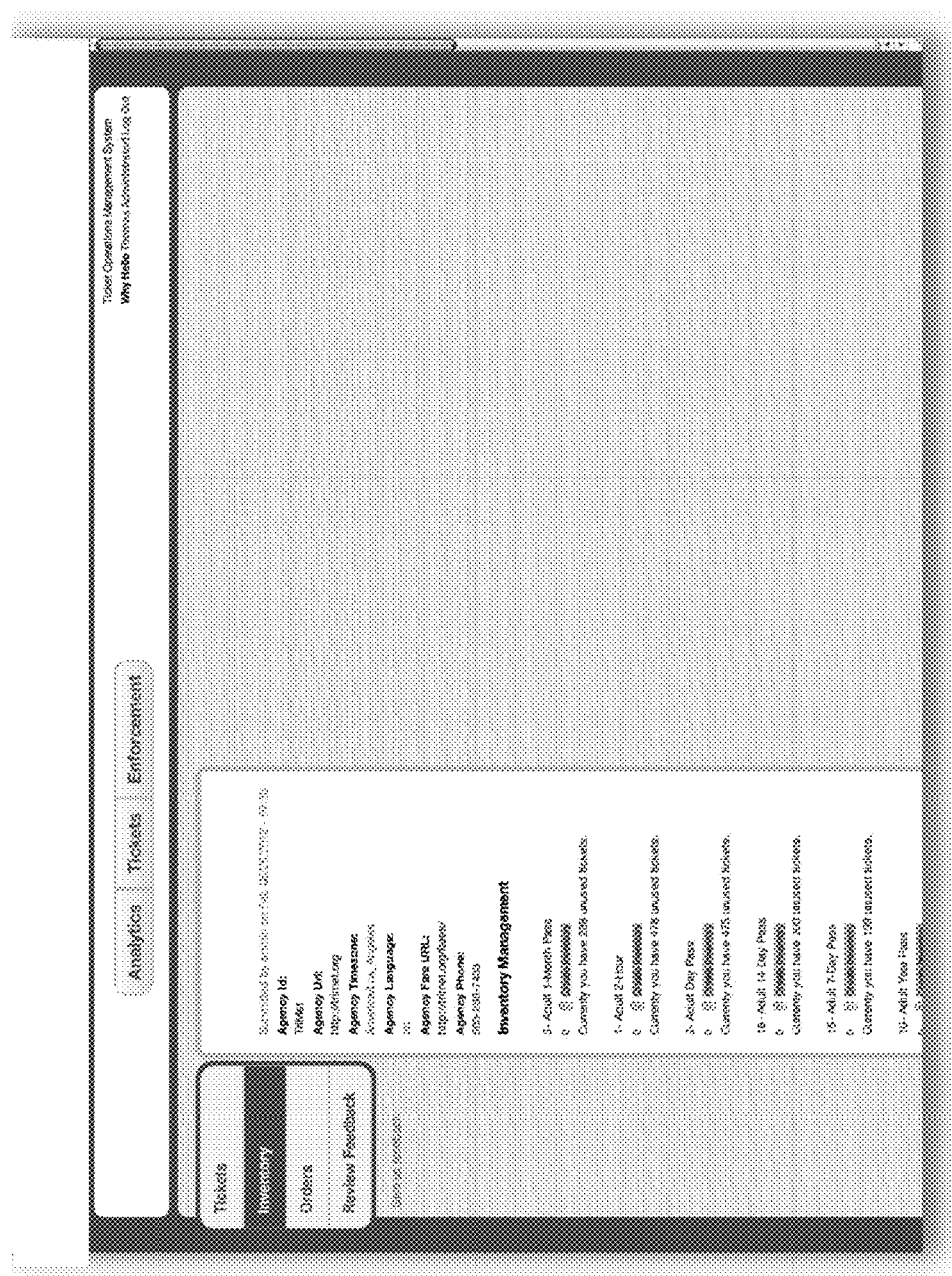
Figure 53:
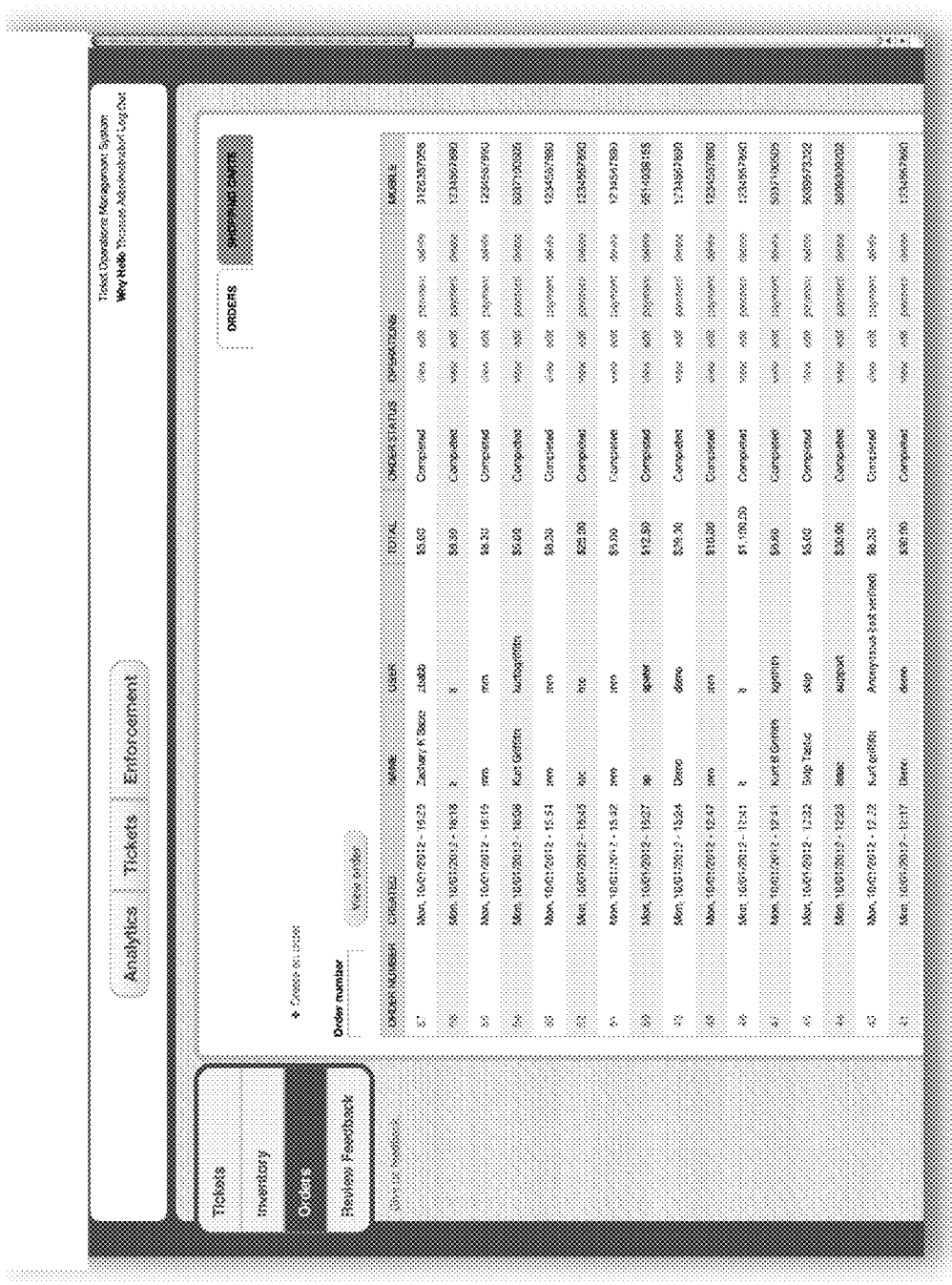
Figure 54:
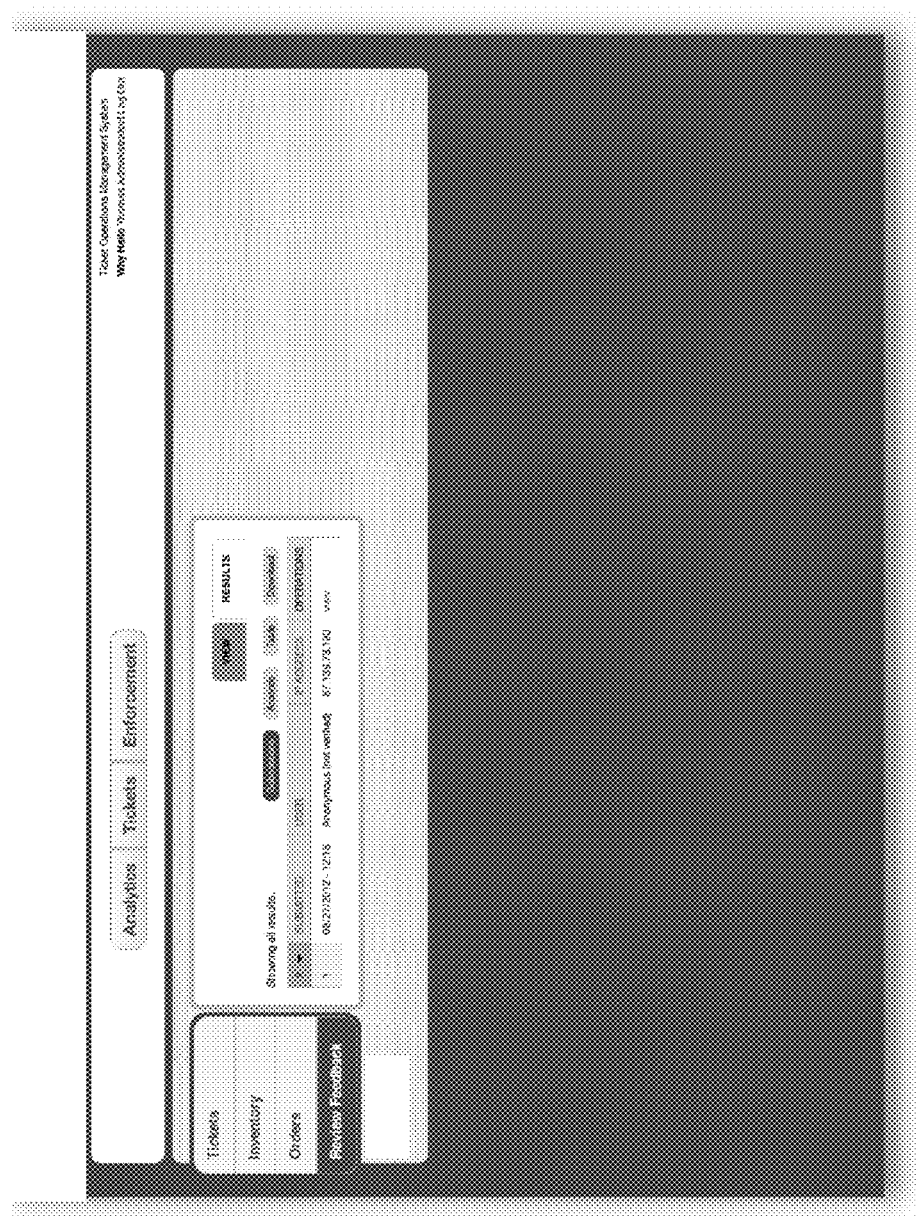
Figure 55:
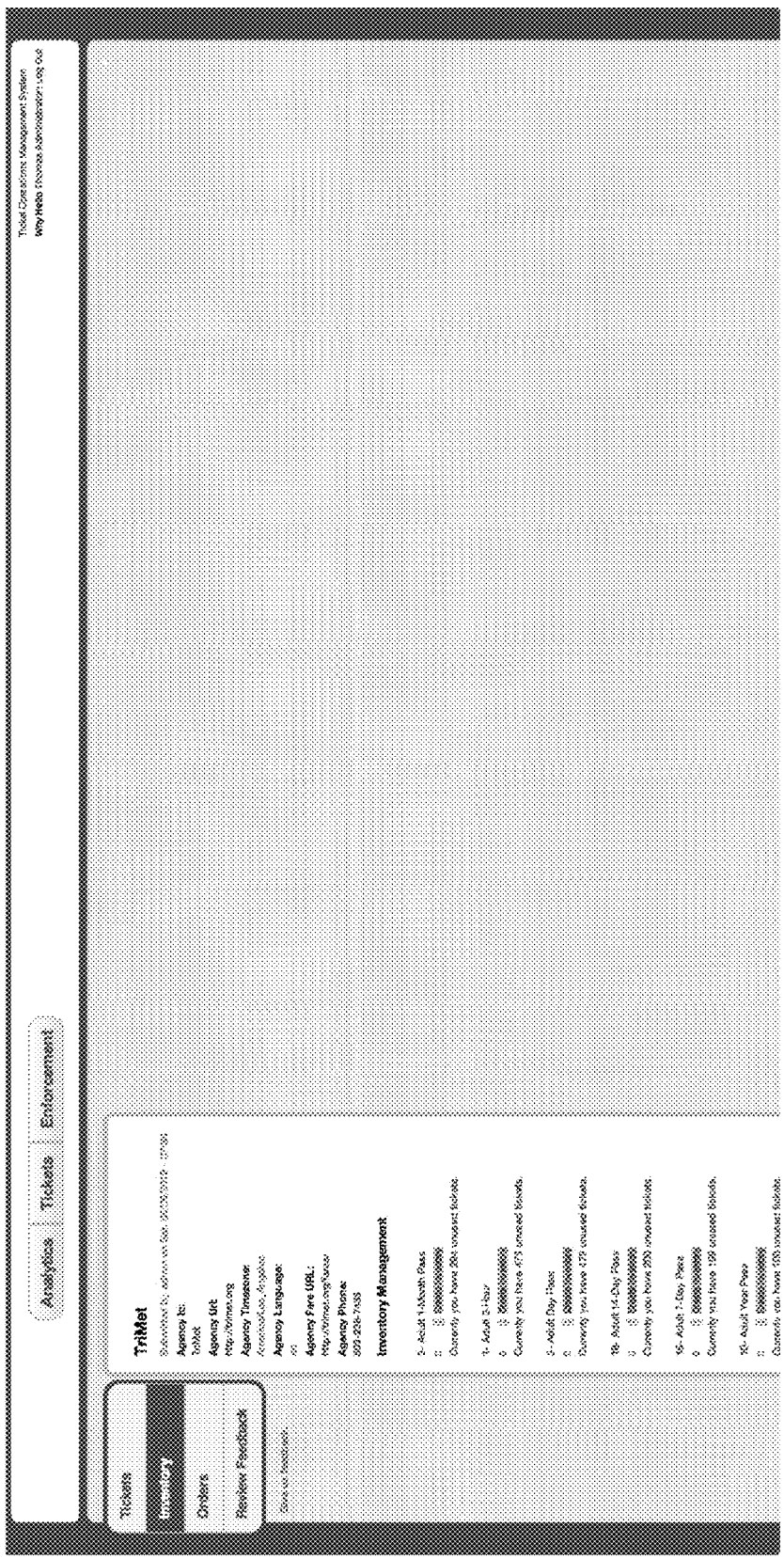

As described above, the Transit Ticket Designer provides tools to create transit tickets that contain unique animation, color and advertising design elements, and which provide an alternative authentication method to visual authentication via QR Codes. Additionally, advertising may be embedded in the transit tickets designed by the Ticket Designer. For example, FIGS. 48-50 show example mobile transit tickets that include advertisements embedded in the tickets.

When a ticket and animation scheme that contain advertising images are chosen, then when a rider enters a geofenced area, the rider is alerted to open an active ticket and the animation is activated.

In one example, a process for embedding advertising in a transit ticket includes performing the steps 1-16 as described above and additionally includes:

17.) Once an animation with an embedded advertising is viewed or clicked, then this data is recorded and synced with a server for reporting and analytics.

Thus, the Ticket Designer allows a user to select and/or modify a group of images to be presented as part of an electronic, mobile transit ticket. The transit ticket may then be retrieved by a transit application of the user's mobile device when the user wishes to board a transit vehicle. In order to manage the number, type, etc., of electronic transit ticket issued by the transit agency, a system, described below, is provided for allocating the tickets.

The Virtual Inventory Transit Ticket system allows for "virtual" tickets to be allocated by a transit agency. The allocation provides a unique number, the fare type, number of tickets, associated prices, and other key data. The virtual inventory system provides a means of financial accountability for the transit agency and the inventory management system owner. Tickets may be allocated via a web interface or Web Services. FIGS. 51-55 illustrate graphical user interfaces available to a transit agency or other administrator when using the inventory management system described herein.

Each fare type is created as a product type in the inventory system with associated warning and emergency threshold levels set. A transit agency manager logs into the system and allocates a number of tickets for each fare type and sets the threshold limits. When a rider requests a new ticket, an allocated ticket of the appropriate fare type is removed from inventory and assigned to the purchasing rider. This movement from inventory to purchased status is tracked via the unique identification assigned to each allocated ticket.

When the inventory levels of each ticket reach the assigned warning level, an email is sent to the transit agency administrator requesting an allocation of additional tickets. If a response is not received within a specified time period or the inventory level gets to a critical stage, then another email is sent to a broader team and a pre-set amount of inventory is automatically allocated.

All inventory transactions are reconciled with the payment processors records and the reports are exportable in PDF, CSV and XML format.

FIG. 56 shows a method 5600 for installing and launching a rider application via a mobile computing device in a transit ticket system. The method 5600 may be implemented via the mobile computing devices included in the transit ticket system discussed above with regard to FIGS. 1-55 or may be implemented via other suitable mobile computing devices and/or transit ticket systems.

At 5602 the method includes downloading a rider application from one or more application stores. Next at 5604 the method includes launching the rider application. At 5606 the method includes installing a Spritesheet containing ticket images, animation, text, graphics on the mobile device. The Sprite Sheet images may be used to provide the visual identifiers for authenticating the tickets. In some examples, the Sprite Sheet may be encrypted to prevent unauthorized access to the images used for the visual identifiers.

Next at 5608 the method includes generating a unique ID for the rider application. The unique ID associates the rider application with the mobile device. At 5610 the method includes capturing mobile device information. The mobile device information may include screen size and density, operating system type, operating system version, and network carrier. Additionally, capturing the mobile device information may include storing the mobile device information on the phone file system for later retrieval by an application code. At 5612 the method includes creating databases for offline use and analytics. In one example, ticket information and user activity may be stored in local and remote databases. At 5614 the method includes creating a default product catalog for storage on the mobile device. At 5616 the method includes setting an update interval that instructs the rider application on the frequency of validating changes with the server. In this way, the rider application may "phone home" periodically to retrieve validation. It will be appreciated that the update request may be implemented automatically without user interaction, in one example. Furthermore, the update request may be implemented regardless of the tickets purchased via the rider application, in one example.

FIG. 57 shows a method 5700 for purchasing a ticket via a transit ticket system. The method 5700 may be implemented by the transit ticket system described above with regard to FIGS. 1-55 or may be implemented by other suitable transit ticket systems.

At 5702 the method includes selecting a valid rider type. Next at 5704 the method includes selecting a valid fair type. The valid rider type and/or valid fair type may be selected from an installed product catalog on the mobile device.

At 5706 the method includes checking out by selecting a valid payment instrument or providing payment information. Next at 5708 the method includes verifying inventory is available on the server. In this way, it is assured that inventory is available.

At 5710 the method includes processing payment with a processor. In one example, the payment may be processed via a PCI compliant API or other known payment system. Next, at 5712, the method includes generating a ticket at the server. Generating a ticket may include creating a ticket record. At 5714 the method includes updating the inventory with the purchased ticket. Updating the inventory may include assigning a serial number to the ticket for inventory, in one example.

At 5716 the method includes retrieving ticket meta-data from the server. The meta-data may include latest designs such as colors, animation schemes, etc. Such meta-data may be added to the Sprite Sheet. Next at 5718 the method includes updating a user account with ticket(s) purchase info and meta-data. The meta-data may be stored on the local mobile device as part of the application. Thus, with purchase, the ticket may be rendered based on the mobile device application. Additional data exchange with a server is not necessary.

FIG. 58 shows a method 5800 for downloading a ticket via a transit ticket system. The method 5800 may be implemented by the transit ticket system described above with regard to FIGS. 1-55 or may be implemented by other suitable transit ticket systems.

At 5802, the method includes downloading ticket information to the mobile device which may be considered part of the purchase. In some embodiments, an application refresh may further be provided. Additionally, the application refresh may be initiated during a login process and/or via a pull-to-download feature, in one example. In another example, the downloaded ticket information may be encrypted and stored in a database in the mobile device. Next at 5804, in some examples, the method includes storing ticket meta-data (e.g. if there have been changes) on the mobile device.

At 5806 the method includes updating the server with the download information. In one example, the download information may include date/time, latitude, longitude, and/or app ID associated with the mobile device. Next at 5808 the method includes determining ticket parameters and storing the ticket parameters in the device. The ticket parameters may include a HTML canvass positioned, image colors, animation duration, animation path, and/or animation speed. The ticket parameters may be used to dictate how a ticket looks and acts upon activation (e.g., ticket launch). Additionally in one example, ticket meta-data, such as ticket type, may be analyzed to determine expiration times, isotypes, and appropriate informational and warning messages. The meta-data, expirations times, isotypes, informational messages, and/or warning messages may be stored in the local database. As noted above, this download may occur during purchase, at a set interval after purchase or at another time.

FIG. 59 shows a method 5900 for using a ticket via a transit ticket system. The method 5900 may be implemented via the transit ticket system described above with regard to FIGS. 1-55 or may be implemented via other suitable transit ticket systems.

At 5902 the method includes tapping a use button in the rider application to begin using a ticket. It will be appreciated that the rider application may be executed via a mobile device. Additionally, tapping the use button may mark the ticket as validated, in one example.

Next at 5904 the method includes capturing key ticket information and storing the information locally. The key ticket information may include validation date/time, latitude, and/or longitude and may be stored in a local database in the mobile device. It will be appreciated that the key ticket information may be used during the generation of a QR code.

At 5906 the method includes reading ticket meta-data and launching ticket animation. Reading the ticket meta-data may initiate retrieval and/or display of a ticket expiration time, ticket type, rider type, DayCodes, and ticket name. Images from the Sprite Sheet may be displayed as visual identifiers.

At 5908 the method includes adjusting the ticket canvass based on device capability. For instance, the size of the displayed ticket and/or animation sequence may be adjusted based on mobile device features, such as a screen size, operating system version, screen density, etc.

At 5910 the method further may include clicking a Daycode button and at 5912 the method includes generating a QR code in response to clicking the Daycode button. The QR code or other code which may be generated when the user taps a DayCode button via the rider application. The QR code may be encrypted, in one example. Furthermore, the QR code may be generated using ticket meta-data such as validation date/time, ticket type, rider type and validation latitude and longitude.

As provided above, information such as the Daycode or meta-data may be sent to the mobile device on a pre-set schedule or other schedule. For example, the system may update the Daycode and meta-data information on a 72 hour schedule or other select schedule. Such updates may be automated and/or preset and may occur without request or selection by the user.

Again, it should be appreciated that use of the ticket and presentation of the ticket and visual identifiers may be based on the pre-loaded information which occurred during purchase. In such examples, no data files or other information needs to be sent to the local application after purchase for use of the ticket. Instead, the local application is able to render and present the ticket for use based on the purchase information. Such an example enables a user to use the ticket in offline locations, including tunnels, out-of-range locations, etc.

FIG. 60 shows a method 6000 for updating validation changes in the rider application. The method 6000 may be implemented via the transit ticket system described above with regard to FIGS. 1-55 or may be implemented via other suitable transit ticket systems.

At 6002 at the rider application, reading the update interval value and securely calling the server to check for validation updates. The rider application may provide information regarding the version of the application and the time and date of the last update. At 6004 it is determined if updates are available at the server. It updates are not available (NO at 6004) the method ends. However, if updates are available (YES at 6004) the method proceeds to 6006. At 6006 the method includes automatically downloading data objects, meta data, images, etc., to the mobile device without any user interaction. At 6008 the method includes applying the update to the rider application. It will be appreciated that information needed to place ticket images in exact positions on the HTML canvass, determine image colors, animation duration, animation path, and/or animation speed is stored on the mobile device. This information dictates how the ticket looks and acts upon activation (e.g., ticket launch). This information may be downloaded to the mobile device during a ticket purchase or when the rider application is installed.

FIG. 61 shows a method 6100 for using a ticket via a rider application executed on a mobile computing device. It will be appreciated that the rider application may be referred to as a mobile application. The method 6100 may be implemented via the transit ticket system described above with regard to FIGS. 1-55 or may be implemented via other suitable transit ticket systems.

At 6102 the method includes starting the rider application and at 6104 the method includes searching for purchased tickets during application loading. Next, at 6106 the method includes selecting a ticket for use via an input command. The input command may be a voice command, an interaction with a visual component displayed in the mobile device, a laser scan, a command sent via a remove device (e.g., a Bluetooth command). Specifically in one example, the user may select a "my tickets" button displayed via the mobile ticketing application and a "use" button via the mobile ticketing application. This functionality may be implemented regardless of network connectivity of the mobile device. In one example, a user may be prompted with a confirmation alert in response to selection of a "use" button. The confirmation alert may ask the user if they are sure they want to use the ticket and provide a yes or no response choice via the user interface.

At 6108 the method includes retrieving ticket data and coupling the ticket data with ticket visualization instructions to render a valid ticket. The ticket data may include ticket type, user type, and/or other tokens stored on the mobile device. The ticket data may also include expiration time. Step 6108 may also include grabbing a lowest identification of the type of ticket used, checking if a daycode is current (if not update), grab ticket string, decode ticket string, grab user location, and/or caching the ticket data for re-launching, in one example. It will be appreciated that the data generated or retrieved in the aforementioned steps may be sent to the ticket management server when network connectivity is available. Further in one example, if a user modifies the time on the mobile device the mobile ticketing application may send a message to the user and/or lock the mobile device. In one example, the mobile ticketing application may be locked and unlocked remotely by the ticket management server.

At 6110 the method includes rendering the ticket and displaying ticket components based on display instructions. The ticket components may include a 1 or 2 dimensional bar codes, text, images, animations, and/or video. In one example, the method 6100 may be implemented regardless of network connectivity of the mobile device. However, in another example the tickets may be unlaunchable if the mobile device does not have network connectivity. In such an example, the mobile device is not locked per se. However, the state of the ticket may be modified. Once network connectivity is re-established the mobile device may "phone home" and the ticket may be usable again.

FIG. 62 shows a method 6200 for issuing citations via a mobile device of a ticket inspector. The method 6200 may be implemented via the transit ticket system described above with regard to FIGS. 1-55 or may be implemented via other suitable transit ticket systems.

At 6202 the method includes inspecting tickets via visual review, barcode scan, and/or near field communication (NFC). This inspection process determines whether a ticket is valid for a given person, date, time, and/or location. Additionally, it will be appreciated that the barcode scan and NFC inspection may be implemented via a mobile computing device of a ticket inspector. It will be appreciated that the mobile computing device may execute an inspector application.

At 6204 the method includes capturing the identity of the person's via drivers license image capture, magnetic strip swipe, or manual capturing identity via an inspector's mobile application. It will be appreciated that manual input may include typing the information into the application via a keyboard included in the device. In one example, the identity information may be stored locally on the mobile device executing the inspector application. The stored identity information may be used to provide a citation history and for synchronization with a ticket management server.

At 6206 the method includes generating a citation using government forms and the captured identification information. It will be appreciated that the forms may be mandated via local and/or state governments. The generated citation may be stored in the inspector's mobile computing device. In one example, the citation may be a uniform citation that includes the identification information captured via the inspector application at steps 6204.

At 6208 the method include at the inspector's mobile application sending the citation information to an appropriate legal entity. The citation information may be sent via API's, periodic downloads, and/or intermediate batch processes. In one example, the citation information may be sent to a court system via a web-service.

At 6210 the method includes sending the citation information to a local printer. In this way, all the parties may be provided with hard copies of the citation information. In one example, the method may further include sending citation information to the ticket management server. In this way, citation data may be gathered for providing real time analytics.

In another example method, an inspector application may be used to search for users (e.g., riders) in a database to determine if a citation should be issued. First, search criteria (e.g., partial names, names, phone number, and/or other unique identification data) may be entered into the inspector application to prompt display of the user's history for previous citations, warnings, and/or bans. Next, the inspector using the inspector application may review the results, if any are returned, and determine if a citation should be issued to the user. If it is determined that a citation should be issued the citation generation process may be implemented via the inspector application.

FIG. 63 shows a method 6300 for downloading a ticket. The method 6300 may be implemented via the transit ticket system described above with regard to FIGS. 1-55 or may be implemented via other suitable transit ticket systems.

At 6302 the method includes downloading, encrypting, and storing in a database, ticket information in a mobile device after completing a ticket purchase process. This process may also be implemented at application refresh points such as a "pull-to-download" point and/or during a login process. The ticket information may include ticket meta-data.

At 6304 the method includes updating the server with the date/time, latitude, longitude, and/or application id associated with the device. It will be appreciated that step 6304 may be implemented after the ticket information has been fully downloaded.

FIG. 64 shows a method 6400 for managing a transit ticket system. The method 6400 may be implemented via the transit ticket system described above with regard to FIGS. 1-55 or may be implemented via other suitable transit ticket systems.

The method includes at 6402 downloading a mobile ticketing application from a ticket management server, the mobile ticketing application including a graphical data sheet, ticket dictionary, and ticket strings, the graphical data sheet including a plurality of rendered graphical objects corresponding to a plurality of different tickets. In this way, graphical data which may correspond to a plurality of ticket types may be downloaded during installation of a rider application. As a result, the rider application has the information available to render a ticket without an extensive amount of additional data transfer between the mobile computing device and the ticket management server. As a result, the efficiency of subsequent communication with the server may be increased. Additionally, it will be appreciated that at least two of the graphical objects included in the plurality of graphical objects are associated with different types of tickets. Further in one example, the ticket purchase process includes exchange of payment data with the ticket management server. Further in one example, the ticket dictionary determines the position of graphical objects included in the graphical data sheet and the graphical data sheet includes animation sequences. In one example, the ticket string includes instructions for animating graphical elements in the graphical data sheet. The instructions for animation may include dynamic instructions related to velocity of an object, fading of an object, path of an object, rotation of a object, brightness of an object, resizing an object, geometry of an object, object color, etc. In another example, the ticket strings includes color data, transparency data, and scale data related to the graphical elements in the graphical data sheet.

At 6404 the method includes receiving ticket rendering instructions from the ticket management server in response to completion of a ticket purchase process via the mobile computing device. The ticket rendering instructions may include data, command, etc., for selecting graphical objects in the graphical data sheet.

Next at 6406 the method includes rendering for display an active ticket on the mobile computing device with data stored on the mobile computing device based on the ticket rendering instructions, the graphical data sheet, ticket dictionary, and ticket strings in response to an activation input command. It will be appreciated that the activation input command may be a command initiated by a user via interaction with the mobile computing device. For example, the user may select an "activate" or "use" button on a touch interface. Additionally, rendering an active ticket for display may include selecting one or more graphical objects for display from the plurality of rendered graphical objects, in one example.

At the ticket management server the method includes at 6408 automatically sending updates of one or more of the graphical data sheet, ticket dictionary data, and ticket string at predetermined time intervals to the mobile computing device independent of ticket purchase processes implemented by the mobile computing device. In one example, automatically sending updates includes adding, overwriting, or deleting data in the graphical data sheet, ticket dictionary, or ticket strings. In this way the ticketing graphics may be updated regardless of ticket purchase or activation. As a result, the reliability of the ticketing graphics updates is increased. Further in one example, rendering the active ticket includes selecting one or more graphical objects for display from the plurality of rendered graphical objects. Still further in another example, the selected graphical objects are layered for display.

FIG. 65 shows a method 6500 for gathering analytic information from a transit ticket system. The method 6500 may be implemented via the transit ticket system described above with regard to FIGS. 1-55 or may be implemented via other suitable transit ticket systems.

At 6502 the method includes gathering ticket user data via a ticket management server in communication with a plurality of mobile computing devices executing a mobile ticketing application. At 6504 the method includes generating analytical ticket data based on the ticket use data, the analytical ticket data including one or more of total ticket sales, total number of riders, peak ridership, base ridership, average ridership, ridership percentage trends, number of approved tickets, most activated ticket type, frequency of ticket activation, time of activated tickets, new system users, or location of activated ticket. Next at 6506 the method includes at the ticket management server, displaying the analytical ticket data in an analytic dashboard. In one example, the ticket user data is gathered in real time. Further in one example, the analytical ticket data is applied to a map. In such an example the map may be a heat map. Still further in one example, the analytical ticket data is further gathered from a plurality of ticket inspection mobile computing devices. In one example, the analytic data may be manipulated in real-time using on screen interactive tools such as time sliders, data picker, and metadata drop down. Additionally in one example, the analytic data applied to the map may be manipulated in real-time to show different rider and ticket types over a chosen period of time.

Further in one example, the analytic data, after chosen time frames and meta factorings, may be exported in multiple data formats. Still further in one example, the analytic data may be rendered in different styles of graph chosen by the user. In another example, the analytic data may be viewed in selected time/date ranges such as a week over week, month over month, year over year view, etc. Further in one example, the analytic data presented on a map may show points of interest and nearest transit stop data. In another example, the analytic data on a map may be animated through chosen date range to show user activity over time visually.

Further in one example, the analytic data may be sorted based on column value. In another example, the analytic data may be filtered by on-screen selections. Still further in another example, the analytic data may be drilled down into by interacting with the display. In this way, the analytic data may be viewed an manipulated in a variety of ways. Enabling a user of the analytic dashboard to easily comprehend the analytic data as well as quickly and efficiently manipulate the analytic data according to their predilection.

Figures 66, 67:
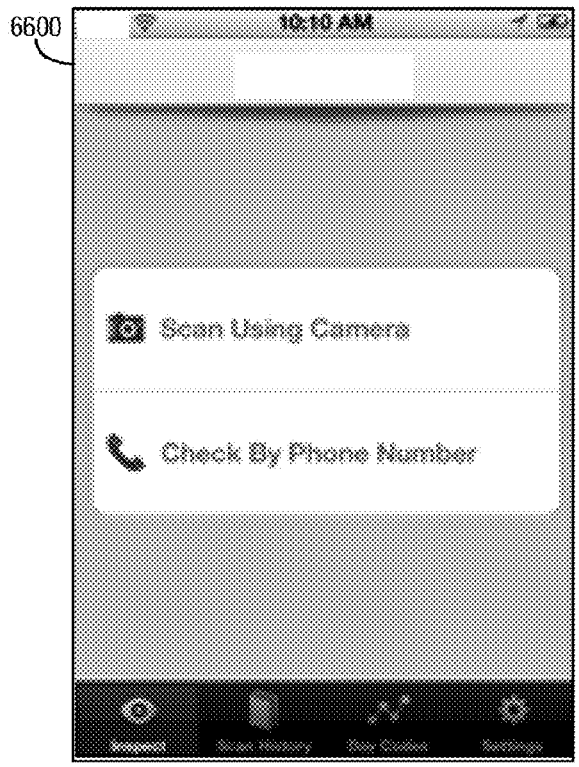
FIGS. 66-68 show example graphical user interfaces which may be displayed by an inspector application.

FIG. 66 shows an example graphical user interface 6600 executed via an inspector application on a mobile computing device in the transit ticket system. It will be appreciated that the inspector application may require a pin, password, username, email, etc., to access the application. If an incorrect pin, password, username, etc., is entered accessed to the inspector application is denied. The pin, password, username, etc., may be checked by user management backend in the ticket management server. In this way, it is assured that a user of the inspector application has sufficient privileges. In one example, privileges may be added and/or revoked through the user management backend in the ticket management server. Specifically in one example, the inspector application may be locked in the case of revoked privileges.

The mobile computing device executing the inspector application may receive ticket information via a camera, a laser scan, near field communication (NFC), Bluetooth, airdrop, etc. Specifically, in one example the device executing the inspector application may be configured to input the ticket information via camera, NFC, and Bluetooth. In this way, a variety of techniques may be used to gather ticket information, thereby expanding the device's capabilities. The location and time of the mobile device executing the inspector application may be determined and stored or otherwise recorded when the ticket information is received. Thus, ticket information (e.g., ticket tokens) may be scanned or otherwise uploaded into the device executing the inspector application. After the inspector application receives the ticket information (e.g., token data) the application may decrypt and parse the ticket information (e.g., token data) and may send this information to the ticket management server for validation. The information may be sent to the server in real-time, in one example. Additionally, the time and location data of the scan or information upload may also be sent to the ticket management server. In this way, ticket analytics may be gathered via the transit ticket system. Additionally or alternatively, the inspector application may locally determine token validity.

FIG. 67 shows another example graphical user interface 6700 executed via an inspector application on a mobile computing device in the transit ticket system. Token information and server validation check is displayed via the user of the inspector application after the ticket management server decrypts and parses token data and/or token validity is locally determined via the inspector application. The token information and server validation check is displayed to enable a user of the inspector application to make a determination on the validity of the token. The token information may include a serial number, token type, and/or data from the medium presenting the token.

After the token data is displayed, the mobile computing device may synchronize scan data or other uploaded ticket information with the ticket management server. In one example, this synchronization may be implemented in real time. Additionally, the inspector application may support local and server-side blacklisting to flag accounts, tokens, and/or other data points specific to a token. Additionally, a visual element 6702 indicates the status of the token check. In one example, the inspector application is configured to constantly refresh. However, when the inspector application looses network connectivity, a refresh request, and/or other data slated to be sent to the server may be stored locally.

Figure 68:
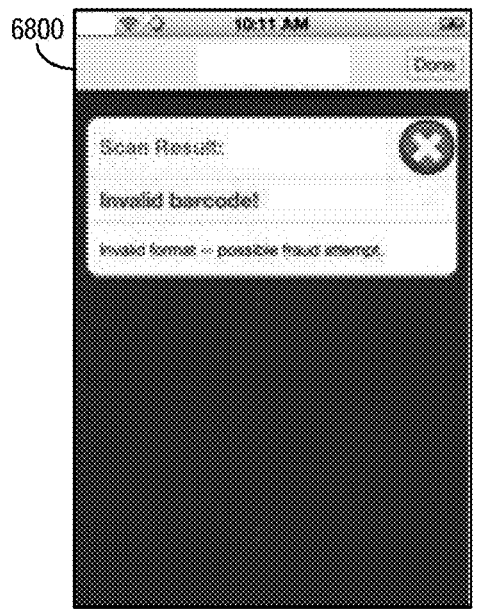

FIG. 68 shows another example graphical user interface 6800 executed via an inspector application on a mobile computing device in the transit ticket system. As shown, the inspector application detects and displays error information when an invalid barcode is scanned, displaying an error message. A description of the invalidity of the scanned barcode may be displayed. It will be appreciated that other token information may be invalidated, in other examples.

In an example method for inspecting a ticket (e.g., checking a tickets validity) first a token stored in a rider application may be scanned or otherwise uploaded (e.g., NFC, Bluetooth, picture upload) to an inspector application. Next, the token may be synced to the backend via the inspector application. Syncing to the backend may include sending token information to a ticket management server. Next, the validity of the token information may be checked via the ticket management server and/or the inspector application. Next, validity information corresponding to the ticket may be presented via the inspector application. It will be appreciated that the ticket management server may send validity data to the inspector application prior to presentation of the validity information. Next, the token and other data uploaded to the inspector application are stored in the inspector's device via the inspector application. In one example, the inspector application may access the stored data via a graphical user interface. The stored data presented in the graphical user interface may include the type of token that was scanned (e.g., adult/youth, 2-hour/1 day, etc.), the token' status (e.g., valid/invalid), token scan time, token scan location, etc. It will be appreciated that the token data displayed via the inspector application may include alphanumeric symbols, images, graphics, animation, etc.

Further in one example, token lookup via the inspector application may be supported through use of the token purchaser's account, such as mobile number, driver's license number, email address, and/or other identification information. Information provided by the account owner may be displayed in the inspector application when looking up a token to allow positive identification of the person presenting the token vs. the token owner.

In one example, the inspector application may be configured to display available tokens for a giver user in response to receiving token information. The token information may include a phone number, barcode data, or other identification information uploaded via NFC, Bluetooth, manual input, a camera, a laser scan, etc.). Additionally, the uploading action executed via the inspector application may be logged by the ticket management server (e.g., on the backend).

Still further in one example, the inspector application may be made aware of the graphical layout, animation, color, etc., of valid tickets. In this way, another layer of ticket verification is provided in the ticketing system.

Figure 69:
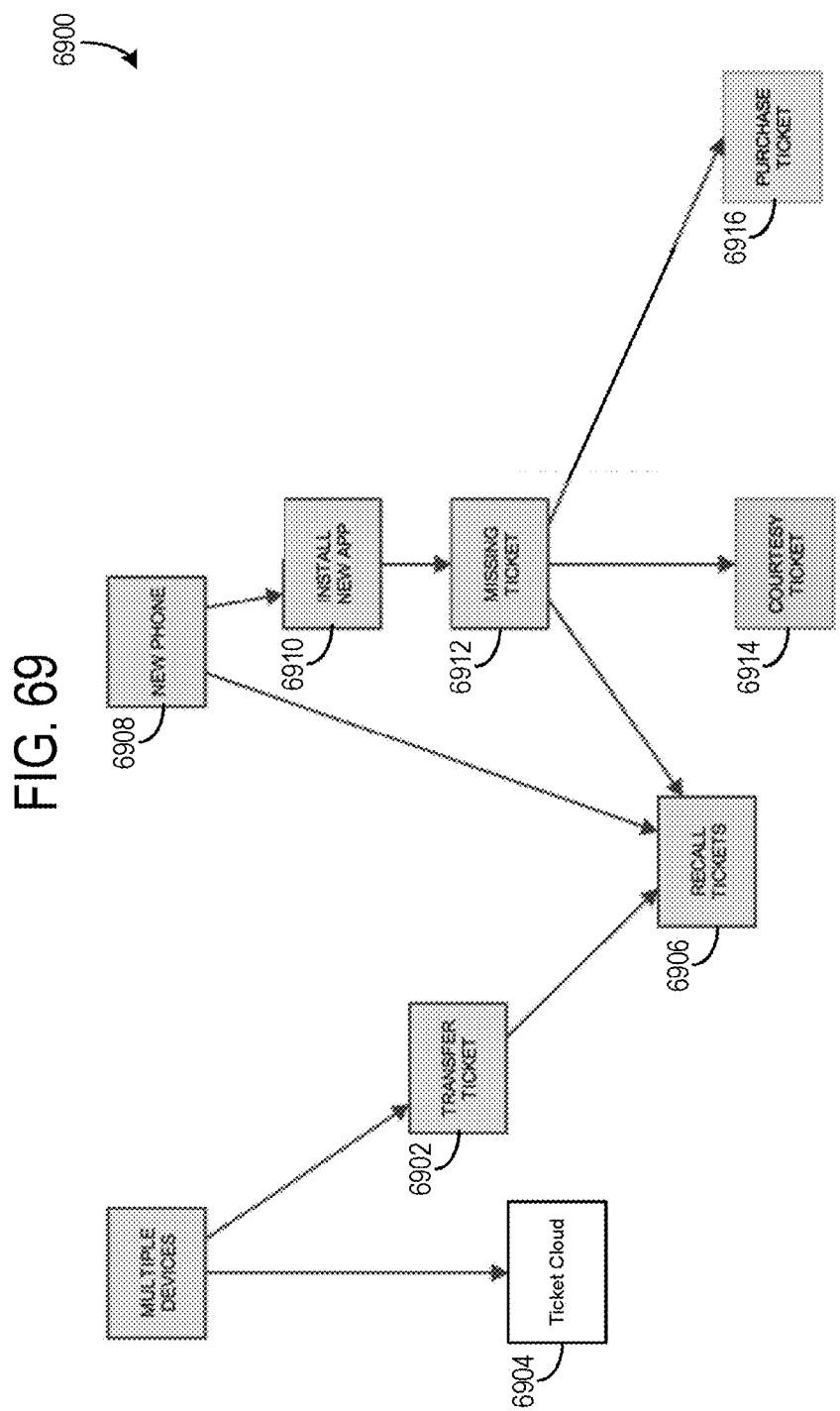
FIG. 69 shows an example process flow for managing tickets via multiple devices.

FIG. 69 shows a process flow for managing tickets via multiple devices. It will be appreciated that the process flow shown in FIG. 69 may be implemented via the transit ticket system described above with regard to FIGS. 1-55 and 66-68.

In the process flow 6900 shown in FIG. 69 tickets can only be stored on one device at a time. Thus, for a user wishing to use tickets on multiple devices they may either purchase tickets on both devices or transfer the tickets between the devices. At 6902 a ticket is transferred between two devices. In one example, a recall feature in the TOMS may be used to enable the ticket transfer. At 6904 tickets may be accessed via a cloud computing network.

At 6906 tickets may be recalled via the TOMS. This feature allows a user (e.g., rider) to "remove" tickets from a device and make them available for download again. Recalling a ticket may be initiated and completed by the user (e.g., rider) without the need for agency assistance, if desired. Recalling the tickets may include the following steps, first a user (e.g., rider) logs into their account via a network (e.g., the Internet) connected to the ticket management server and navigates to a "my tickets" interface. Next the user selects a "recall my unused tickets" button. The mobile ticketing application (e.g., rider application) associated with the recalled tickets then becomes "locked". The recalled ticket may become available again after a predetermined period of time (e.g., 24 hours, 48 hours, 72 hours, etc.). Once the tickets are available for download the user can open the mobile ticketing application via a device and select a "pull to refresh" button to download the tickets. It will be appreciated that the ticket may be downloaded to another device executing the mobile ticketing application. In one example, if the user has a device with unused tickets they can bypass the aforementioned waiting period and immediately make the tickets available on the server by selecting a "pull to refresh" button on that device, in one example. The device will then be locked. The locked device may be unlocked through user selection of an unlock button. The unlock button may be presented in the same graphical interface as the pull to refresh button. After the device is unlocked the tickets are available for download. Again, the user may log into the mobile ticketing application and select a "pull to refresh button" to download the recalled tickets. The user may access their account via a network browsing application to recall, replace, and/or transfer unused tickets, in one example. The network browsing application may access the user's account via the ticket management server.

At 6908 the user may obtain a new phone or other suitable mobile computing device. If the user has access to their old device, the user may use the recall method at 6906 for ticket transfer. However, if the user does not have access to their old phone the process flow proceeds to 6910. In one example, if the old device was lost the user may contact the ticket issuer if they have existing tickets of value (e.g., unused tickets, time left).

At 6910 the user installs a new mobile ticketing application on their new device. The application may have a new unique identification number. Next at 6912 the process flow includes retrieving missing tickets. The missing ticket may be retrieved via the user selecting the "pull to refresh" button on the mobile ticketing application. In response to selection of the "pull to refresh" button it is determined if the user has any unused tickets. If the user does have unused tickets, the process flow proceeds to 6906 where the ticket recalling steps are implemented. However, if the user does not have any unused tickets a courtesy ticket may be issued at 6914. The courtesy ticket may be issued by the TOMS. The user may contact an administrator in the TOMS to request a courtesy ticket, in one example. In one example, the user may send a courtesy ticket request to the TOMS through a refund interface. In one example, if the user has an active ticket that still has value (e.g., a 30 day ticket, a 1 year ticket) the user may request a courtesy ticket. However, if the courtesy ticket request is denied the user may purchase a ticket at 6916.

Figure 70:
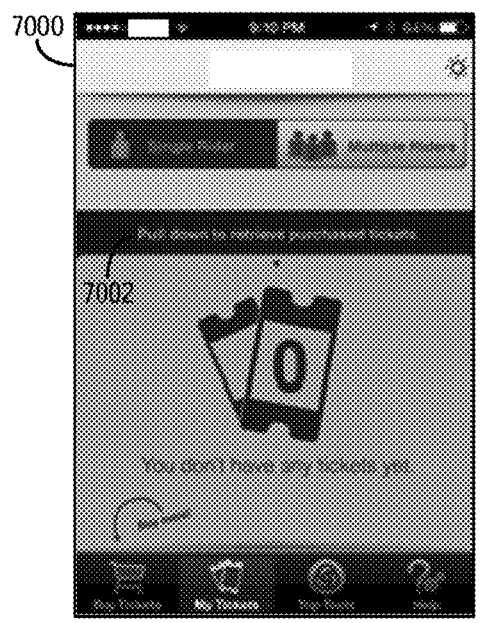
FIG. 70 shows a graphical user interface executed via a mobile ticketing application on a mobile computing device.

FIG. 70 shows a graphical user interface 7000 executed via a mobile ticketing application on a mobile computing device in the transit ticket system. A "pull to refresh" button is shown at 7002. It will be appreciated, that the "pull to refresh" button may be selected by a user to download ticket which were previously purchased via a network browsing application. For instance, a user may purchase tickets via a desktop computing device through a web-browser and then access a mobile ticketing application via their mobile device and select "pull to refresh" to download the purchased tickets to their mobile device. In this way, a user may prompt ticket download via their mobile device. However, in other examples the tickets may be automatically downloaded to the mobile device in response to ticket purchase.

Figure 71:
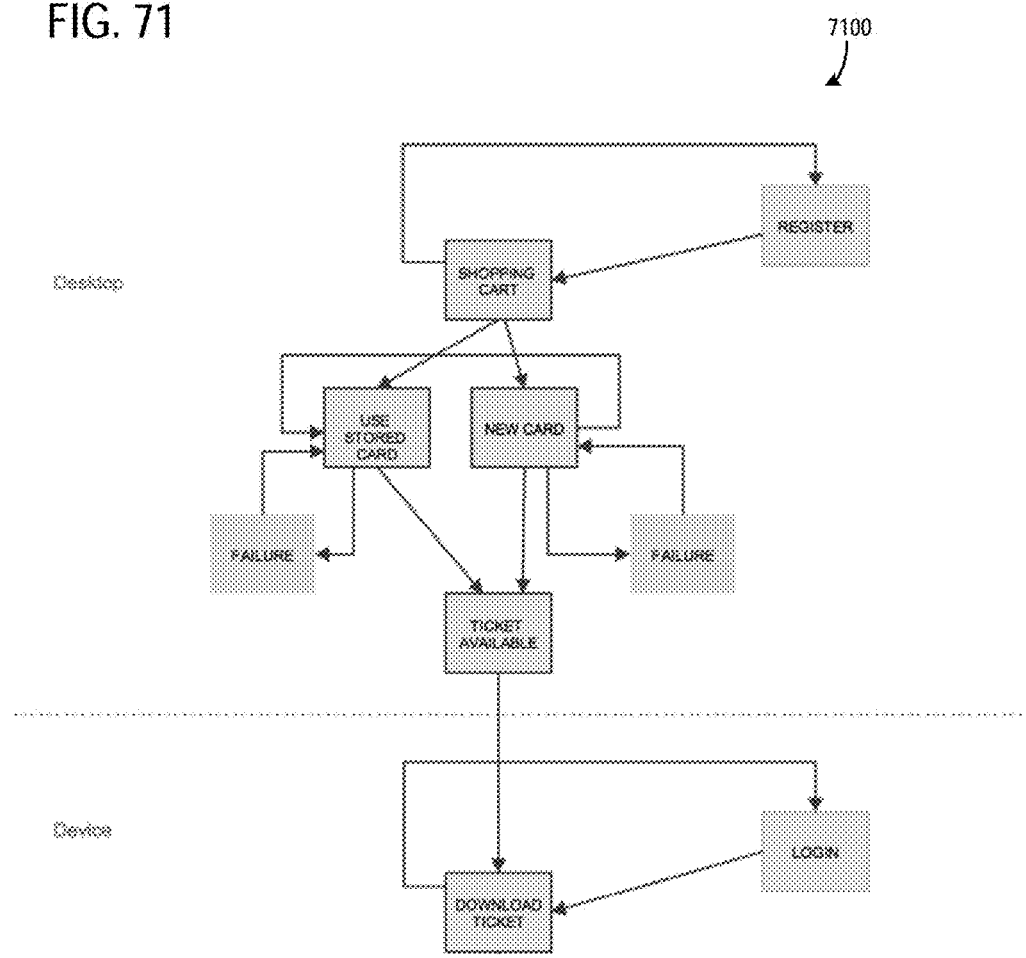
FIG. 71 shows a process flow for purchasing a ticket via a network browsing application and downloading the purchased tickets via a mobile device.

FIG. 71 shows a process flow 7100 for purchasing a ticket via a network browsing application and downloading the purchased tickets via a mobile device. The process flow 7100 may be implemented via the transit ticket system, described above. The browsing application may be executed via a desktop computing device or other suitable computing device. At a desktop application the user may add tickets to a shopping cart. The user may proceed to checkout if they are logged in. However, if they are not logged in they are prompted to register. Registration may include creating an account via a network site. After the user selects checkout the user may enter new payment card information or select stored payment card information. If the payment card information fails to be accepted the user will be notified. However, if the payment card information is accepted the purchased tickets are made available for download. Next, the mobile device downloads the available tickets via selection of a "pull to refresh" button. In response to selection of the "pull to refresh" button tickets will be marked downloaded. However, if a user in not logged into the mobile ticketing application executed on the mobile device the user may be prompted to login. In one example, tickets may be automatically downloaded in response to login.

Figure 72:
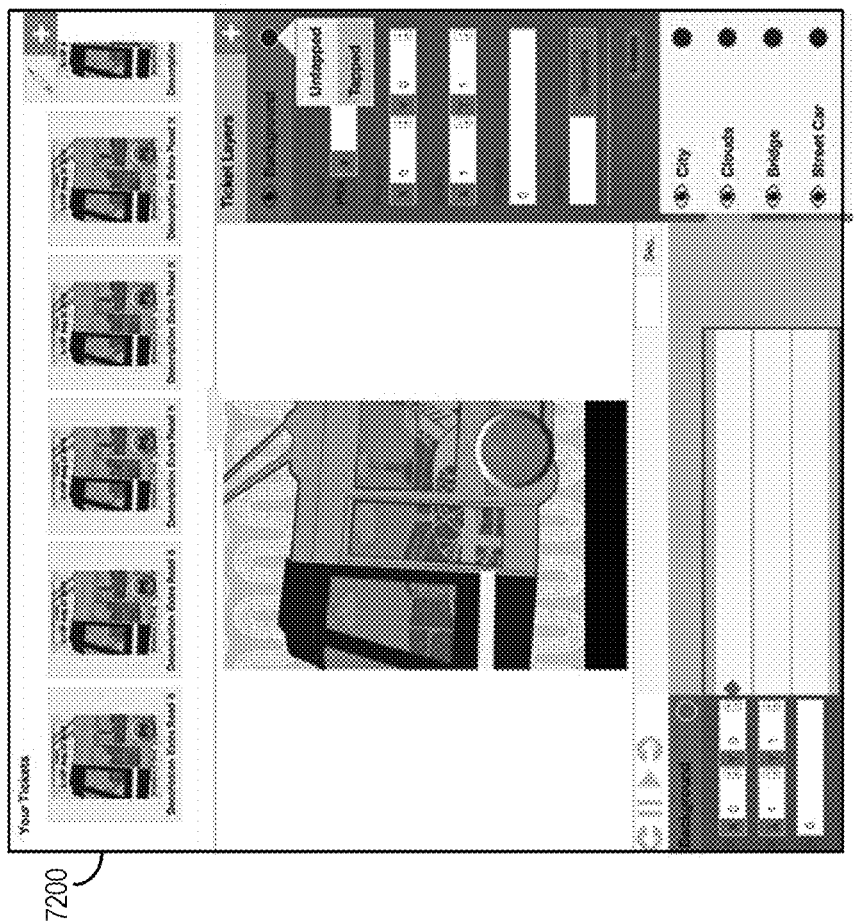
FIG. 72 shows an example ticket design interface.

FIG. 72 shows an example ticket designer interface 7200 which may be generated via a ticket designer in ticket management server. In one example, a user of the ticket designer interface may be initially presented with a blank canvas from which they can load previous tickets and/or create a new ticket. As shown, the user may be given numerous options to navigate the creation of a ticket. For example, ticket layers may be selected to be added to the ticket. The example ticket layers shown in FIG. 72 include background, city, clouds, bridge, and streetcar. However, numerous types of layers have been envisaged. As shown, a user can select the position (e.g., x-y coordinates) of each of the layers. Additionally, a plurality of previously created tickets may be presented in the interface. Furthermore, the color of the layers and/or specific objects in the layers may be selected via a color picker. The color picker may enable a user to enter numerical RGB values or select a RGB value in a graphical plot. The ticket design interface may also enable a user to modify the timeline of ticket animations.

As shown, a user may work in a tapped mode and an untapped mode. The tapped mode may show an intended graphical configuration of the ticket when the ticket is selected for use via the mobile ticketing application. On the other hand, the untapped mode shows an intended graphical configuration of the ticket when the ticket has not been selected for use. In this way, a designer can quickly view different states of the ticket. It will be appreciated that the ticket designer may store and retrieve data from a rules engine, described in greater detail herein with regard to FIG. 73.

Figure 73:
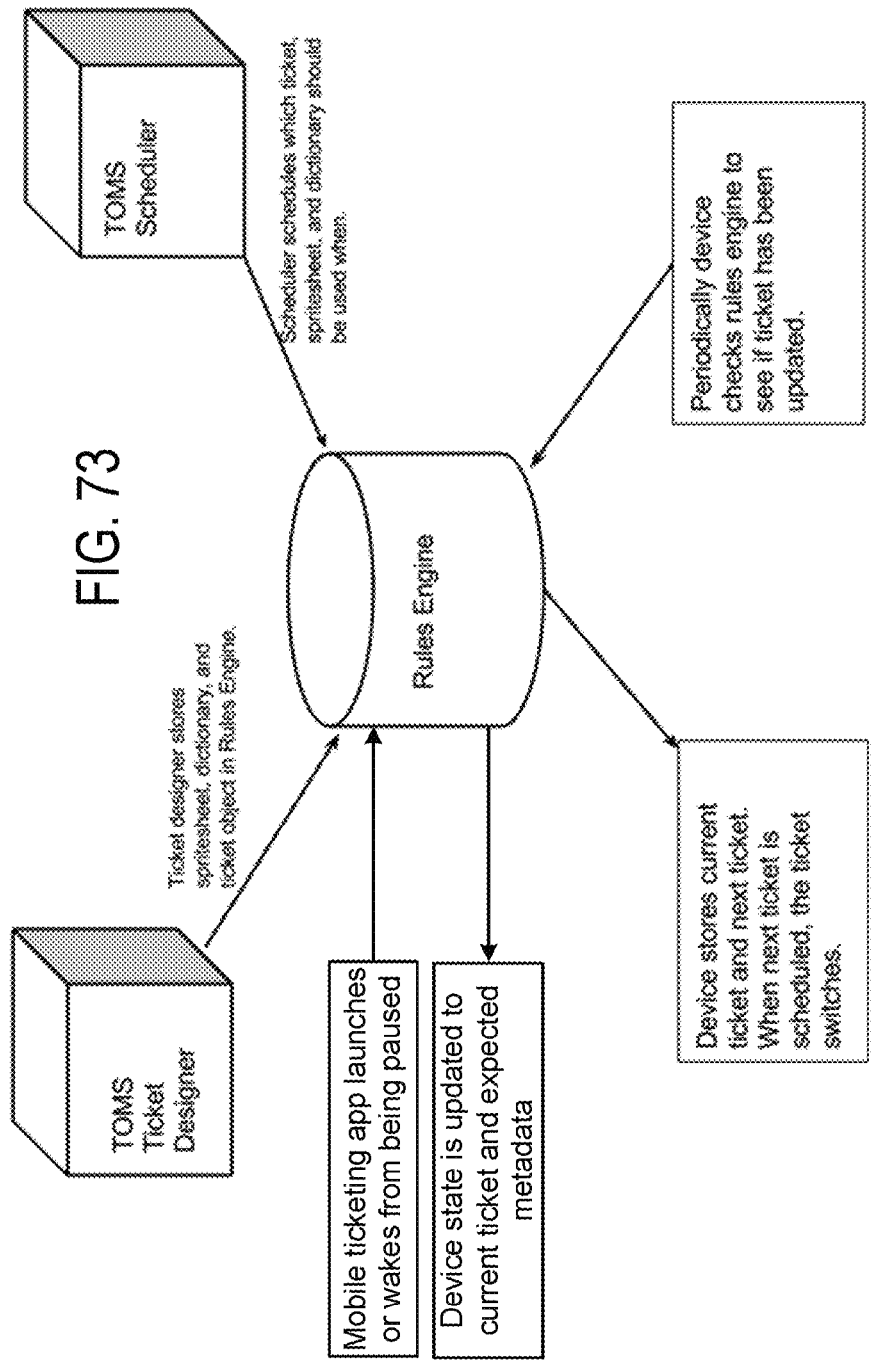
FIG. 73 shows a depiction of the functionalities of the rules engine.

FIG. 73 shows a depiction of the functionalities of the rules engine 7300. The rules engine 7300 may be executed via the ticket management server discussed above. The rules engine may receive ticket information from a ticket designer program. The ticket information may include a graphical data sheet (e.g., a spritesheet), a ticket dictionary, and/or ticket objects. The rules engine may also communicate with the mobile device to switch tickets according to a schedule.

Additionally, the mobile ticketing application may communicate with the rules engine to request metadata in response to application launch, application wake-up, and/or application pause. In response to a metadata request the rules engine sends metadata to the mobile ticketing application. The device state may be updated to the current ticket in response to receiving the metadata. Additionally, a TOMS scheduler may send a ticketing schedule to the rules engine. The ticketing schedule may define the time period when the graphical data sheets (e.g., spritesheets) and ticket dictionary are to be used. In this way, the ticket scheduler coordinates data with the rules engine regarding when to release a new ticket design. Furthermore, the mobile device may periodically check the rules engine to see if ticket data has been updated via the ticket designer.

It will be appreciated that each of the computing devices described above with regard to FIGS. 1-73 may include code stored in memory executable by a processor configured to implement various instructions such as the methods, processes, etc., described herein. The memory includes storage devices with one or more of the following characteristics: volatile, nonvolatile, dynamic, static, read/write, read-only, random access, sequential access, location addressable, file addressable, and content addressable. In some embodiments, the memory and the processor may be integrated into one or more common devices, such as an application specific integrated circuit or a system on a chip. Example computing devices include desktop computing devices and mobile computing devices (e.g., smartphones, tablets, laptops, etc.).

Further it will be appreciated that the computing device may include displays for presenting graphical data described above.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A ticket management system comprising:
one or more visually validated ticketing servers for communicating with at least one mobile computing devices, the visually validated ticketing servers being configured to:
generate a plurality of graphical objects and screen positions data associated with one or more graphical objects of the plurality of graphical objects, wherein the plurality of graphical objects and the screen positions data are generated based on ticket designs configured by a transit agency;
generate ticket strings including at least one of: (i) an animation instruction, (ii) color data, (iii) transparency data, and (iv) scale data, wherein the ticket strings are associated with one or more graphical objects of the plurality of graphical objects and generated based on at least a subset of the ticket designs that are determined to be active based on a ticket-design schedule configured by the transit agency;
receive transaction data associated with a mobile computing device and representing a completed ticket purchase for use by the mobile computing device;
prior to receiving the transaction data, transmit the plurality of graphical objects to the mobile computing device;
transmit the ticket strings and the screen positions data to the mobile computing device; and
after receiving the transaction data, transmit a ticket rendering instruction to the mobile computing device, wherein the ticket rendering instruction identifies at least a subset of the plurality of graphical objects that are associated with the ticket,
wherein the mobile computing device, in response to a ticket activation command received by the mobile computing device, is caused to:
dynamically render the subset of the plurality of graphical objects identified in the ticket rendering instruction at screen positions included in the screen positions data, the dynamic rendering of the subset of the plurality of graphical objects including at least one of:
(i) animating one or more graphical objects in the subset of the plurality of graphical objects based on the animation instruction,
(ii) applying colors to one or more graphical objects in the subset of the plurality of graphical objects based on the color data, (iii) configuring degrees of transparency to one or more graphical objects in the subset of the plurality of graphical objects based on the transparency data, and (iv) scaling one or more graphical objects in the subset of the plurality of graphical objects based on the scale data, and display the rendered subset of the plurality of graphical objects.

2. The ticket management system of claim 1, wherein the plurality of graphical objects are associated with at least two types of tickets.

3. The ticket management system of claim 1, wherein the visually validated ticketing servers are further configured to automatically transmit updates of one or more of: the plurality of graphical objects, the screen positions data, and the ticket strings at predetermined time intervals to the mobile computing device independent of the ticket purchase process.

4. The ticket management system of claim 3, wherein the updates include at least one of adding, overwriting, and deleting at least a portion of the plurality of graphical objects, the screen positions data, and/or the ticket strings.

5. The ticket management system of claim 1, wherein the purchase process includes exchange of payment data with the ticket management system.

6. The ticket management system of claim 1, wherein the plurality of graphical objects includes includes an animated graphical object.

7. The ticket management system of claim 1, wherein the subset of the plurality of graphical objects that are associated with the ticket and identified in the ticket rendering instruction are layered for display.

8. The ticket management system of claim 1, wherein the screen positions data is generated based on a device type of the mobile computing device.

9. A method for managing a ticket management system, comprising:

generating a plurality of graphical objects and screen positions data associated with one or more graphical objects of the plurality of graphical objects, wherein the plurality of graphical objects and the screen positions data are generated based on ticket designs configured by a transit agency;

generating ticket strings including at least one of: (i) an animation instruction, (ii) color data, (iii) transparency data, and (iv) scale data, wherein the ticket strings are associated with one or more graphical objects and generated based on ticket designs that are determined to be valid based on a ticket-design schedule configured by the transit agency;

receiving transaction data associated with a mobile computing device and representing a completed ticket purchase for use by the mobile computing device;

prior to receiving the transaction data, transmitting the plurality of graphical objects to the mobile computing device transmitting the ticket strings objects and the screen positions data to the mobile computing device;

after receiving the transaction data, transmitting a ticket rendering instruction to the mobile computing device, wherein the ticket rendering instruction identifies at least a subset of the plurality of graphical objects that are associated with the ticket, wherein the mobile computing device, in response to a ticket activation command received by the mobile computing device, is caused to:

dynamically render the subset of the plurality of graphical objects identified in the ticket rendering instruction at screen positions included in the screen positions data, the dynamic rendering of the subset of the plurality of graphical objects including at least one of:

(i) animating one or more graphical objects in the subset of the plurality of graphical objects based on the animation instruction, (ii) applying colors to one or more graphical objects in the subset of the plurality of graphical objects based on the color data, (iii) configuring degrees of transparency to one or more graphical objects in the subset of the plurality of graphical objects based on the transparency data, and (iv) scaling one or more graphical objects in the subset of the plurality of graphical objects based on the scale data, and display the rendered subset of the plurality of graphical objects.

10. The method of claim 9, further comprising, automatically transmitting updates of one or more of: the plurality of graphical objects, the screen positions data, and the ticket strings at predetermined time intervals to the mobile computing device independent of the ticket purchase process.

11. The method of claim 10, wherein automatically transmitting updates includes at least one of adding, overwriting, and deleting at least a portion of the plurality of graphical objects, the screen positions data, and/or the ticket strings.

12. The method of claim 9, wherein the plurality of graphical objects are associated with at least two types of tickets.

13. The method of claim 9, wherein the screen positions data is generated based on a device type of the mobile computing device.

* * * * *